US008578508B2

(12) United States Patent
Takashima

(10) Patent No.: US 8,578,508 B2
(45) Date of Patent: Nov. 5, 2013

(54) INFORMATION RECORDING MEDIUM MANUFACTURING SYSTEM, APPARATUS, AND METHOD FOR RECORDING IN AN INFORMATION RECORDING MEDIUM CONTENTS AND CONTENTS CODE FILES

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 415 days.

(21) Appl. No.: 12/874,694

(22) Filed: Sep. 2, 2010

(65) Prior Publication Data

US 2010/0332849 A1 Dec. 30, 2010

Related U.S. Application Data

(62) Division of application No. 11/627,196, filed on Jan. 25, 2007, now Pat. No. 8,185,732.

(30) Foreign Application Priority Data

Feb. 6, 2006 (JP) .................................. 2006-028338

(51) Int. Cl.
*H04L 29/12* (2006.01)
*H04L 27/32* (2006.01)

(52) U.S. Cl.
USPC .............................. 726/30; 713/161; 713/156

(58) Field of Classification Search
None
See application file for complete search history.

(56) References Cited

U.S. PATENT DOCUMENTS

| | | | |
|---|---|---|---|
| 2002/0141582 A1 | 10/2002 | Kocher et al. | |
| 2004/0133794 A1 | 7/2004 | Kocher et al. | |
| 2005/0172118 A1* | 8/2005 | Nasu | 713/156 |
| 2005/0234828 A1* | 10/2005 | Matsuyama et al. | 705/51 |
| 2005/0234832 A1* | 10/2005 | Kanai | 705/57 |
| 2006/0020784 A1 | 1/2006 | Jonker et al. | |
| 2006/0041760 A1* | 2/2006 | Huang | 713/189 |
| 2006/0156010 A1* | 7/2006 | Kim | 713/176 |

FOREIGN PATENT DOCUMENTS

| | | |
|---|---|---|
| JP | 2003-323342 | 11/2003 |
| JP | 2004-260533 | 9/2004 |
| JP | 2004-532495 | 10/2004 |
| JP | 2005-050176 | 2/2005 |
| JP | 2005-071037 | 3/2005 |
| JP | 2005-092830 | 4/2005 |
| JP | 2005-354121 | 12/2005 |
| JP | 2006-500652 | 1/2006 |
| JP | 2007-026120 | 2/2007 |
| JP | 2007-58749 | 3/2007 |
| JP | 2007-80458 | 3/2007 |
| JP | 2007-150910 | 6/2007 |
| WO | WO 02/079906 | 10/2002 |
| WO | WO 2005/008385 A2 | 1/2005 |
| WO | WO 2005/074187 | 8/2005 |
| WO | WO 2007/007805 | 1/2007 |
| WO | WO 2007/063753 | 6/2007 |

* cited by examiner

*Primary Examiner* — Venkat Perungavoor
(74) *Attorney, Agent, or Firm* — Oblon, Spivak, McClelland, Maier & Neustadt, L.L.P.

(57) ABSTRACT

An information processing apparatus includes: a data processing unit that acquires content codes including a data processing program recorded in an information recording medium and executes data processing according to the content codes; and a memory that stores an apparatus certificate including an apparatus identifier of the information processing apparatus. The data processing unit is configured to execute an apparatus checking process applying the apparatus certificate stored in the memory on the basis of a code for apparatus checking process included in the content codes, acquire the apparatus identifier recorded in the apparatus certificate after the apparatus checking process, and execute data processing applying content codes corresponding to the acquired apparatus identifier.

7 Claims, 27 Drawing Sheets

FIG. 10A

| DEVICE CERTIFICATE (Device CERT (4*41 = 164BYTE)) |
|---|
| DEVICE CERTIFICATE SIZE (DeviceCertificateSize) |
| DEVICE CERTIFICATE VERSION (DeviceCertificateVersion) |
| DEVICE MANUFACTURER IDENTIFIER (DeviceManufacturerID) |
| DEVICE IDENTIFIER (DeviceID) |
| RESERVED (reserved) |
| DEVICE CERTIFICATE SIGNING DATE (DeviceCertificateSigningDate) |
| DEVICE PUBLIC KEY (DevicePublicKey) |
| DEVICE CERTIFICATE SIGNATURE (DeviceCertificateSignature (by KIC)) |

FIG. 10B

| MODEL/VERSION CERTIFICATE (Model/Version CERT (4*43 = 172Byte)) |
|---|
| MODEL/VERSION CERTIFICATE SIZE (ModelCertificateSize) |
| MODEL/VERSION CERTIFICATE VERSION (ModelCertificateVersion) |
| MODEL MANUFACTURER IDENTIFIER (ModelManufacturerID) |
| MODEL IDENTIFIER (Model ID) |
| VERSION IDENTIFIER (Version ID) |
| REVISION IDENTIFIER (RevisionID) |
| RESERVED (reserved) |
| MODEL/VERSION CERTIFICATE SIGNING DATE (ModelCertificateSigningDate) |
| MODEL/VERSION PUBLIC KEY (Model/Version PublicKey) |
| mw@. VERSION CERTIFICATE SIGNATURE (ModelCertificateSignature (by KIC)) |

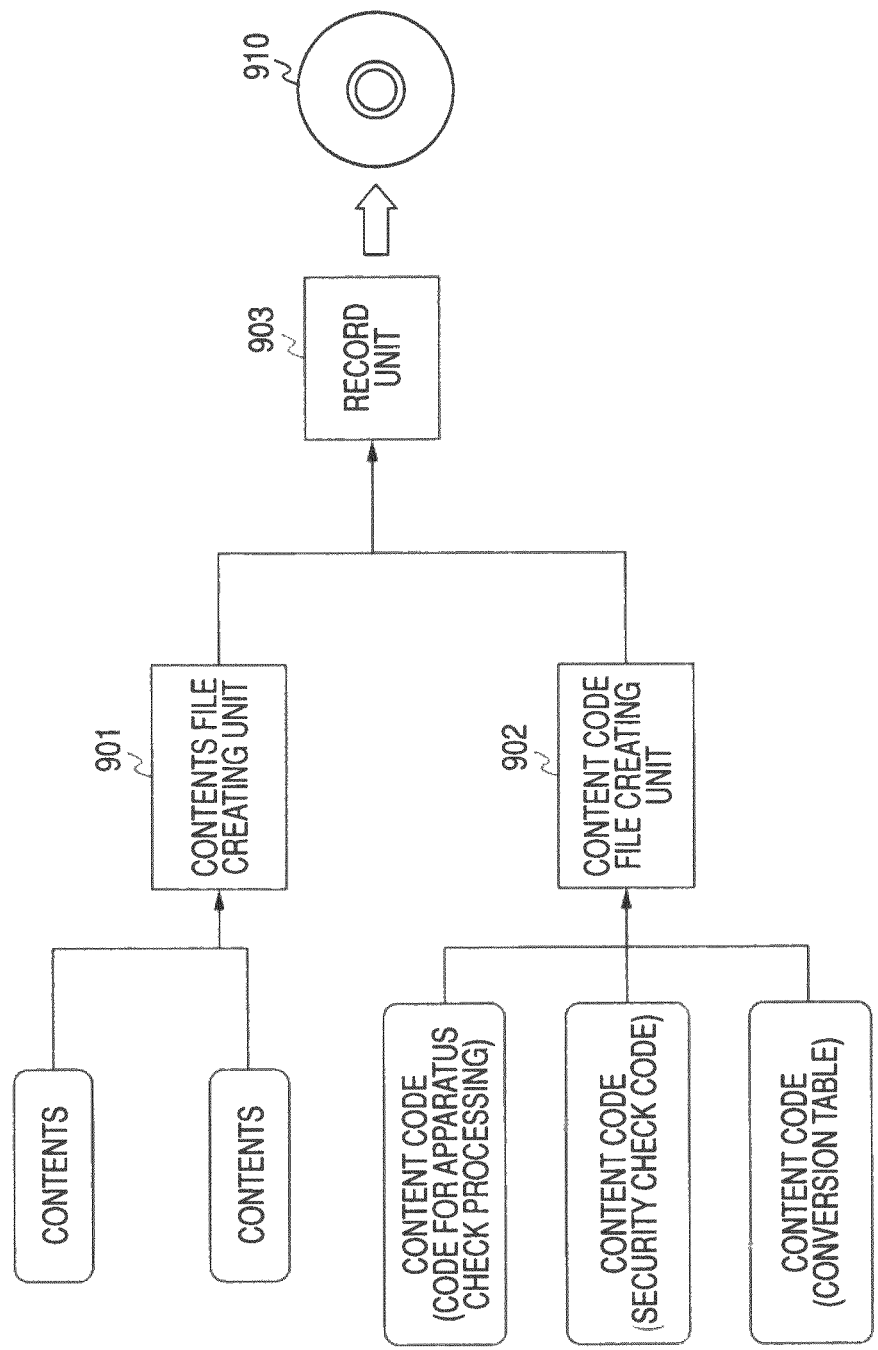

INFORMATION RECORDING MEDIUM MANUFACTURING SYSTEM, APPARATUS, AND METHOD FOR RECORDING IN AN INFORMATION RECORDING MEDIUM CONTENTS AND CONTENTS CODE FILES

CROSS REFERENCES TO RELATED APPLICATIONS

This application is a divisional of and claims the benefit of priority under 35 U.S.C. §120 from U.S. application Ser. No. 11/627,196, filed Jan. 25, 2007, and claims the benefit of priority under 35 U.S.C. §119 from Japanese Patent Application No. 2006-028338, filed Feb. 6, 2006, the entire contents of each which are incorporated herein by reference.

BACKGROUND OF THE INVENTION

1. Field of the Invention

The present invention relates to an information processing apparatus, an information recording medium manufacturing apparatus, an information recording medium, an information processing method, an information recording medium manufacturing method, and a computer program. More specifically, the present invention relates to an information processing apparatus, an information recording medium manufacturing apparatus, an information recording medium, an information processing method, an information recording medium manufacturing method, and a computer program configured to determine a device, a model, or a version corresponding to an information processing apparatus and select and execute a content code corresponding to the information processing apparatus in accordance with determined information at the time of processing using a content code that is recorded in an information recording medium together with contents and is executed when the contents are used.

2. Description of the Related Art

Audio data such as music, image data such as movies, game programs, or various application programs, that is, various software data (hereinafter, collectively referred to as 'contents') may be stored as digital data in recording media, for example, a Blu-ray disc (Registered Trademark) using a blue laser, a DVD (digital versatile disc), an MD (mini disc), or a CD (compact disc). In particular, the Blu-ray disc (Registered Trademark) using a blue laser is a high-density recordable disc, and a large amount of video contents or the like may be recorded as high-resolution data in the Blu-ray disc.

Digital contents are stored in these various information recording media (recording media) and are supplied to users. A user reproduces contents by using a reproduction apparatus that he or she owns, such as a PC (personal computer) or a disc player, thereby using the contents.

In general, distribution rights of many of the contents including music data and image data are owned by creators or distributors of the contents. Therefore, when distributing the contents, there is typically applied a configuration having predetermined restrictions, that is, a configuration in which only regular users are permitted to use the contents so that duplication without permission is not performed.

By the use of a digital recording apparatus and a recording medium, it is possible to repeatedly record or reproduce, for example, images or sounds without deteriorating the images or the sounds. As a result, distribution of illegally copied contents through Internet, distribution of so-called pirated discs obtained by copying contents on, for example, CD-R, and utilization of copy contents stored in a hard disc of a PC or the like are widely spread.

For example, a large amount of data corresponding to one or several movies may be recorded as digital information in a high-capacity recording medium, such as a DVD or a recording medium using a blue laser under development in recent years. Thus, as video information or the like can be recorded as digital information, it is gradually becoming an important issue to prevent illegal copies so as to protect a right of an owner of copyright. Currently, in order to prevent the illegal copy of digital data, various techniques for preventing illegal copies using a digital recording apparatus and a recording medium are put into practical use.

A technique of protecting the right of an owner of copyright by preventing illegal copies of contents includes a contents encryption method. However, even if contents are encrypted, a problem occurs in which illegally decrypted contents are distributed if an encryption key leaks out.

Further, as a configuration for preventing the illegal use of contents, for example, an identifier (ID) is granted to an application that desires to perform reproduction so that the contents can be used by only processing in which an application having a specific ID is applied. This configuration is disclosed in JP-A-2005-354121, for example. Furthermore, as a technique for examining a creating source of illegally created contents, there has been proposed a configuration of embedding an ID of an apparatus, which performs a reproduction process, when the contents are reproduced. This configuration is disclosed in JP-A-2004-260533, for example.

In the case of a configuration in which data conversion processing such as ID embedding or contents decryption processing is performed when reproducing contents, there may be performed security check or validity check for checking whether or not an information processing apparatus or a reproduction (player) program that is willing to use the contents is a valid licensed apparatus or program. These processes are performed by executing, for example, a content code, which serves as a contents utilization control program and is recorded in an information recording medium together with the contents.

In general, a content code is set as a file separate from contents and is then recorded in an information recording medium. Accordingly, only a content code may be moved or copied to another information recording medium. If the leakage of the content code occurs, the contents may be illegally reproduced by an unauthorized apparatus other than an apparatus having an authorized contents utilization right by execution of the leaked content code.

To an apparatus or application that executes reproduction of contents, other apparatuses or applications whose manufacturers are different are applied. In the case of executing the data conversion processing or the security check using the content code, it is desirable to set such that content codes corresponding to other apparatuses or applications whose manufacturers are different are properly selected to execute security check according to each sequence and execute proper data conversion processing. In particular, in the case of performing a process of embedding identification information of an apparatus or application, which executes reproduction of contents, in the contents during data conversion processing for replacing a part of contents data with different data, embedding of correct identification information is not executed if a correct content code is not selected. As a result, it becomes difficult to specify an apparatus that executes illegal processing.

SUMMARY OF THE INVENTION

Therefore, in view of the above, it is desirable to realize a configuration for strict use of a content code, which serves as a contents utilization control program and is recorded in an information recording medium together with contents. Specifically, it is desirable to provide an information processing apparatus, an information recording medium manufacturing apparatus, an information recording medium, an information processing method, an information recording medium manufacturing method, and a computer program configured to perform an apparatus check process based on identification information, such as a device, a model, or a version, specifying an information processing apparatus serving as a contents utilization apparatus and then precisely select and execute a content code corresponding to the information processing apparatus in accordance with apparatus check information at the time of processing using the content code.

According to a first embodiment of the present invention, there is provided an information processing apparatus including: a data processing unit that acquires content codes including a data processing program recorded in an information recording medium and executes data processing according to the content codes; and a memory that stores an apparatus certificate including an apparatus identifier of the information processing apparatus. The data processing unit is configured to execute an apparatus checking process applying the apparatus certificate stored in the memory on the basis of a code for apparatus checking process included in content codes, acquire the apparatus identifier recorded in the apparatus certificate after the apparatus checking process, and execute data processing applying content codes corresponding to the acquired apparatus identifier.

In the information processing apparatus according to the first embodiment of the present invention, preferably, the apparatus certificate is a device certificate stored with a device identifier specific to an information processing apparatus and a device private key or a model/version certificate stored with a model identifier or version identifier corresponding to a model or version of an information processing apparatus and a model/version public key. In addition, preferably, the data processing unit is configured to execute an apparatus checking process applying at least one of the device certificate and the model/version certificate, acquire any of a device identifier recorded in the device certificate and a model identifier and a version identifier recorded in the model/version certificate, and execute data processing applying content codes corresponding to the acquire identifier.

Further, in the information processing apparatus according to the first embodiment of the present invention, preferably, the data processing unit is configured to check validity of the apparatus certificate by a process of verifying a signature set in the apparatus certificate, create new signature data by the use of a private key stored in the memory of the information processing apparatus, verify the created signature data by the use of a public key stored in the apparatus certificate, and execute an apparatus checking process of determining success of the signature verification as success of the apparatus check.

Furthermore, in the information processing apparatus according to the first embodiment of the present invention, it is preferable to further include a memory that stores, as data corresponding to device and group, a device specific key set corresponding to a leaf as a lowermost node corresponding to the information processing apparatus, a group key set corresponding to nodes on a route from the leaf to a top node, and a device manufacturing entity key set corresponding to the top node in a key tree having a hierarchical structure and stores, as a model/version package, a model key and a version key corresponding to model/version of the information processing apparatus and a key management center public key. In addition, preferably, the data processing unit is configured to execute a process of verifying a signature of the content codes by applying the key management center public key and execute a process of decrypting data included in the content codes by applying any of the device specific key, the group key, the device manufacturing entity key, the model key, and the version key in the data processing applying the content codes.

Furthermore, in the information processing apparatus according to the first embodiment of the present invention, preferably, the data processing unit is configured to acquire, from data stored in the information recording medium, key specifying information applied in decryption of the content codes and encrypted data position specifying information indicating position of encrypted data set in the content codes, select a key to be applied according to acquired information, specify data to be decrypted according to the encrypted data position specifying information, and execute decryption processing applying the selected key.

Furthermore, in the information processing apparatus according to the first embodiment of the present invention, preferably, the content codes have a data structure in which a signature is set in the unit of a block as data included in content codes, and the data processing unit is configured to execute the process of verifying the signature of the content codes in the block unit.

Furthermore, in the information processing apparatus according to the first embodiment of the present invention, preferably, separate key sets corresponding to a plurality of different device manufacturing entities corresponding to manufacturers of information processing apparatuses, manufacturers of components, or assemblers are stored in a memory, and the data processing unit is configured to, at the time of a process of decrypting content codes, select a key from a key set corresponding to a device manufacturing entity selected corresponding to content codes to be executed, such that a process of decrypting data included in the content codes by applying the selected key is executed.

Furthermore, in the information processing apparatus according to the first embodiment of the present invention, preferably, the data processing unit is configured to execute, as data processing applying content codes to be executed after the apparatus checking process, at least one of security check processing applying a security check code included in the content codes and data conversion processing for contents forming data applying a data conversion table included in the content codes.

Furthermore, in the information processing apparatus according to the first embodiment of the present invention, preferably, the information processing apparatus is configured to store in a memory a model/version certificate stored with a model/version public key corresponding to model/version of the information processing apparatus, and the data processing unit is configured to determine a state of application of the content codes by checking certificate update information recorded in the model/version certificate.

Further, according to a second embodiment of the present invention, there is provided an information recording medium manufacturing apparatus including: a contents file creating means for creating a contents file in which contents data recorded in an information recording medium is stored; a content code file creating means for creating a content code file in which content codes including a data processing program to be executed when using contents are stored; and a recording means for recording, in an information recording medium, the contents file created by the contents file creating means and the content code file created by the content code file creating means. The content code file creating means is configured to create a content code file stored with a code for apparatus checking process, which causes an apparatus checking process applying an apparatus certificate stored in a memory of each information processing apparatus to be executed, and a content code file stored with a security check code that is selected and executed on the basis of an apparatus identifier checked in the apparatus checking process.

In the information recording medium manufacturing apparatus according to the second embodiment of the present invention, preferably, the content code file creating means is configured to create a content code file stored with a data conversion table applied in a data conversion process of contents that are selected and executed on the basis of an apparatus identifier checked in the apparatus checking process.

Furthermore, in the information recording medium manufacturing apparatus according to the second embodiment of the present invention, preferably, the content code file creating means is configured to create a content code file stored with content codes including encrypted data that is decrypted by only an encryption key distributed to a group of specific information processing apparatuses that use contents.

Furthermore, in the information recording medium manufacturing apparatus according to the second embodiment of the present invention, preferably, the encryption key corresponds to any of a device specific key set corresponding to a leaf as a lowermost node corresponding to an information processing apparatus, a group key set corresponding to each node on a route from a leaf to a top node, a device manufacturing entity key set corresponding to the top node, a model key corresponding to a model of the information processing apparatus, and a version key corresponding to a version of the information processing apparatus in a key tree having a hierarchical structure.

Furthermore, in the information recording medium manufacturing apparatus according to the second embodiment of the present invention, preferably, the content code file creating means is configured to execute a process of creating, as information corresponding to a content code file stored with content codes including encrypted data that is decrypted by only an encryption key distributed to a group of specific information processing apparatuses that use contents, an encrypted data portion and content code encryption information including key specifying information as information to be recorded in an information recording medium.

Further, according to a third embodiment of the present invention, there is provided an information recording medium including: a contents file stored with contents data; and a content code file stored with content codes including a data processing program to be executed when using contents. The content code file is configured to include a content code file stored with a code for apparatus checking process, which causes an apparatus checking process applying an apparatus certificate stored in a memory of each information processing apparatus to be executed, and a content code file stored with a security check code that is selected and executed on the basis of an apparatus identifier checked by the apparatus checking process.

In the information recording medium according to the third embodiment of the present invention, preferably, the content code file is configured to include a data conversion table applied in a data conversion process of contents that are selected and executed on the basis of an apparatus identifier checked by the apparatus checking process.

Furthermore, in the information recording medium according to the third embodiment of the present invention, preferably, the content code file is a content code file stored with content codes including encrypted data that is decrypted by only an encryption key distributed to a group of specific information processing apparatuses that use contents.

Furthermore, in the information recording medium according to the third embodiment of the present invention, preferably, the encryption key corresponds to any of a device specific key set corresponding to a leaf as a lowermost node corresponding to an information processing apparatus, a group key set corresponding to each node on a route from a leaf to a top node, a device manufacturing entity key set corresponding to the top node, a model key corresponding to a model of the information processing apparatus, and a version key corresponding to a version of the information processing apparatus in a key tree having a hierarchical structure.

Furthermore, in the information recording medium according to the third embodiment of the present invention, preferably, as information corresponding to a content code file stored with content codes including encrypted data that is decrypted by only an encryption key distributed to a group of specific information processing apparatuses that use contents, an encrypted data portion and content code encryption information including key specifying information are included as record information.

Further, according to a fourth embodiment of the present invention, an information processing method of executing data processing applying record data of an information recording medium in an information processing apparatus includes the steps of: acquiring content codes including a data processing program recorded in the information recording medium in a data processing unit; executing an apparatus checking process applying an apparatus certificate stored in a memory on the basis of a code for apparatus checking process included in the content codes in the data processing unit; and executing content code processing in which an apparatus identifier recorded in the apparatus certificate is acquired, content codes corresponding to the acquired apparatus identifier are selected, and data processing applying the selected content codes is executed in the data processing unit.

In the information processing method according to the fourth embodiment of the present invention, preferably, the apparatus certificate is a device certificate stored with a device identifier specific to an information processing apparatus and a device private key or a model/version certificate stored with a model identifier or version identifier corresponding to a model or version of an information processing apparatus and a model/version public key. In addition, preferably, in the executing of the apparatus checking process, an apparatus checking process applying at least one of the device certificate and the model/version certificate is executed, any of a device identifier recorded in the device certificate and a model identifier and a version identifier recorded in the model/version certificate is acquired. In addition, preferably, in the executing of the content code processing, data processing applying content codes corresponding to the acquire identifier is executed.

Furthermore, in the information processing method according to the fourth embodiment of the present invention, preferably, in the executing of the apparatus checking process, validity of the apparatus certificate is checked by a process of verifying a signature set in the apparatus certificate, new signature data is created by using a private key stored in a memory of the information processing apparatus, the created signature data is verified by using a public key stored in the apparatus certificate, and an apparatus checking process of determining success of the signature verification as success of the apparatus check is executed.

Furthermore, in the information processing method according to the fourth embodiment of the present invention, preferably, the information processing apparatus includes a memory that stores, as data corresponding to device and group, a device specific key set corresponding to a leaf as a lowermost node corresponding to the information processing apparatus, a group key set corresponding to each nodes on a route from the leaf to a top node, and a device manufacturing entity key set corresponding to the top node in a key tree having a hierarchical structure and stores, as a model/version package, a model key and a version key corresponding to model/version of the information processing apparatus and a key management center public key. In addition, preferably, the data processing unit executes a process of verifying a signature of the content codes by applying the key management center public key and executes a process of decrypting data included in content codes by applying any of the device specific key, the group key, the device manufacturing entity key, the model key, and the version key in the executing of the content code processing.

Furthermore, in the information processing method according to the fourth embodiment of the present invention, preferably, in the executing of the content code processing, key specifying information applied in decryption of the content codes and encrypted data position specifying information indicating position of encrypted data set in the content codes are acquired from data stored in the information recording medium, a key to be applied is selected according to the acquired information, data to be decrypted is specified according to the encrypted data position specifying information, and decryption processing is executed by applying the selected key.

Furthermore, in the information processing method according to the fourth embodiment of the present invention, preferably, the content codes have a data structure in which a signature is set in the unit of a block as data included in content codes, and the process of verifying the signature of the content codes is executed in the block unit in the data processing unit.

Furthermore, in the information processing method according to the fourth embodiment of the present invention, preferably, in the executing of the content code processing, a key is selected from a key set corresponding to a device manufacturing entity selected corresponding to content codes to be executed at the time of a process of decrypting the content codes, such that a process of decrypting data included in the content codes by applying the selected key is executed.

Furthermore, in the information processing method according to the fourth embodiment of the present invention, preferably, in the executing of the content code processing, the data processing unit executes, as data processing applying content codes to be executed after the apparatus checking process, at least one of security check processing applying a security check code included in the content codes and data conversion processing for contents forming data applying a data conversion table included in the content codes.

Furthermore, in the information processing method according to the fourth embodiment of the present invention, it is preferable to further include the step of: executing a process of determining a state of application of the content codes by checking certificate update information recorded in a model/version certificate in the data processing unit. In addition, preferably, the information processing apparatus is configured to store in a memory the model/version certificate stored with a model/version public key corresponding to model/version of the information processing apparatus.

Further, according to a fifth embodiment of the present invention, an information recording medium manufacturing method of an information recording medium manufacturing apparatus includes the steps of: creating a contents file in which contents data recorded in an information recording medium is stored; creating a content code file in which content codes including a data processing program to be executed when using contents are stored; and recording, in an information recording medium, the contents file created in the creating of the contents file and the content code file created in the creating of the content code file. In the creating of the content code file, a content code file stored with a code for apparatus checking process, which causes an apparatus checking process applying an apparatus certificate stored in a memory of each information processing apparatus to be executed, and a content code file stored with a security check code that is selected and executed on the basis of an apparatus identifier checked in the apparatus checking process are created.

In the information recording medium manufacturing method according to the fifth embodiment of the present invention, preferably, in the creating of the content code file, a content code file stored with a data conversion table applied in a data conversion process of contents that are selected and executed on the basis of an apparatus identifier checked in the apparatus checking process is created.

Furthermore, in the information recording medium manufacturing method according to the fifth embodiment of the present invention, preferably, in the creating of the content code file, a content code file stored with content codes including encrypted data that is decrypted by only an encryption key distributed to a group of specific information processing apparatuses that use contents is created.

Furthermore, in the information recording medium manufacturing method according to the fifth embodiment of the present invention, preferably, the encryption key corresponds to any of a device specific key set corresponding to a leaf as a lowermost node corresponding to an information processing apparatus, a group key set corresponding to each node on a route from a leaf to a top node, a device manufacturing entity key set corresponding to the top node, a model key corresponding to a model of the information processing apparatus, and a version key corresponding to a version of the information processing apparatus in a key tree having a hierarchical structure.

Furthermore, in the information recording medium manufacturing method according to the fifth embodiment of the present invention, preferably, in the creating of the content code file, a process of creating, as information corresponding to a content code file stored with content codes including encrypted data that is decrypted by only an encryption key distributed to a group of specific information processing apparatuses that use contents, an encrypted data portion and content code encryption information including key specifying information as information to be recorded in an information recording medium is executed.

Further, according to a sixth embodiment of the present invention, a computer program that causes an information processing apparatus to execute data processing applying record data of an information recording medium causes the information processing apparatus to execute: acquiring content codes including a data processing program recorded in the information recording medium by means of a data processing unit; executing an apparatus checking process applying an apparatus certificate stored in a memory on the basis of a code for apparatus checking process included in the content codes by means of the data processing unit; and executing content code processing, in which an apparatus identifier recorded in the apparatus certificate is acquired, content codes corresponding to the acquired apparatus identifier are selected, and data processing applying the selected content codes is executed, by means of the data processing unit.

In addition, according to a seventh embodiment of the present invention, there is provided an information processing apparatus including: a first memory that stores data including data specific to each information processing apparatus; and a second memory that stores common data corresponding to common models and versions of information processing apparatuses. The data including data specific to each information processing apparatus includes an apparatus certificate including an apparatus identifier, a key corresponding to a device manufacturing entity, a group key common to a predetermined group set when apparatuses are divided into groups, and a key specific to each apparatus. The common data corresponding to common models and versions includes a key specific to a model, a key specific to a version, and an apparatus certificate including identifiers of model and version.

In the information processing apparatus according to the seventh embodiment of the present invention, preferably, according to an acquired program, first signature verification based on the apparatus certificate is executed and then signature verification using the key specific to an apparatus is further executed corresponding to a result of the first signature verification, and second signature verification based on the apparatus certificate including the identifiers of model and version is executed and then signature verification using the key specific to a model or the key specific to a version is further executed corresponding to a result of the second signature verification.

In addition, the computer program according to the sixth embodiment of the present invention is a computer program that can be supplied to a computer/system capable of executing a variety of programs/codes by the use of a storage medium or a communication medium supplied in a computer-readable format. For example, the computer program is supplied by the use of a recording medium such as a CD, an FD, or an MO, or a communication medium such as a network. By supplying the program in the computer-readable format, processing corresponding to the program is realized in the computer/system.

Additional purposes, characteristics, and advantages of the present invention will be apparent by detailed description made with reference to the accompanying drawings in the following embodiments of the present invention. In addition, the system in the specification is a logic group of a plurality of devices. That is, it is not limited that the devices exist in the same casing.

According to the configuration according to the embodiment of the present invention, in a configuration in which content codes including a data processing program recorded in an information recording medium are acquired and then data processing, such as security check processing, conversion processing on data included in contents, or a process of embedding apparatus information in contents according to corresponding content codes is executed, an apparatus checking process applying a device certificate or a model/version certificate stored in an information processing apparatus is executed as a process of checking an information processing apparatus, a device ID, a model ID, or a version ID serving as an apparatus identifier stored in the device certificate or the model/version certificate is acquired after the apparatus checking process, and data processing applying content codes corresponding to the acquired apparatus identifier is executed at the time of a process applying content codes. As a result, it is possible to select and apply a proper content code corresponding to each apparatus.

Further, according to the configuration according to another embodiment of the present invention, at least a part of content codes is set as encrypted data, and in the key tree having the hierarchical structure, any of the encryption keys including the device specific key set corresponding to a leaf as a lowermost node to which an information processing apparatus corresponds, the group key set corresponding to each nodes on a route from the leaf to the top node, the device manufacturing entity key set corresponding to the top node, and the model and version keys set corresponding to model and version of an information processing apparatus is applied as the encryption key. Accordingly, it is possible to allow only a group of specific information processing apparatuses to execute processing on content codes. As a result, it is possible to realize a configuration capable of preventing processing in which illegal content codes are applied.

BRIEF DESCRIPTION OF THE DRAWINGS

FIG. 10A is a view explaining an example of the data structure of a device certificate;

FIG. 10B is a view explaining an example of the data structure of a model/version certificate;

FIG. 27 is a block diagram explaining the configuration of an information recording medium manufacturing apparatus.

DESCRIPTION OF THE PREFERRED EMBODIMENTS

Figure 1:
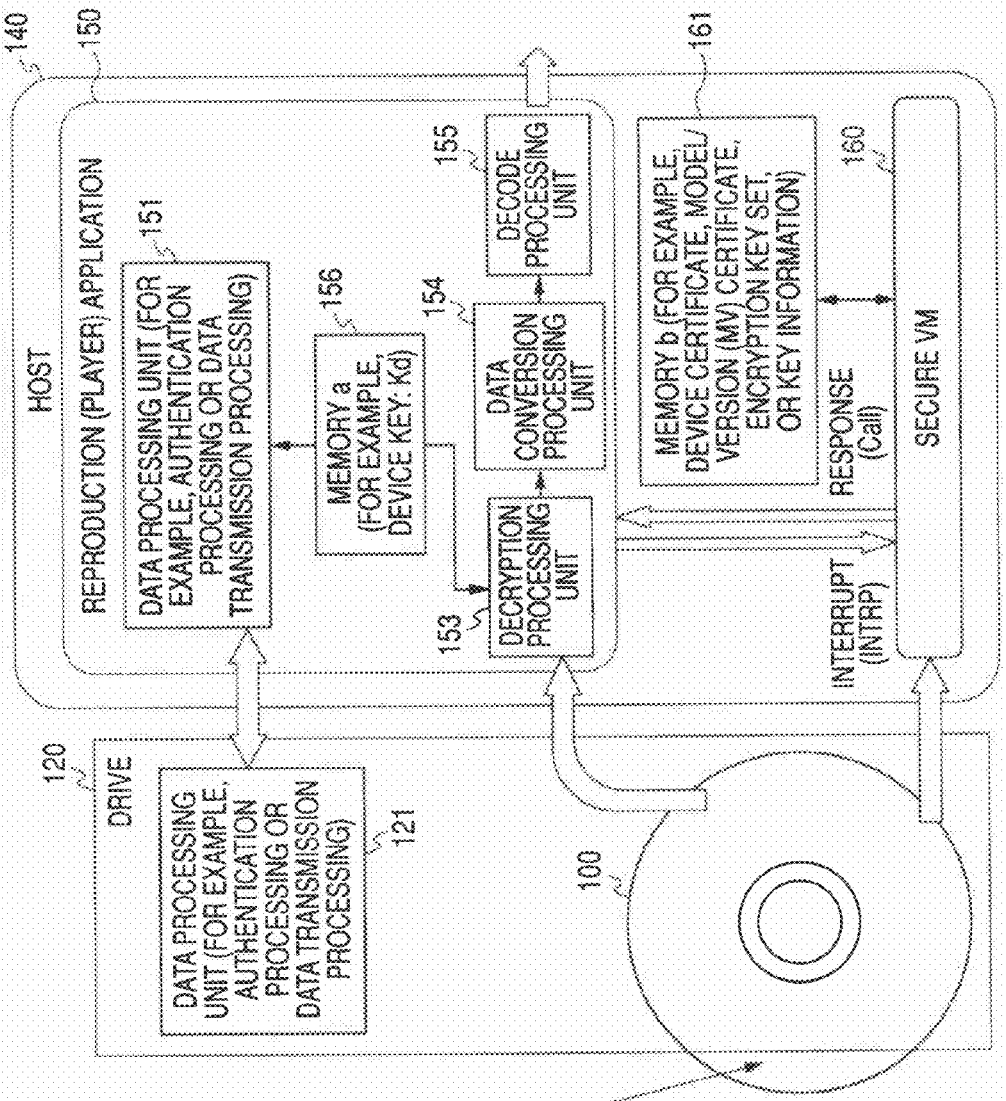
FIG. 1 is a view explaining the configuration and processing of storage data of an information recording medium, a drive apparatus, and an information processing apparatus.

Hereinafter, an information processing apparatus, an information recording medium manufacturing apparatus, an information recording medium, an information processing method, an information recording medium manufacturing method, and a computer program according to embodiments of the present invention will be described in detail with reference to the accompanying drawings. In addition, the explanation will be made in the order of the following items.

1. Storage data of information recording medium and outline of processing in drive and host 2. Contents management unit (CPS unit)

3. Data structure of contents including modified data and outline of data conversion processing 4. Contents reproduction processing 5. Processing applying security check code 6. Configuration of distribution of encryption key to information processing apparatus and encryption and use of content codes 7. Configuration of information processing apparatus 8. Information recording medium manufacturing apparatus and information recording medium

[1. Storage Data of Information Recording Medium and Outline of Processing in Drive and Host]

First, storage data of information recording medium and outline of processing in drive and host will be described. FIG. 1 illustrates the configuration of an information recording medium 100 stored with contents, a drive 120, and a host 140. The host 140 is a data reproduction (or record) application executed in an information processing apparatus such as a PC. The host 140 performs processing using hardware of an information processing apparatus, such as a PC, according to predetermined data processing sequences.

The information recording medium 100 is an information recording medium, such as a Blu-ray disc (Registered Trademark) or a DVD, and includes a data recordable information recording medium (for example, an RE disc) or an information recording medium (for example, a ROM disc) stored with authorized contents, which is manufactured in a disc manufacturing factory under the permission of a so-called contents right holder having authorized contents copyright or distribution right. Moreover, in the following embodiments, a disc-type medium is described as an example of an information recording medium; however, the present invention may be applied in a configuration using various types of information recording media.

As shown in FIG. 1, the information recording medium 100 stores encrypted contents 101 for which encryption processing and replacement processing on some data have been performed, an MKB (media key block) 102 that serves as an encryption key block and is created on the basis of a tree-structured key distribution method known as a broadcast encryption method, a title key file 103 including encrypted CPS unit key obtained by encrypting a title key applied to contents decryption processing, use permission information 104 including CCI (copy control information) as control information for copy and reproduction of contents, and a content code 105 including a data processing program executed when using the encrypted contents 101.

The content code 105 includes a conversion table (Fix-up Table) 106, in which conversion data corresponding to replacement data in a predetermined region of contents is registered, and a security check code 107 having a program for verifying the validity of a player (reproduction apparatus) that performs reproduction of contents. Further, the content code 105 includes an apparatus checking code 108 used for apparatus check of an information processing apparatus, that is, the apparatus checking code 108 that specifies, for example, a model, a version, or a device corresponding to an information processing apparatus on the basis of a model identifier (model ID), a version identifier (version ID), or a device identifier (device ID).

In an information processing apparatus that performs reproduction of contents, a verification process of verifying the validity of a player (reproduction apparatus) is performed according to the security check code 107 included in the content code 105 and after the verification process, conversion data recorded in the conversion table (Fix-up Table) 106 included in the content code 105 is extracted according to a data conversion processing program included in the content code 105 so as to perform replacement processing on data included in the contents.

Moreover, the conversion table (Fix-up Table) 106 or the security check code 107 includes various types of codes that allow processing according to types of various reproduction apparatuses or reproduction applications, that is, security check processing or conversion processing to be executable. For example, the various types of codes include a security check code and a conversion table corresponding to a model A1, a version a2, and a device Aa3 of a product made in an 'A' company and a security check code and a conversion table corresponding to a model B1, a version b2, and a device Bb3 of a product made in an 'B' company. An apparatus that desires to use contents selects a security check code or a conversion table corresponding thereto from these security check codes or conversion tables so as to perform processing.

An information processing apparatus that uses the contents selects a proper security check code or conversion table corresponding thereto from so as to perform processing. For example, according to various groups, to which an information processing apparatus belongs, including a 'device' corresponding to an information processing apparatus, a 'model' defined as a group of a plurality of devices, or a 'version' as a lower conception of a model, a proper security check code or conversion table is selected to perform the processing. For example, a device identifier is set as an identifier specific to each information processing apparatus.

A model identifier is set to be common to a plurality of devices (information processing apparatuses) belonging to the same model.

A version identifier is an identifier set for different versions belonging to the same model. For example, assuming that a version 1 of a model A and a version 2 of the model A exist, separate version identifiers are set corresponding to the respective versions.

The information processing apparatus checks a device, a model, a version, and the like, to which the information processing apparatus belongs, of the information processing apparatus by means of processing in which the apparatus checking code 108 is applied and then selects a proper conversion table or security check code, thereby performing the processing. Thus, it is necessary to check a device identifier, a model identifier, or a version identifier of a corresponding apparatus. An apparatus check processing program for execution of the check processing is included in the apparatus checking code 108.

An information processing apparatus that desires to use contents acquires a device certificate (Device Cert) or a model/version certificate (MV Cert) stored in a memory (memory b 161 shown in FIG. 1) of the information processing apparatus, executes the apparatus checking code 108 included in the content code 105, and executes a process of checking a device, a model, or a version of the information processing apparatus. After the apparatus checking process, the information processing apparatus selects a proper security check code or conversion table corresponding to the confirmed device, model, or version so as to perform processing. The device certificate (Device Cert) or the model/version certificate (MV Cert) is a public key certificate stored with a public key. A specific processing example of the processing will be described later.

Further, the content code 105 includes information or programs used to execute a variety of processes, such as start-up processing and security check processing, in addition to the conversion processing program that applies conversion data. Details of the content code will be described later. In addition, the information recording medium storage data shown in the drawing is an example, and storage data is slightly different according to types of discs or the like. Hereinafter, an outline of the variety of information will be described.

(1) Encrypted Contents 101

Various contents are stored in the information recording medium 100. For example, the various contents include AV (audio visual) stream of moving picture contents, such as HD (high definition) movie contents that are high-definition moving picture data, or contents including a game program, an image file, sound data, or text data specified in the specific standard. These contents are specific AV-format standard data and are stored according to a specific AV data format. Specifically, for example, the contents are stored as Blu-ray Disc (Registered Trademark) ROM standard data in accordance with the Blu-ray Disc (Registered Trademark) ROM standard format.

Further, for example, a game program, an image file, sound data, or text data serving as service data may be stored in the information recording medium 100. These contents may be stored as data having data formats that do not follow specific AV data formats.

There are various types of contents including music data, image data such as moving pictures and still images, a game program, and WEB contents. The contents include various types of contents information, which can be used only by data from the information recording medium 100, and contents information, which can be used by the data from the information recording medium 100 and data supplied from a server connected to a network. As for contents stored in an information recording medium, the contents are encrypted in a condition in which different keys (CPS unit keys or unit keys (or often called title keys)) are assigned for separate contents and are then stored, in order to realize different use control with respect to the separate contents. A unit that assigns one unit key is called a contents management unit (CPS unit). Further, a part of data included in contents is set as broken data replaced by data different from correct contents data. Accordingly, since the correct contents are not reproduced with only decryption processing, a process of replacing the broken data with data registered in a conversion table is necessary to execute the reproduction. The process will be described in detail later.

(2) MKB

The MKB (media key block) 102 is an encryption key block created on the basis of the tree-structured key distribution method known as the broadcast encryption method. The MKB 102 is a key information block that allows a media key [Km], which is a key necessary for decryption of contents, to be acquired only by processing (decryption) based on a device key [Kd] stored in an information processing apparatus of a user having an effective license. An information distribution method according to a so-called hierarchical tree structure is applied thereto. That is, only when a user device (information processing apparatus) has an effective license, the media key [Km] can be acquired, but in the case of a user device that is not valid (is revoked), the media key [Km] cannot be acquired.

A management center as a license entity can create an MKB having a configuration, which cannot be decrypted with a device key stored in a specific user device, that is, cannot acquire a media key required for contents decryption, by changing a device key used for encryption of key information stored in the MKB. Thus, it becomes possible to supply encrypted contents, which can be decrypted, to only a device having an effective license while revoking unauthorized devices at a predetermined timing. Decryption processing of contents will be described later.

(3) Title Key File

As described above, each of the contents or a group of a plurality of contents are encrypted by applying a separate encryption key (title key (CPS unit key)) for the purpose of management in using contents and are then stored in the information recording medium 100. That is, AV (audio visual) streams, music data, image data such as moving pictures and still images, game programs, WEB contents, and the like included in the contents are divided into units as a management unit for utilization of contents. In addition, it is necessary to create different title keys for the respective divided units and to perform decryption processing. Information for creating the title key is title key data. For example, the title key is obtained by decrypting an encryption title key with a key created by a media key or the like. A title key corresponding to each unit is created according to predetermined encryption key creating sequences in which title key data is applied, such that decryption of contents is performed.

(4) Use Permission Information

The use permission information includes copy and reproduction control information (CCI), for example. That is, the copy and reproduction control information (CCI) is copy limitation information or reproduction limitation information for use control corresponding to the encrypted contents 101 stored in the information recording medium 100. For example, the copy and reproduction control information (CCI) may be set as information of separate CPS units set as contents management units or may be set corresponding to a plurality of CPS units. That is, the copy and reproduction control information (CCI) may be set in various ways.

(5) Content Code

The content code 105 includes a conversion table (Fix-up Table) 106 in which conversion data corresponding to replacement data in a predetermined region of contents is registered and a security check code 107 having a program for verifying the validity of an information processing apparatus that performs reproduction of contents. Furthermore, as described above, the content code 105 includes the apparatus checking code 108 for checking identification information with respect to at least one of device, model, and version corresponding to an information processing apparatus.

As described above, the conversion table or the security check code includes various types of codes in order to allow processing corresponding to types of information processing apparatuses (for example, devices, models, or versions) serving as various reproduction apparatuses. An information processing apparatus that desires to use contents checks a device, a model, a version, or the like with respect to the information processing apparatus on the basis of the apparatus checking code 108 and then selects a security check code or a conversion table corresponding to the information processing apparatus to perform security check processing and data conversion processing.

A host as a reproduction application of a reproduction apparatus that executes reproduction of contents sets a virtual machine (VM) that executes data conversion processing, executes apparatus check processing, security check processing, and data conversion processing in accordance with a content code read out from the information recording medium 100 in the virtual machine (VM), and executes data conversion processing on a part of data included in contents by applying a registered entry of the conversion table (Fix-up Table) 106.

The encrypted contents 101 stored in the information recording medium 100 are encrypted in a predetermined manner, and a part of data included in the encrypted contents 101 includes broken data different from correct data. When reproducing the contents, a data overwriting process of replacing the broken data with conversion data which is correct contents data is necessary. A table where the conversion data is registered is the conversion table (Fix-up Table) 106. A number of broken data is set to be scattered in contents, and when reproducing the contents, a process of replacing (overwriting) the plurality of broken data with conversion data registered in the conversion table is necessary. By applying the conversion data, for example, even when an encryption key leaks such that decryption of contents is illegally executed, it is difficult to reproduce the correct contents with only the decryption of contents due to the replacement data. As a result, illegal use of contents can be prevented.

Moreover, the conversion table 106 includes conversion data (forensic mark) having data that allows bits of identification information, by which a contents reproduction apparatus or a contents reproduction application can be identified, to be analyzed, in addition to normal conversion data. Specifically, the conversion table 106 includes, for example, identifiers, such as a device ID (device identifier), a model ID (model identifier), or a version ID (version identifier), serving as identification data corresponding to an information processing apparatus or 'conversion data (forensic mark) including an identification mark' recorded with identification information created on the basis of the identifier information. The conversion data including an identification mark is data obtained by slightly changing a bit value of the correct contents data at a level where reproduction of contents is not affected.

In addition, the content code 105 includes information or programs used to execute a variety of processes, such as start-up processing and security check processing, in addition to the data conversion processing program that applies the conversion table 106 described above. Details of the content code will be described later.

Next, configurations of the host 140 and the drive 120 and an outline of processing thereof will be described with reference to FIG. 1. Reproduction processing on contents stored in the information recording medium 100 is executed when data is transmitted to the host 140 through the drive 120.

A reproduction (player) application 150 and a secure VM 160 are set in the host 140. The reproduction (player) application 150 is a contents reproduction processing unit and performs authentication processing between the host 140 and a drive in contents reproduction processing, contents decryption processing, decode processing, and the like.

The secure VM 160 is a data processing unit that performs processing in which the content code 105 is applied. The content code 105 includes the conversion table 106, the security check code 107, and the apparatus checking code 108. The secure VM 160 performs apparatus check including a model, a version, and a device of an apparatus in accordance with the apparatus checking code 108, selects the security check code 107 corresponding to the apparatus that has been checked and then perform security check processing, and performs replacement processing on a part of data of contents by the use of the conversion table 106.

The secure VM 160 serving as the data processing unit executes an apparatus checking process, in which an apparatus certificate (device certificate and model/version certificate) stored in a memory is applied, on the basis of the apparatus checking code 108 included in the content code. After the apparatus checking process, the secure VM 160 acquires apparatus identifiers (model ID, version ID, and device ID) recorded in the apparatus certificate and performs data processing in which a content code corresponding to the acquired apparatus identifiers is applied.

Moreover, the secure VM 160 is set as a virtual machine within the host 140. The virtual machine (VM) is a virtual computer that directly analyzes and executes an intermediate language. The virtual machine (VM) reads out command code information in an intermediate language, which does not depend on a platform, from the information recording medium 100 and then analyzes and executes the information.

The secure VM 160 serves as a data processing unit that acquires the content code 105 including applied information or a program applied in using the encrypted contents 101 recorded in the information recording medium 100 and executes data processing according to the acquired content code 105.

The secure VM 160 acquires apparatus information, such as device certificate (Device Cert) or model/version certificate (MV Cert), from the memory b 161 which is a memory accessible by the secure VM, performs an apparatus checking process by applying the certificates, that is, performs a process of checking the apparatus on the basis of identifiers, such as a device, a model, or a version, and selects a proper content code corresponding to the apparatus from an information recording medium on the basis of the checked apparatus identification information and then executes the selected content code.

In addition, a part of the content code is set as encrypted data, and an encryption key for decryption of the encrypted data is stored in the memory b 161. The secure VM 160 executes decryption processing on a content code by applying a key selected from the memory b 161.

For example, a device specific key serving as a key specific to a device, a group key common to a group of a plurality of devices, a model key corresponding to a specific apparatus model, or a version key corresponding to a specific version of a specific model is stored in the memory b 161.

In addition, device specific keys and group keys include node keys set corresponding to each nodes on a route from leaves, which serve as lowermost nodes to which information processing apparatuses correspond, to a top node in a key tree having a hierarchical structure. Each information processing apparatus stores the node keys as a device specific key and a group key. Details of the configuration of the keys will be described later.

In the case of decrypting the encryption code included in the content code, the secure VM 160 selects, as node keys, a device specific key, a group key common to a group of a plurality of devices, a model key, or a version key from the memory b 161 and then performs decryption processing on the content code by applying the selected key. In addition, details of the encryption keys stored in the memory b 161 and details of execution of the secure VM 160 will be described later.

Information transmission or processing request between the reproduction (player) application 150 and the secure VM 160 is performed by sequences of interrupt (INTRP) of the reproduction (player) application 150 with respect to the secure VM 160 and response (Call) processing of the secure VM 160 with respect to the reproduction (player) application 150. The Information transmission or the processing request is performed by sequences of the interrupt (INTRP) of the application 150 with respect to the secure VM 160 and the response (Call) processing of the secure VM 160 with respect to the reproduction (player) application 150.

Next, a main process executed by the host 140 will be described. Prior to using contents, mutual authentication between the drive 120 and the host 140 is executed. If it is confirmed that the drive 120 and the host 140 are valid by the mutual authentication, encrypted contents are transmitted from the drive to the host. Then, in the host, decryption processing on contents is executed and data conversion processing using the above-described conversion table is executed, and thus contents reproduction is performed.

A data processing unit 121 of the drive 120 performs authentication processing between the drive 120 and the host executed when using contents, reading of data from an information recording medium, a process of transmitting data to the host, and the like.

The reproduction (player) application 150 of the host 140 is a data reproduction (or record) application executed in an information processing apparatus, such as a PC, and executes processing using hardware of an information processing apparatus, such as a PC, according to predetermined data processing sequences.

The host 140 includes a data processing unit 151 that performs data transmission control or mutual authentication processing between the host 140 and the drive 120, a decryption processing unit 153 that performs decryption processing on encrypted contents, a data conversion processing unit 154 that performs data conversion processing based on data registered in the conversion table 106, and a decode processing unit 155 that performs decode (for example, MPEG decode) processing.

In the decryption processing unit 153, a variety of information stored in a memory a 156 and data read from the information recording medium 100 are applied, keys to be applied for decryption of contents are created, and decryption processing on the encrypted contents 101 is executed. The data conversion processing unit 154 performs replace processing (overwriting) with respect to data of contents by applying conversion data, which is registered in a conversion table acquired from the information recording medium 100, according to a data conversion processing program acquired from the information recording medium 100. The decode processing unit 155 performs decode (for example, MPEG decode) processing.

A device key (Kd), key information applied for mutual authentication processing, or key information applied for decryption are stored in the memory a 156 of the information processing apparatus 150. In addition, details of decryption processing of contents will be described later. The device key (Kd) is a key applied in the processing of the above-described MKB. The MKB is a key information block that allows a media key [Km], which is a key necessary for decryption of contents, to be acquired only by processing (decryption) based on the device key [Kd] stored in an information processing apparatus of a user having an effective license. At the time of decryption of encrypted contents, the information processing apparatus 150 performs processing on the MKB by applying the device key (Kd) stored in the memory a 156. In addition, details of decryption processing of contents will be described later.

[2. Contents Management Unit (CPS Unit)]

As described above, as for contents stored in an information recording medium, the contents are encrypted in a condition in which different keys are assigned for respective units and are then stored, in order to realize different use control with respect to the respective units. That is, contents are divided into contents management units (CPS units), and separate encryption processing is performed on each of the contents management units (CPS units) such that separate utilization management is realized.

In order to use contents, first, it is necessary to acquire a CPS unit key (also called a title key) assigned for each unit. In addition, data processing based on predetermined decryption processing sequence is executed by applying other necessary keys and information for key creation, thereby performing reproduction. Hereinafter, setting of the contents management unit (CPS unit) will be described with reference to FIG. 2.

Figure 2:
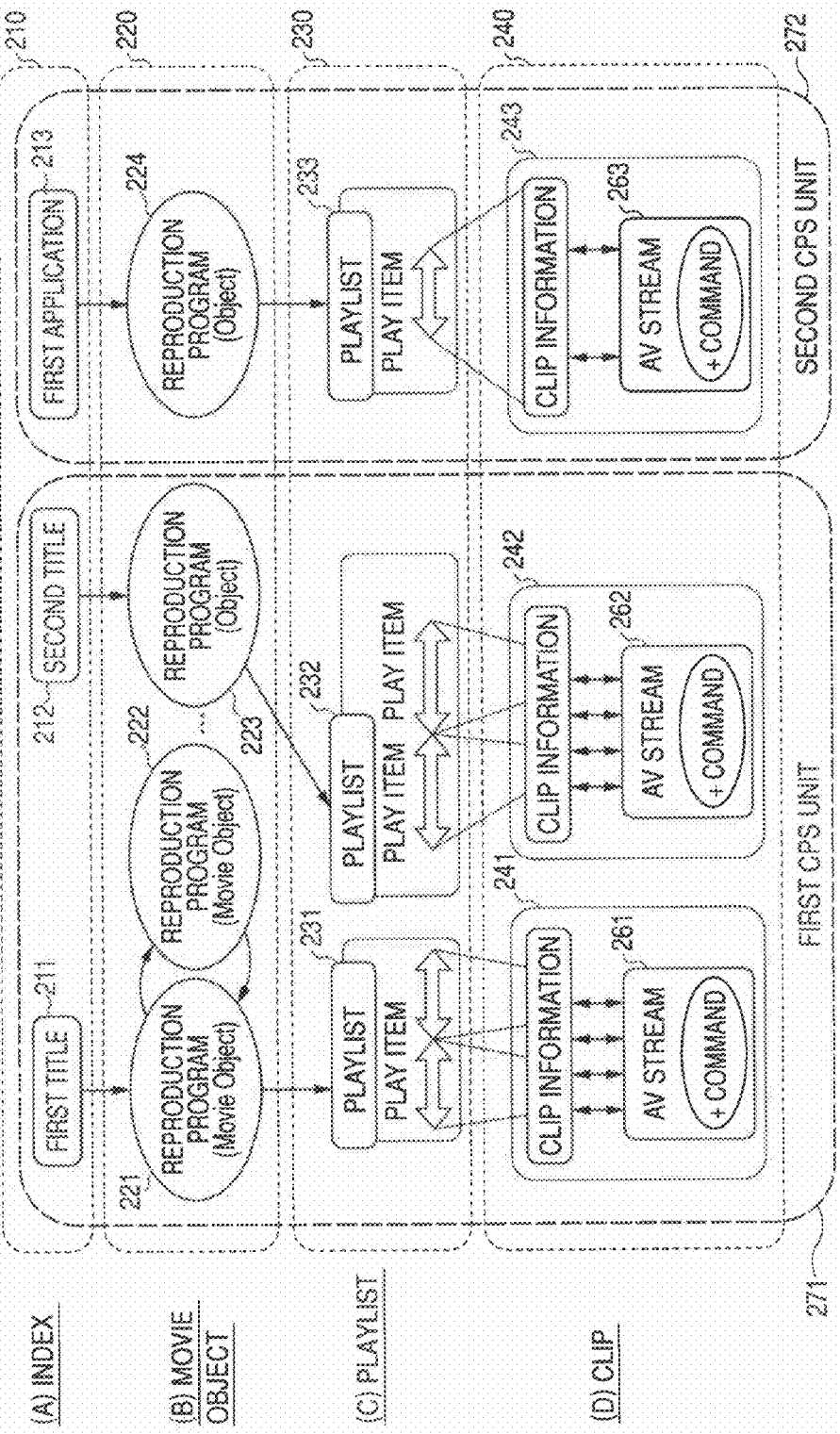
FIG. 2 is a view explaining a setting example of a contents management unit set with respect to storage contents of an information recording medium.

As shown in FIG. 2, contents have a hierarchical structure of (A) index 210, (B) movie object 220, (C) playlist 230, and (D) clip 240. When specifying an index, such as a title, accessed by a reproduction application, for example, a reproduction program related to the title is specified, and a playlist that specifies, for example, the order of reproduction of contents according to program information of the specified reproduction program is selected.

The playlist includes play items as data information to be reproduced. AV stream or command as actual contents data is selectively read out by clip information of a reproduction section specified by play items included in the playlist, such that reproduction of the AV stream and execution of the command are performed. In addition, there exist a plurality of play lists and a plurality of play items, and a playlist ID and a play item ID serving as identification information correspond to each of the play lists and each of the play items.

FIG. 2 illustrates two CPS units. These CPS units form a part of contents stored in an information recording medium. First contents unit 271 and second contents unit 272 each is a CPS unit set as a unit including a title as an index, a movie object as a reproduction program file, a playlist, and an Av stream file as actual contents data.

The first contents management unit (CPS unit) 271 includes a first title 211 and a second title 212, reproduction programs 221 and 222, play lists 231 and 232, and clips 241 and 242. AV stream data files 261 and 262, which are actual data of contents included in the two clips 241 and 242, are at least data to be encrypted and are set as data encrypted by applying a title key (Kt1; also called a CPS unit key), which is an encryption key set corresponding to the first contents management unit (CPS unit) 271, in principle.

The second contents management unit (CPS unit) 272 includes, as an index, a first application 213, a reproduction program 224, a play lists 233, and a clip 243. An AV stream data file 263, which is actual data of contents included in the clip 243, is encrypted by applying a title key (Kt2), which is an encryption key set corresponding to the second contents management unit (CPS unit) 272.

For example, in order for a user to execute contents reproduction processing or an application file corresponding to the first contents management unit 271, it is necessary to acquire the title key Kt1, which is an encryption key set corresponding to the first contents management unit (CPS unit) 271, so as to execute decryption processing. In order to execute contents reproduction processing or an application file corresponding to the second contents management unit 272, it is necessary to acquire the title key Kt2, which is an encryption key set corresponding to the second contents management unit (CPS unit) 272, so as to execute decryption processing.

Figure 3:
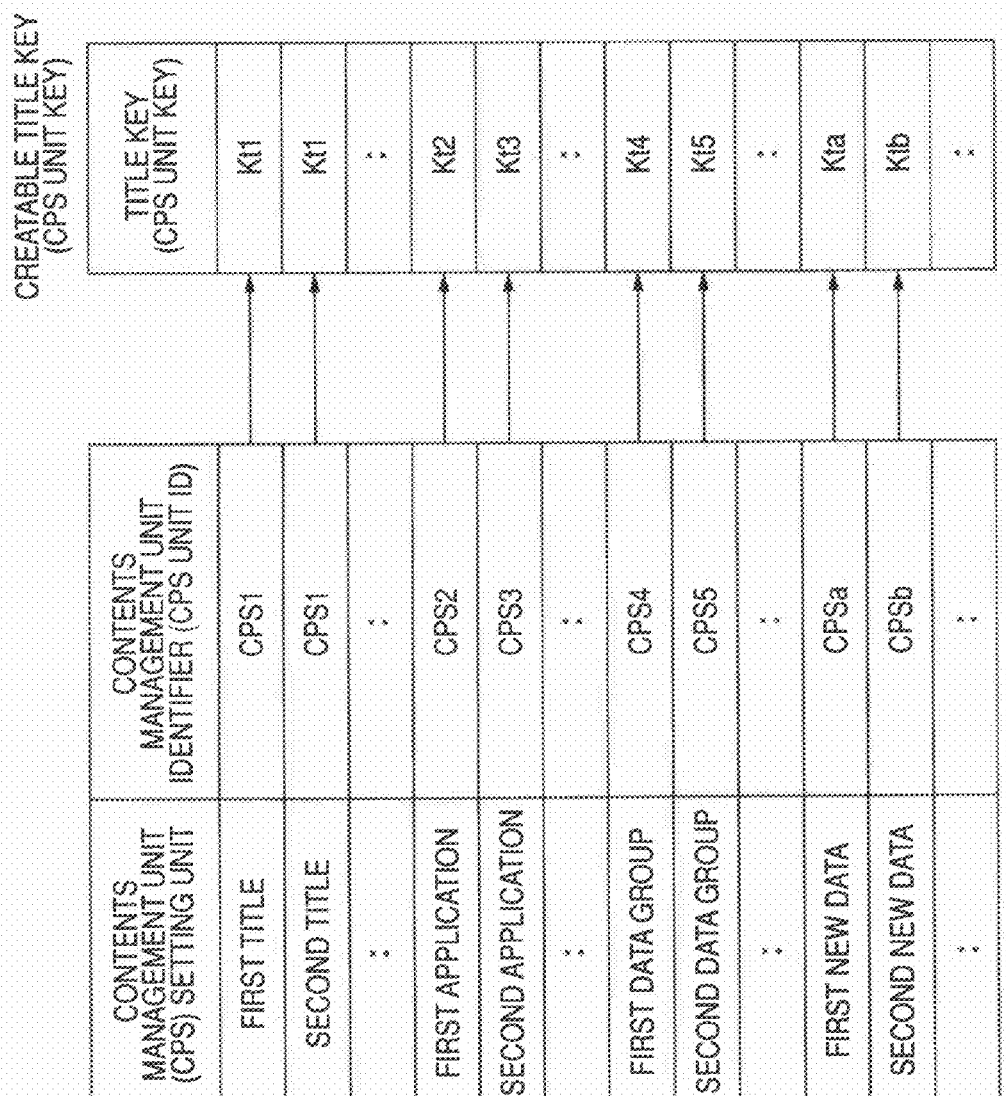
FIG. 3 is a view explaining the correspondence between unit keys and a contents management unit set with respect to storage contents of an information recording medium.

Setting configuration of the CPS unit and a correspondence example of a title key are shown in FIG. 3. FIG. 3 illustrates the correspondence between a CPS unit setting unit, which serves as a use management unit of encrypted contents stored in an information recording medium, and a title key (CPS unit key) applied to each CPS unit. In addition, it is possible to set such that CPS units and title keys for subsequent data are stored beforehand. For example, a data unit 281 is an entry for subsequent data.

There are various CPS unit setting units including a title of contents, application, and a data group. In addition, CPS unit IDs are set as identifiers corresponding to respective CPS units in a CPS unit management table.

Referring to FIG. 3, for example, a first title is a first CPS unit. At the time of decryption of encrypted contents belonging to the first CPS unit 1, it is necessary to create a title key Kt1 and to execute decryption processing based on the created title key Kt1.

As described above, the contents stored in the information recording medium 100 are encrypted in a condition in which different keys are assigned for respective units and are then stored, in order to realize different use control with respect to the respective units. For separate use management with respect to each contents management unit (CPS unit), use permission information (UR: use rule) is set. As described above, the use permission information is information including, for example, copy and reproduction control information (CCI) with respect to contents and is copy limitation information or reproduction limitation information of encrypted contents included in each contents management unit (CPS unit).

Moreover, data processing in which a variety of information stored in an information recording medium is applied is needed to create a title key. A specific example of the processing will be described in detail later.

[3. Data Structure of Contents Including Modified Data and Outline of Data Conversion Processing]

Next, data structure of contents including modified data and an outline of data conversion processing will be described. As described above, in the encrypted contents 101 included in the information recording medium 100, apart of data included in the encrypted contents 101 is set as broken data replaced by data different from correct contents data. Accordingly, since the correct contents are not reproduced with only decryption processing, a process of replacing the broken data with conversion data registered in a conversion table is necessary to execute the reproduction.

Figure 4:
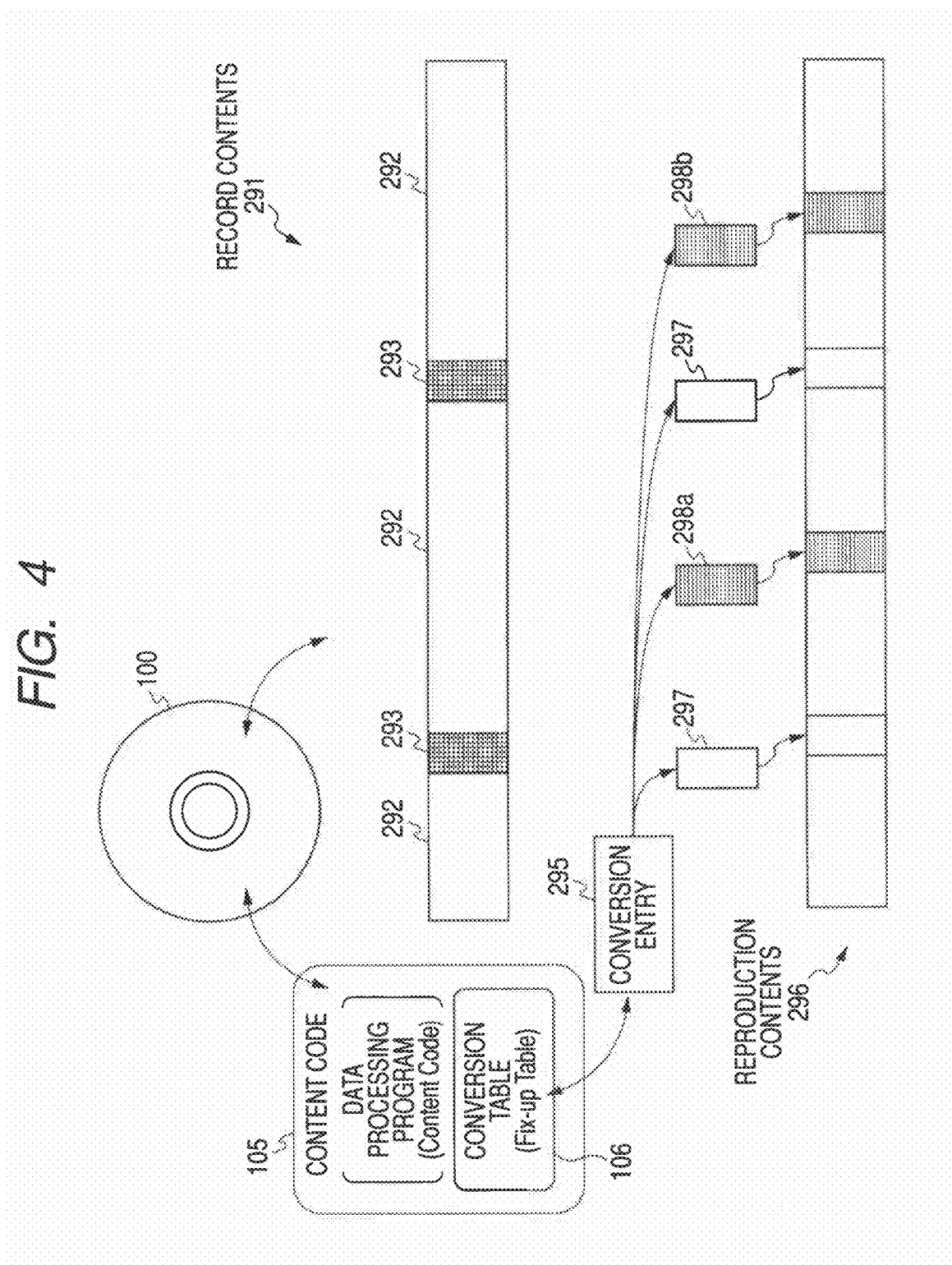
FIG. 4 is a view explaining contents recorded in an information recording medium and data conversion processing required in reproduction of contents.

Referring to FIG. 4, the configuration of contents stored in an information recording medium and an outline of reproduction processing will be described. AV (audio visual) contents, such as a movie, are stored in the information recording medium 100. It will be described later about specific contents reproduction processing in which these contents are encrypted and the contents are decrypted by a process applying an encryption key that can be acquired in only a reproduction apparatus having a predetermined license, and thus the contents can be reproduced. The contents stored in the information recording medium 100 are encrypted and has a configuration in which data of contents is replaced with modified data.

FIG. 4 illustrates an example of the configuration of record contents 291 stored in the information recording medium 100. The record contents 291 includes normal contents data 292, which is not modified, and broken data 293, which is contents broken due to modification. The broken data 293 is obtained by breaking original content by means of data processing. Accordingly, when the contents 291 including the broken data are applied, normal contents reproduction cannot be executed.

In order to execute the contents reproduction, it is necessary to create reproduced contents 296 by performing a process of replacing the broken data 293 included in the record contents 291 with normal contents data. Data (conversion data) for conversion as normal contents data corresponding to each broken data region is reproduced by acquiring conversion data from a conversion entry 295 registered in a conversion table (FUT (Fix-Up Table)) 106 (refer to FIG. 1) within the content code 105 recorded in the information recording medium 100, performing a process of replacing data in the broken data region, and creating the reproduced contents 296.

Further, when creating the reproduced contents 296, there are performed a process of replacing the broken data 293 with conversion data 297 serving as normal contents data and a process of replacing a partial region of the record contents 291 with identifier set conversion data 298 including data (forensic mark) that allows bits of identification information (for example, a device ID, a model ID, or a version ID), by which a contents reproduction apparatus or a contents reproduction application can be identified, to be analyzed. For example, in the case when illegally copied contents are leaked, it is possible to specify a cause of the leakage of illegal contents by analyzing the identifier set conversion data 298 in the leaked contents.

Further, conversion entries as data included in a conversion table including conversion data may be distributed over specific packets among data of contents so as to be repeatedly recorded. That is, the conversion data is stored in the conversion table 106 shown in FIG. 1 and is also recorded in the encrypted contents 101 so as to be distributed. Thus, the conversion data is repeatedly recorded. An information processing apparatus that executes contents reproduction either acquires conversion data stored in the conversion table 106 so as to execute data replacement or acquires conversion entries recorded in contents in a distribution manner so as to execute data replacement.

[4. Contents Reproduction Processing]

Figure 5:
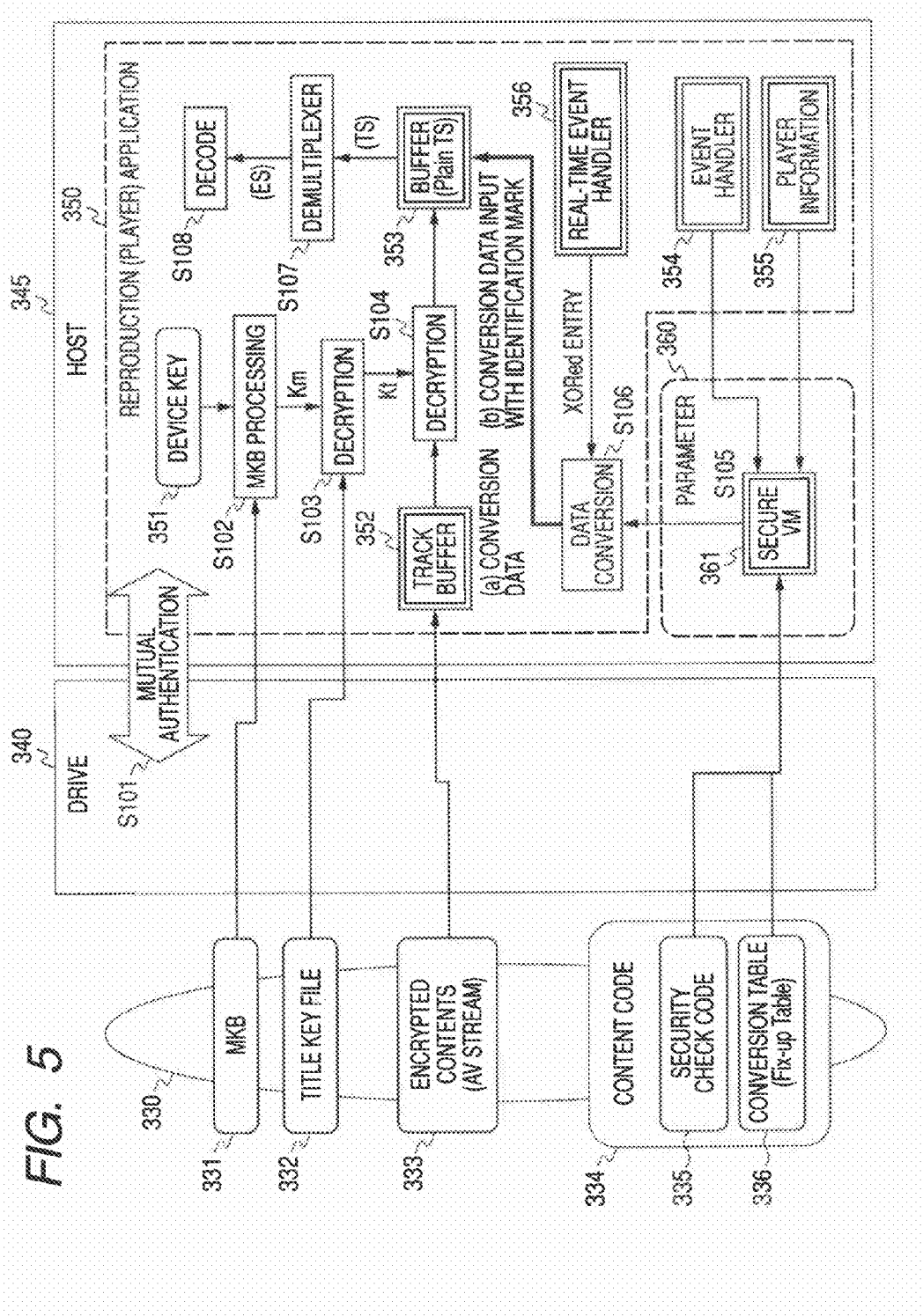
FIG. 5 is a view explaining an example of contents reproduction processing.

Next, contents reproduction processing executed by a host will be described with reference to FIG. 5. Referring to FIG. 5, an information recording medium 330 that stores encrypted contents, a drive 340 on which the information recording medium 330 is set and which executes reading of data, and a host 345 which is connected to the drive so as to perform data communication with the drive and which acquires the contents stored in the information recording medium 330 through the drive 340 and then executes a reproduction application that executes reproduction processing are shown in the order from the left side.

Furthermore, in the host 345 shown in FIG. 5, a reproduction (player) application block 350 and a secure VM block 360 having a secure VM 361 are shown to be separated from each other. In the reproduction (player) application block 350, decryption and decode of contents, data conversion processing, and the like are executed. The secure VM 361 executes apparatus check based on an apparatus check processing program included in a content code recorded in the information recording medium, that is, a process of specifying an apparatus using a device identifier, a model identifier, or a version identifier, and parameter calculation processing applied to security check processing based on a security check code and conversion processing based on a conversion table.

The information recording medium 330 includes an MKB (media key block) 331, a title key file 332, encrypted contents 333, and a content code 334 as record data. First, the encrypted contents 333 are contents of which apart needs to be replaced with data acquired from a conversion table, as described earlier with reference to FIG. 4.

The content code 334 includes a security check code 335 having a program for verifying the validity of a player (reproduction apparatus) that performs reproduction of contents and a conversion table (Fix-up Table) 336 in which conversion data corresponding to replacement data in a predetermined region of contents is registered. The host 345 holds a device key 351 applied in processing of MKB.

Hereinafter, it will be described about processing sequences in which the host 345 shown in FIG. 5 acquires contents stored in the information recording medium 330 through the drive 340 and then reproduces the acquired contents. First, prior to reading of the contents stored in the information recording medium 330, the host 345 and the drive 340 perform mutual authentication in step S101. The mutual authentication is a process of checking whether or not the host and the drive are valid apparatuses or application software. A variety of processes may be applied as the mutual authentication processing sequences. By the mutual authentication processing, the drive 340 and the host 345 share a session key (Ks), which serves as a common private key.

After the mutual authentication between the host and the drive is performed to share the session key (Ks) in step S101, in step S102, the reproduction (player) application block 350 of the host 345 acquires the MKB 331 recorded in the information recording medium 330 through the drive and acquires a media key (Km) from the MKB 331 by executing processing of the MKB 331 applying the device key 351 stored in a memory.

As described above, the MKB (media key block) 331 is an encryption key block created on the basis of the tree-structured key distribution method known as a broadcast encryption method. In addition, the MKB (media key block) 331 is a key information block that allows the media key (Km), which is a key necessary for decryption of contents, to be acquired only by processing (decryption) based on a device key (Kd) stored in an apparatus having an effective license.

Then, in step S103, a title key (Kt) is acquired by applying the media key (Km) acquired in the MKB processing in the step S102 and executing decryption of the title key file 332 read out from the information recording medium 330. The title key file 332 stored in the information recording medium 330 is a file including data encrypted by a media key. The title key (Kt) applied for contents decryption can be acquired by processing in which the media key is applied. Furthermore, in the decryption processing in the step S103, for example, AES encryption algorithm is applied.

Then, the reproduction (player) application block 350 of the host 345 reads the encrypted contents 333 that are stored in the information recording medium 330 through the drive 340 and reads a track buffer 352 so as to store contents. Then in step S104, decryption processing on the contents stored in the buffer 352 is performed by applying the title key (Kt), thereby acquiring decrypted contents.

The decrypted contents are stored in a plain sentence TS buffer 353. 'Plain TS' means a plain sentence transport stream that is decrypted. In this case, the decrypted contents stored in the plain sentence TS buffer 353 are contents including the above-described broken data. Accordingly, predetermined data conversion (data replacement by overwriting) should be performed to reproduce the decrypted contents.

In step S105, the secure VM 361 performs a process of creating a parameter and the like necessary for data conversion from the content code 334. Thereafter, in step S106, table restoration and data conversion processing are executed by the control of a real-time event handler 356. By the control of the real-time event handler 356, the reproduction (player) application block 350 outputs a parameter calculation request to the secure VM 361 as the interrupt (INTRP) according to switching of segments of data included in contents, sequentially receives parameters from the secure VM 361, acquires a plain sentence conversion table block by performing decryption or operation of a conversion table block, and acquires conversion entries included in the acquired conversion table block.

In the conversion entries, conversion data, that is, (a) conversion data, (b) identifier set conversion data (forensic mark), and record position specifying information of the conversion data in contents are recorded. In step S106, the reproduction (player) application block 350 executes data conversion processing for recording the conversion data at the specified position as real-time processing parallel to contents reproduction processing or external output processing.

The secure VM 361 creates and outputs, for example, different parameters, which are applied for respective segments as data included in contents, according to a content code. For example, in the case when parameters (SP1, SP2, SP3, ... ) are parameters which are subjected to exclusive logic sum (XOR) operations together with conversion entries corresponding to segments, each of which is a predetermined partial data unit of contents, the table restoration processing in the step S106 is as follows.

[conversion entry 1] (XOR) [SP1],
[conversion entry 2] (XOR) [SP2],
[conversion entry 3] (XOR) [SP3], ...

Conversion entries included in the conversion table block data are acquired by executing the exclusive logic sum operation processes. In addition, in the above expression, [A] (XOR) [B] is assumed to mean an exclusive logic sum operation between A and B.

Thus, the conversion entries included in the contents 333 recorded in an information recording medium are subjected to exclusive logic sum operations with respect to the parameters (SP1, SP2, SP3, ... ) and are then stored. The parameters are subsequently acquired by the secure VM 361 to be output.

In the table restoration and data conversion processing in the step S106, conversion data is acquired from decrypted conversion entries acquired by operation or encryption processing in which the parameters (SP1, SP2, SP3, ... ) are applied, broken data included in the contents is replaced with conversion data which is valid data included in the contents, a data overwriting process of replacing identifier set conversion data with some data of the contents is performed, and data stored in the plain sentence TS buffer 353 is changed to conversion-completed data. The data conversion processing will be schematically explained with reference to FIG. 6.

Figure 6:
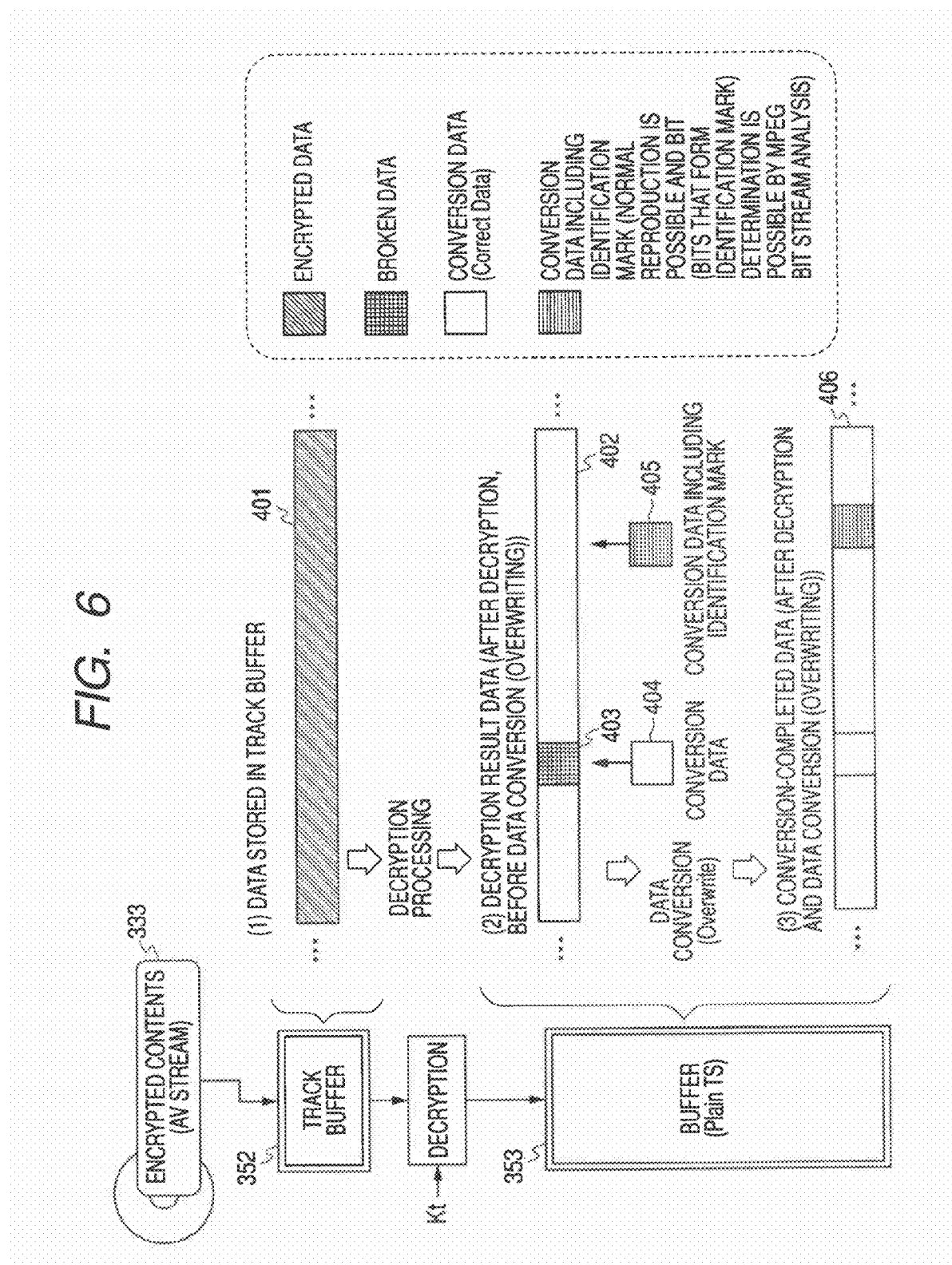
FIG. 6 is a view explaining data conversion processing executed in reproduction of contents.

First, the encrypted contents 333 stored in an information recording medium are stored in the track buffer 352 of a host. (1) track buffer storage data 401 is shown in FIG. 6. Decryption of encrypted contents as track buffer storage data 401 is executed by decryption processing at the host side, and decryption result data is stored in the plain sentence TS buffer 353. (2) decryption result data 402 is shown in FIG. 6.

The decryption result data 402 includes broken data 403 which is not normal data included in contents. A data conversion processing unit of the host executes a process of replacing the broken data 403 with conversion data 404 as correct data included in the contents. The replacement process is performed as a rewriting (overwriting) of some data with respect to data whose recording in the plain sentence TS buffer 353 has been completed, for example.

Furthermore, in the data conversion processing executed by the host, a process of replacing the broken data with the conversion data which is normal contents data, and a process of replacing some of the decryption result data 402 by means of identifier set conversion data 405, as shown in FIG. 6.

As described above, identifiers are data that allows bits of identification information, by which a contents reproduction apparatus or a contents reproduction application can be identified, to be analyzed. Specifically, the identifiers are identification marks created on the basis of data included in identification information (for example, a device ID, a model ID, or a version ID) of an information processing apparatus, which serves as a player that executes a host application, or the IDs, for example. As described above, the identifier set conversion data is data obtained by slightly changing a bit value of correct contents data at a level where reproduction of contents is not affected.

A plurality of identifier set conversion data 405 is set in contents, and a device ID is determined by collectively analyzing the plurality of identifier set conversion data 405, for example. For example, a device ID is set as identification information specific to an information processing apparatus, and the information processing apparatus may be specified by collectively analyzing the identifier set conversion data 405. The identifier set conversion data 405 is data obtained by changing bits that form normal contents data at a level where normal reproduction as contents is possible. In addition, the identifier set conversion data 405 is data whose bits (identification mark forming bits) can be determined by MPEG bit stream analysis.

In the conversion table stored in an information recording medium, a plurality of conversion data 404 and a plurality of setting conversion data 405 shown in FIG. 6 are registered and record position information thereon is also registered. By data conversion processing based on the information stored in the conversion table, the data stored in the plain sentence TS buffer 353 is replaced with (3) conversion-completed data 406 in FIG. 6.

Then, conversion-completed TS (transport stream) is output to the outside through a network or the like and is then reproduced in an external reproduction apparatus. Alternatively, in step S107, conversion from the transport stream (TS) to elementary stream (ES) is performed by processing using a demultiplexer and decode processing (step S108) is performed to be then reproduce through a display speaker.

[5. Processing Applying Security Check Code]

Before starting the contents reproduction processing described above, the secure VM 361 acquires a certificate stored in a memory (memory b 161 shown in FIG. 1) of an information processing apparatus, that is, the device certificate (Device Cert) or a model/version certificate (MV Cert), executes an apparatus checking code included in the content code, that is, a program code for checking of a device or a model or a version, executes a process of checking a device, a model, or a version of a corresponding apparatus, and then selects a proper conversion table or a security check code corresponding to the checked device, model, or version so as to perform the processing. Furthermore, if necessary, the secure VM 361 executes security check applying the security check code 335 even while the contents reproduction processing is being executed.

The secure VM 361 executes a process of verifying the validity of a player (reproduction apparatus) according to the security check code 335 included in the content code 334 under the control of an event handler 354. In addition, as described above, the conversion table (Fix-up Table) 336 or the security check code 335 is set to include various types of codes in order to allow processing according to types of players as a reproduction apparatus to be executed.

The secure VM 361 selects a security check code corresponding to an information processing apparatus, to which the secure VM 361 belongs, from the security check code 335 included in the content code 334 on the basis of apparatus information confirmed by apparatus check processing executed by acquiring various certificates, which serve as player information 355, stored in a storage unit of a reproduction apparatus, that is, the device certificate (Device Cert) or the model/version certificate (MV Cert), and then executes security check processing. That is, a security check code corresponding to identification information or attribute information corresponding to an information processing apparatus is selected and then security check processing based on the selected code is executed.

In the security check of the secure VM 361, if it is verified that the apparatus is a valid apparatus which is permitted to use contents and that illegal output of contents to the outside is not performed on the basis of apparatus information, the reproduction of contents is executed.

Different security check may be requested according to the configuration of a reproduction apparatus and types of applications. Accordingly, a security check code is recorded in a content code as a set of codes corresponding to various apparatuses or applications.

Figure 7:
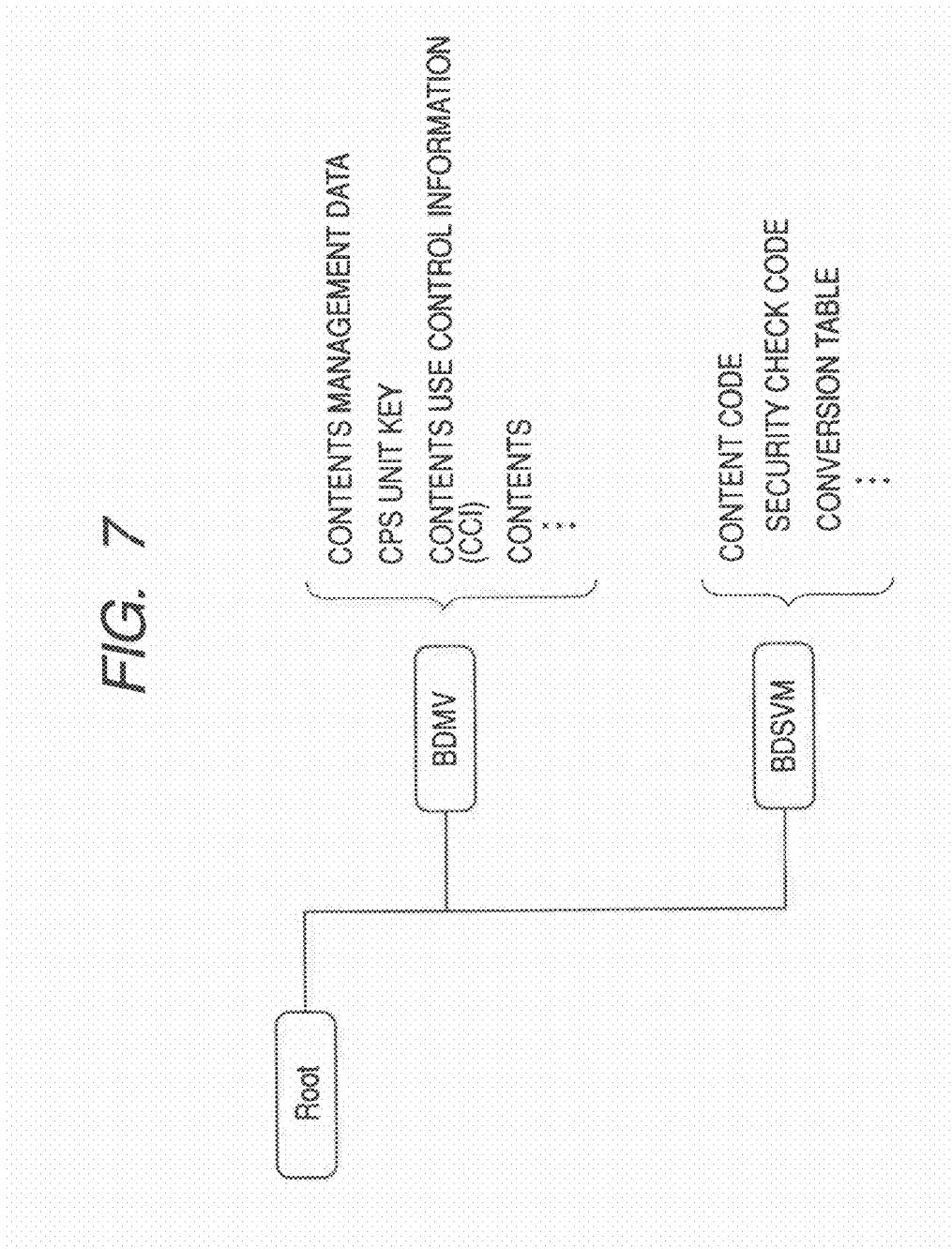
FIG. 7 is a view illustrating the directory configuration of data recorded in an information recording medium.

Next, it will be described about a method of recording a content code in an information recording medium with reference to the drawings. FIG. 7 is a view illustrating the directory configuration of the entire data stored in an information recording medium. Data stored in an information recording medium is largely divided into two data items. One is a BDMV directory in which contents-related data including contents management data, a CPS unit key, contents use control information (CCI), and contents is set, the other is a BDSVM directory in which content codes including a security check code and a conversion table are set.

Detailed examples of the directories will be described with reference to FIGS. 8 and 9. First, in the case of storing contents having the hierarchical structure, which has been explained above with reference to FIG. 2, in an information recording medium, a variety of data or programs, such as a content code, are recorded as separate files, for example, are stored in the information recording medium according to directory setting shown in FIG. 8.

Figure 8:
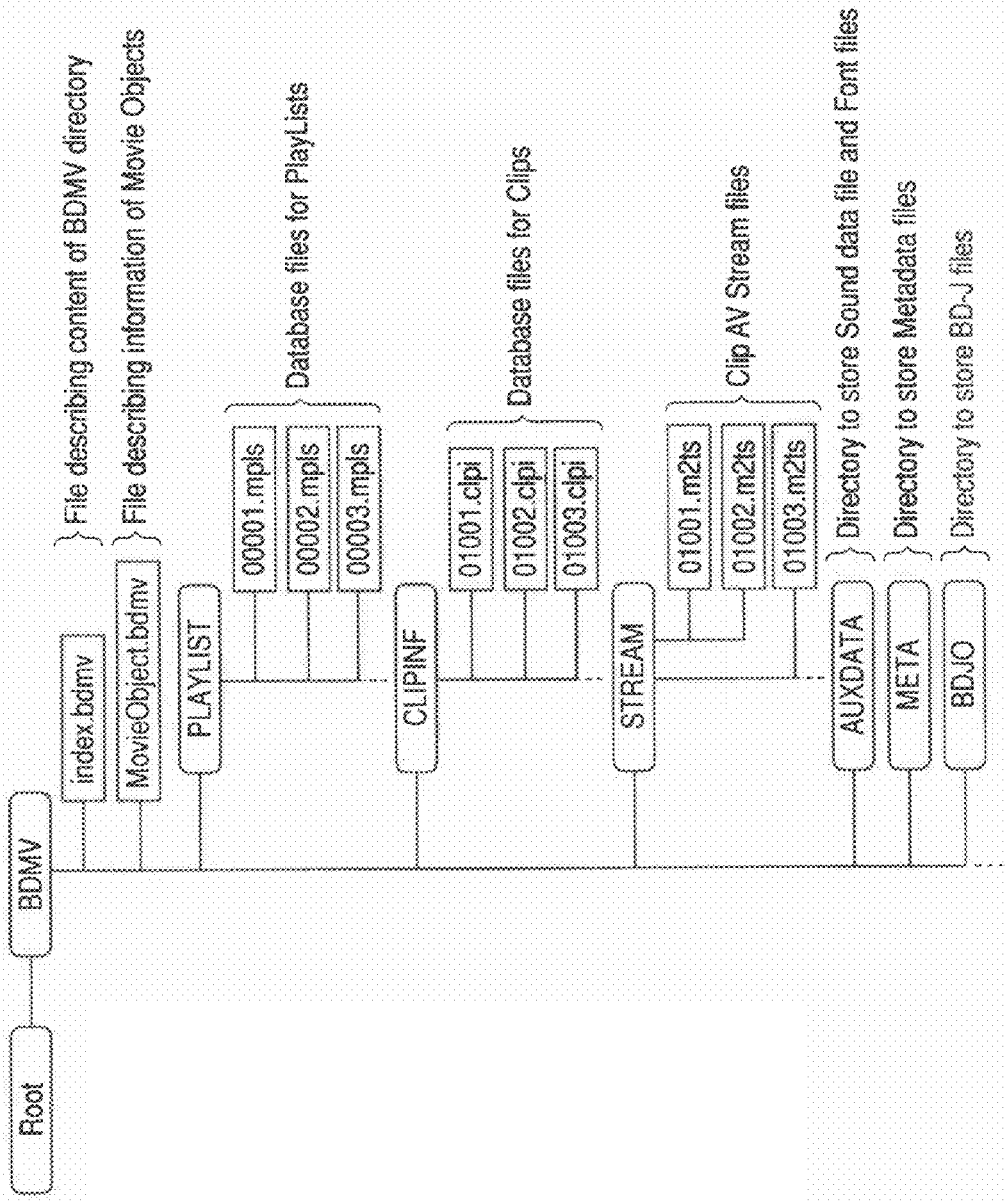
FIG. 8 is a view illustrating the directory configuration of contents, management data, and the like recorded in an information recording medium.

(A) The index 210 in FIG. 2 is index.bdmv file in a directory shown in FIG. 8

(B) The movie object 220 in FIG. 2 is MovieObject.bdmv file in the directory shown in FIG. 8

(C) The playlist 230 in FIG. 2 is files belonging to a PLAYLIST directory in the directory shown in FIG. 8

(D) The clip 240 in FIG. 2 is files belonging to a CLIPINF directory and files belonging to a STREAM directory in the directory shown in FIG. 8, where the files belonging to the CLIPINF directory and the files belonging to the STREAM directory have the same file numbers and correspond to each other as pairs.

(E) Others, for example, an AUXDATA file to store sound data or font data, a META file to store metadata, and a BDJO file to store BD-J objects are stored in the information recording medium.

As described above, a part of data included in contents stored in an information recording medium is set as broken data replaced by data different from correct contents data. Accordingly, since the correct contents are not reproduced with only decryption processing, a process of replacing the broken data with data (conversion data) registered in a conversion table is necessary to execute the reproduction. In the replacement processing, a content code stored in the information recording medium is applied, and data conversion processing based on the data registered in the conversion table (Fix-up Table).

The conversion table and the content code including the security check code are also stored as separate files in the information recording medium. The configuration of a directory in which a content code is set is shown in FIG. 9. FIG. 9 illustrates the directory configuration of a content code created with respect to AV contents having the directory configuration in FIG. 8, for example.

As described above, the content code includes a security check code, a conversion table, and a code for apparatus check. A content code stored in an information recording medium is stored in a plurality of separate files [nnnnn.svm] set in the BDSVM directory, as shown in FIG. 9. In addition, backup data is set as copy data in a BACKUP directory.

Figure 9:
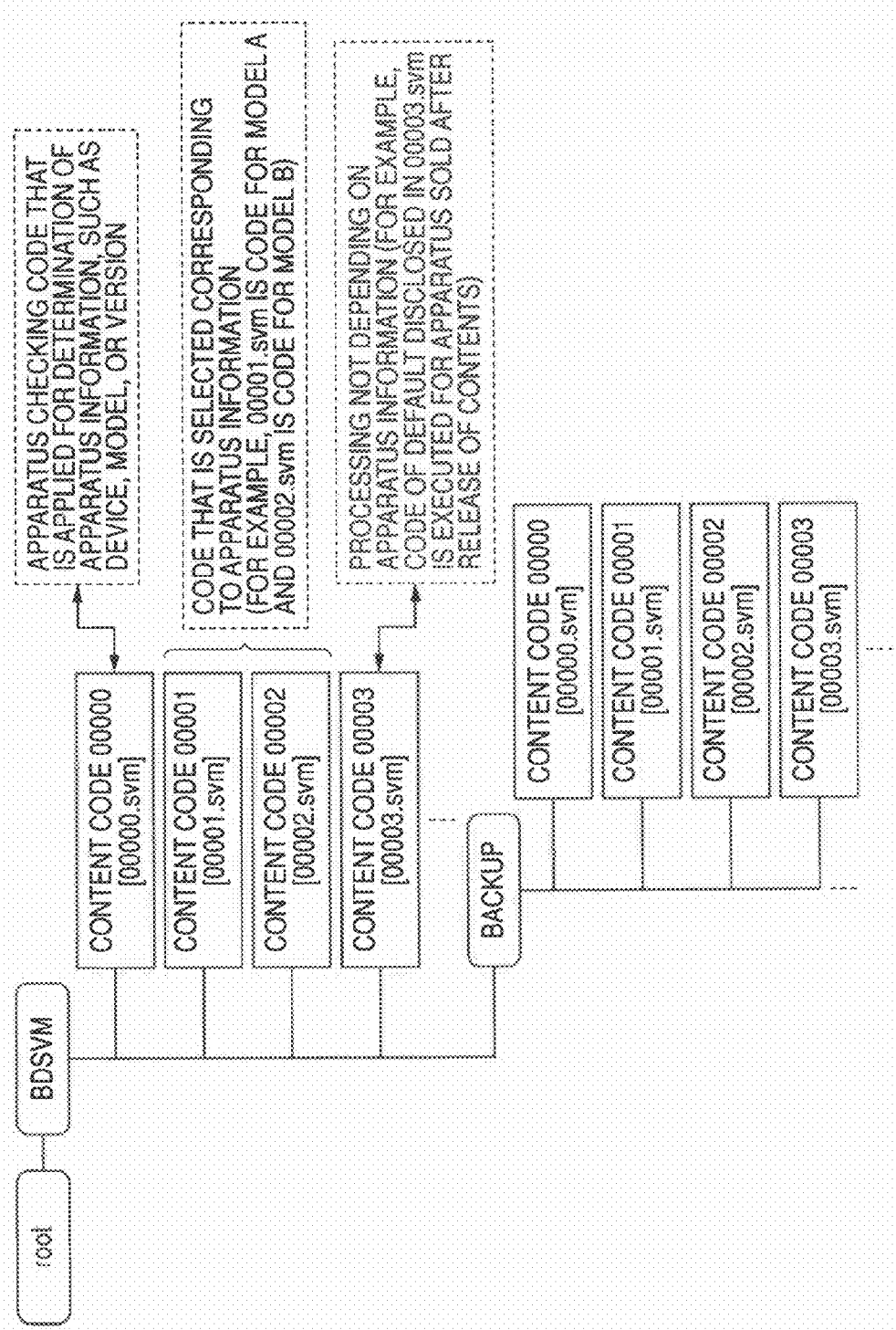
FIG. 9 is a view illustrating the directory configuration of a content code recorded in an information recording medium.

As shown in FIG. 9, content code files include the following types of files.

Content code file [00000.svm]: code applied for determination of device, model, and version information Content code files [00001.svm] and [00002.svm]: code selected according to apparatus information (for example, 00001.svm is a code for model A and 00002.svm is a code for model B)

Content code file [00003.svm]: processing not depending on apparatus information (for example, a code of default disclosed in 00003.svm is executed for an apparatus sold after release of contents.

For example, the content code files are classified into the following categories of (a) to (d).

(a) Content code common to all contents and all devices (b) Content code specific to contents (c) Content code specific to a device, a model, or a version (d) Content code specific to contents and apparatus (for example, device, model, or version)

A code executed for apparatus checking process, that is, an apparatus checking code, which is a code applied to check a device, a model, and a version corresponding to an information processing apparatus that desires to execute contents reproduction on the basis of each identification information, is set as a content code common to all contents and all devices.

The information processing apparatus executes a process of checking the model, the version, or the device by applying the code. On the basis of apparatus information obtained as a result of the check, the information processing apparatus performs security check processing based on a security check code corresponding to the information processing apparatus from each code of the above (a) to (d), and contents reproduction including data conversion based on a conversion table corresponding to the information processing apparatus is executed.

In addition, the apparatus checking process for checking identification information including a device, a model, and a version is executed as processing in which a device certificate and a model/version certificate stored in an information processing apparatus are applied. The device certificate and the model/version certificate are used as certificates for checking a right to use contents and are issued by a management entity that performs the management of contents.

An example of data structure of device certificate and model/version certificate will be described with reference to FIGS. 10A and 10B. FIG. 10A illustrates an example of data structure of a device certificate, and FIG. 10B illustrates an example of data structure of a model/version certificate.

As shown in FIG. 10A, the device certificate has data including a device certificate size, a device certificate version, a device manufacturer identifier, a device identifier, signing date, a device public key, and electronic signature.

On the other hand, as shown in FIG. 10B, the model/version certificate has data including a model/version certificate size, a model/version certificate version, a model manufacturer identifier, a model identifier, aversion identifier, a revision identifier, signing date, a device public key, and electronic signature.

The secure VM 361 shown in FIG. 5 executes a process of verifying at least one of the device certificate and the model/version certificate according to a code (program) for apparatus checking process read out from an information recording medium, checks at least one of the model, version, and device after confirming the validity, and then performs processing using a content code, for example, selection of a code applied for security check or selection of a conversion table to be applied according to the checked information.

For example, as specific processing using the device certificate, the secure VM 361 first performs a process of verifying the signature of the device certificate. For example, signature verification is performed by applying a public key of a manage center which is an entity of executing the signature of the device certificate. As the public key of the management center, a public key that is acquired beforehand and is then stored in a memory of an apparatus may be applied. Alternatively, the public key of the management center may be acquired from an information recording medium or a network.

If the validity of the device certificate is not confirmed by the signature verification, proceeding to subsequent contents reproduction including data conversion is stopped. If the validity of the device certificate is confirmed, a security check code corresponding to the device is selected to be executed. Basic information, such as a device manufacturer, can be acquired from the device certificate. In the case of performing processing in the unit of a model or version, an apparatus checking process using the model/version certificate is executed.

The secure VM 361 performs a process of verifying the validity of the device certificate or the model/version certificate. If the validity is confirmed, there is executed a process of acquiring identification information or attribute information corresponding to an information processing apparatus or a contents use application, that is, manufacturer, type, version, or serial number of an apparatus or application from information recorded in the certificate. On the basis of the acquired information, a security check code corresponding to the acquired information is selected and then security check processing based on the selected code is executed. Details of the processing sequences will be described later referring to flow charts.

[6. Configuration of Distribution of Encryption Key to Information Processing Apparatus and Encryption and Use of Content Codes]

As described earlier, the secure VM 361 executes security check processing based on a security check code included in a content code recorded in an information recording medium and parameter calculation processing applied in conversion processing based on a conversion table. In the processing, the secure VM 361 executes an apparatus checking process, in which a device certificate or a model/version certificate is applied, according to the apparatus checking code 108 described with reference to FIG. 1.

The information processing apparatus performs a process of verifying the validity of at least one of the device certificate and the model/version certificate. If the validity is confirmed, the information processing apparatus determines an application that uses an information processing apparatus or contents on the basis of record information of the certificate, selects a security check code corresponding to the determined information, executes security check processing based on the selected code, and calculates parameters necessary for conversion of contents in the data conversion processing in which the conversion table (Fix-up Table) is applied.

In the replacement of data executed according to the conversion table, as described above, conversion applying (a) conversion data and (b) identifier set conversion data (forensic mark) is executed.

The security check using a security check code or the data conversion processing executed according to the conversion table is processing to be executed according to a content code selected on the basis of correct device, model, or version identification information. However, for example, when an unauthorized reproduction apparatus copies the device certificate or the model/version certificate from another apparatus, processing using unauthorized certificate information may be executed. If the apparatus type corresponding to an information processing apparatus, that is, the model, version, or device type of the information processing apparatus is determined on the basis of only verification of the certificate and the security check processing or the data conversion processing based on a content code corresponding to the apparatus is executed, contents maybe used without security check that is basically needed. In addition, the identifier set conversion data (forensic mark) to be originally embedded in contents may become data including apparatus information that is not correct. Even if the contents embedded with unauthorized apparatus information are traced, a problem occurs where an apparatus that has executed illegal processing cannot be traced.

Furthermore, for example, an information processing apparatus, such as a PC, to which very strict security check is requested may copy a device certificate of a reproduction-only apparatus, which permits contents to be used with only loose security check, and store the copied device certificate in the PC. Then, in the PC, an apparatus checking process may be executed by applying the device certificate of the reproduction-only apparatus. As a result, there is a possibility that contents will be used only by executing the loose security check.

Thus, if an information processing apparatus does not provide correct apparatus information (identification information on one of the device, model, and version), contents are illegally used and it becomes difficult to keep track of the illegal use. That is, if incorrect apparatus information is provided, correct security check may not be executed, correct data conversion based on a conversion table may not be executed, and embedding of apparatus information (identification information on one of the device, model, and version) with respect to contents may not be correctly executed. The configuration of preventing such illegal act will now be described.

That is, it will be described about the configuration that even when an apparatus provides unauthorized apparatus information, a correct content code corresponding to each apparatus is selected such that normal security check processing corresponding to an information processing apparatus or reproduction application that uses contents and even in data conversion processing where the above-described conversion table is applied, embedding of correct apparatus information is executed.

In this example, in order to select and execute a correct content code corresponding to an information processing apparatus, a set of specific encryption keys according to specific rules are distributed to each of the plurality of information processing apparatuses that execute reproduction of contents. In addition, at least a part of content code, which is recorded in an information recording medium and is executed by the secure VM, is referred to as encrypted data to which an encryption key distributed to the information processing apparatus is applied. Hereinafter, it will be described about the configuration of distribution of encryption keys and a processing example.

First, the configuration of an encryption key stored in an information processing apparatus will be described with reference to drawings including FIG. 11. A key management center distributes encryption keys to information processing apparatuses, that is, information processing apparatuses that execute reproduction of contents. The key management center holds registered information on destinations to which the encryption keys are to be distributed. A device identifier, a model identifier, and a version identifier correspond to an information processing apparatus. As described above, the device identifier is set as an identifier specific to each information processing apparatus.

The model identifier is set to be common to a plurality of devices (information processing apparatuses) belonging to the same model.

A version identifier is an identifier set for different versions belonging to the same model. For example, assuming that a version 1 of a model A and a version 2 of the model A exist, separate version identifiers are set corresponding to the respective versions.

The key management center holds and manages a registration table in which identifiers of these information processing apparatuses and encryption keys distributed to the information processing apparatuses correspond to each other. On the other hand, the information processing apparatus stores various key data or other certificate data in the memory b 161 described with reference to FIG. 1, the various key data including a device specific key that is a key specific to a device, a group key common to a group of a plurality of devices, a model key corresponding to a specific apparatus model, and a version key corresponding to a specific version of a specific model. The data is distributed to, for example, manufacturers by the key management center and is then recorded in memories when information processing apparatuses are manufactured.

Figure 11:
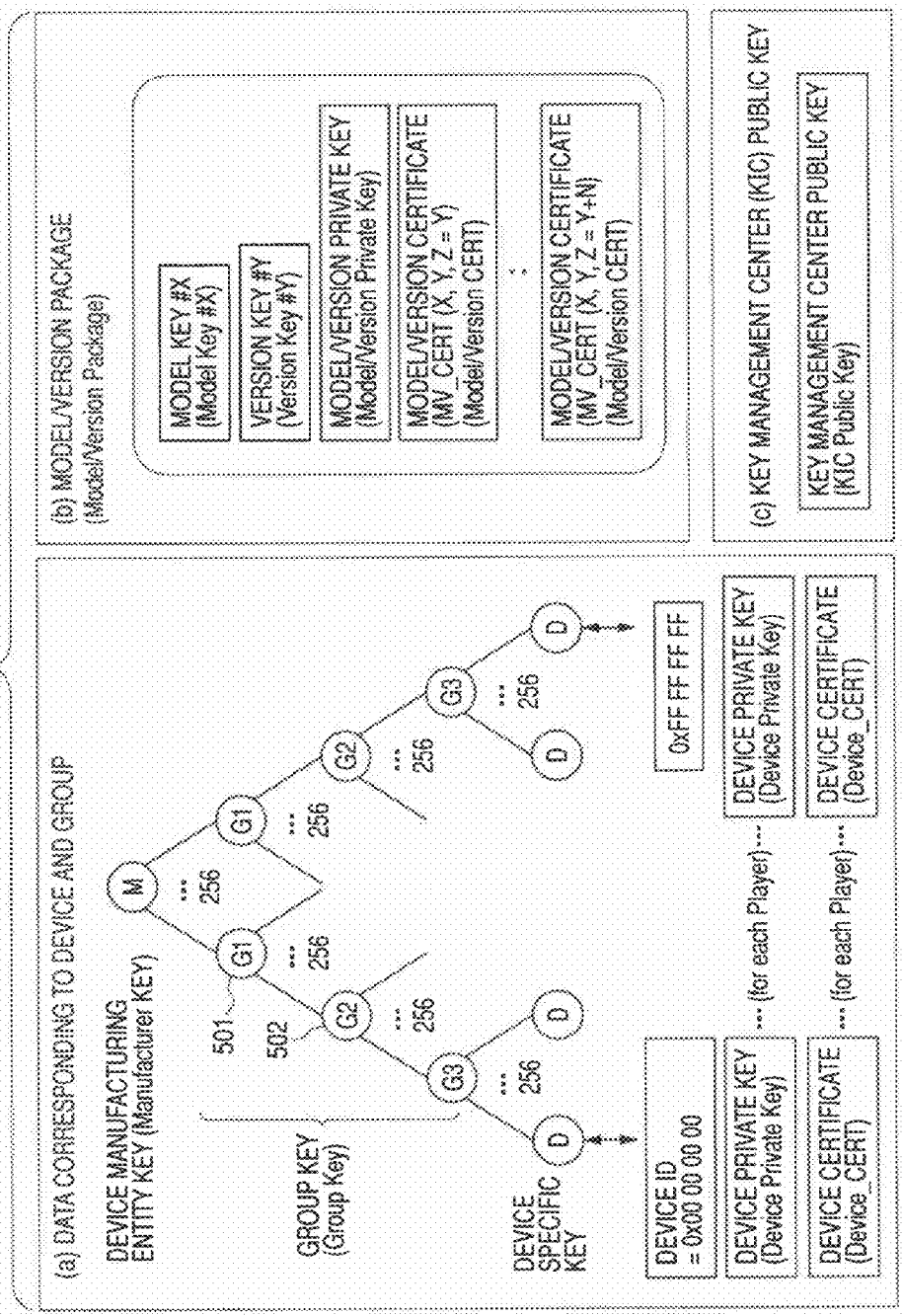
FIG. 11 is a view explaining certificate information and keys distributed to an information processing apparatus.

FIG. 11 is a view explaining a data set including key information that the key management center distributes to information processing apparatuses. The data that the key management center distributes to each of the information processing apparatuses is largely classified into three types of data items as shown in FIG. 11. Specifically, there are (a) data corresponding to device and group, (b) model/version package, and (c) key management center public key. Hereinafter, data corresponding to the categories will be described.

(a) Data Corresponding to Device and Group

A key tree having a key [device manufacturing entity key (Manufacturer key)] as the top is set corresponding to a device manufacturing entity that manufactures an LSI or the like or an information processing apparatus that reproduces contents. From one top or branching point (node), 'N' (n=256 in the example shown in FIG. 11) lower keys are set. For example, keys immediately below the device manufacturing entity key positioned at the top of the key tree serve to classify apparatuses or LSIs manufactured and sold by the device manufacturing entity by groups. G1-1 to G1-256, that is, 256 different group keys G1 are set for each of the groups.

In addition, third-stage keys serve to further classify each of the G1 layers, such that keys of G2-1 to G2-256*256, that is, $256^2$ different group keys G2 are set. Subsequently, at a fourth stage, each of the group G2 is further classified to set $256^3$ different group keys G3. Furthermore, at a fifth stage, $256^4$ different lowermost nodes (leaves) are set. Each of the nodes is assigned for each device and a device specific key [Device_Specific_Key] corresponding to each device is set.

Each device has: a device manufacturing entity key corresponding to a top node; a device specific key, which serves as a key corresponding to one lowermost node (leaf), corresponding to the device; and keys corresponding to nodes on a route from a leaf corresponding to the device to the top node, that is, group keys (keys corresponding to groups G1, G2, and G3).

For example, a group key G1 501 is distributed to left half of devices corresponding to lowermost leaves but is not distributed to right half of the devices corresponding to the lowermost leaves in the hierarchical structure shown in FIG. 11. In addition, a group key G2 502 is distributed to a left quarter of devices corresponding to the lowermost leaves but is not distributed to the other three-quarters of the devices corresponding to the lowermost leaves in the hierarchical structure shown in FIG. 11. Thus, a set of encryption keys distributed to each device is differently set. In addition, each device is assigned with a device private key [Device_Key] and a device certificate [Device_Cert] that is a public key certificate stored with a public key corresponding to the device. The device certificate has the data structure explained above with reference to FIGS. 10A and 10B.

Further, keys that are set with respect to the top node to leaves in the hierarchical structure shown in (a) of FIG. 11 are called group keys and hierarchical keys or node keys. In addition, the example of setting the layer classification is only an example. For example, it is possible to set such that group classification is performed on the basis of licensee, platform, sales territory, or manufacturing date.

The device certificate [Device_Cert], which is a public key certificate stored with a public key corresponding to the device, is stored with a device identifier. Each player has different device identifier (ID). For example, values 0x00000000 to 0xFFFFFFFF are set as device IDs corresponding to respective devices.

(b) Model/Version Package

In the information processing apparatus, data included in a model/version package shown in (b) of FIG. 11 is also stored. The model/version package includes the following data.

(b1) Model key
(b2) Version key
(b3) Model/version private key
(b4) Model/version certificate The model key is key data specific to a model corresponding to an information processing apparatus, and the version key is key data specific to a version corresponding to the information processing apparatus. The model/version private key and the model/version certificate correspond to a private key and a public key certificate stored with a public key in a public key encryption system, respectively. Those are set as key information specific to a model/version corresponding to each information processing apparatus. The model/version certificate stores the data explained above with reference to FIG. 10.

The model/version certificate is configured as a certificate set corresponding to codes of model ID=X, version ID=Y, and revision ID=Z.

If model/version certificates have different values of X, Y, and Z, the model/version certificates are set as different certificates. In addition, the revision ID (Z) is a code updated when updating, for example, firmware or a reproduction application not hardware of the device. When the information processing apparatus executes such firmware update, a model/version certificate that has been updated through a network or an information recording medium as a result of the update is supplied to the information processing apparatus.

As described above, by setting the model key, the version key, and the model/version certificate as well as the device specific key and the device certificate, it is possible to prevent embedding of incorrect identification information when embedding identification information (forensic mark) for specifying an apparatus.

Furthermore, by separately managing the data corresponding to device and group shown in (a) of FIG. 11 and the model/version package shown in (b) of FIG. 11, a manufacturing work may be allotted, for example, such that the data corresponding to device and group, to which different values are set according to LSIs, is embedded by LSI manufacturers and the model/version package is embedded by makers (assemblers) that manufacture information processing apparatuses by assembly of the LSIs and other components.

Accordingly, for example, even if the LSI is common, model or version may change. In this case, since an assembler has only to embed a model key or the like in which different values can be embedded, it is not necessary for the assembler to embed different IDs in respective apparatuses. As a result, a burden of the assembler is alleviated. In addition, even if the model or version has changed, it is possible to use LSIs already purchased from an LSI manufacturer, without modifying the LSIs. For this reason, the data corresponding to device and group shown in (a) of FIG. 11 and the model/version package shown in (b) of FIG. 11 are not always stored in the same physical memory but may be stored in separate memories.

Thus, the group keys (hierarchical keys, node keys) in (a) of FIG. 11 are classification keys set to specify a predetermined device, while the model key and the version key in (b) of FIG. 11 are keys set according to a so-called 'model number' of an information processing apparatus (for example, a reproduction apparatus for reproducing an optical disc). These keys do not necessarily correspond to each other.

(c) Key Management Center Public Key

Further, in the information processing apparatus, a key management center (KIC) public key shown in (c) of FIG. 11 is stored in addition to the above-described data of (a) and (b). The public key is used when the information processing apparatus verifies signature of a key management center granted to a content code, for example.

Figure 12:
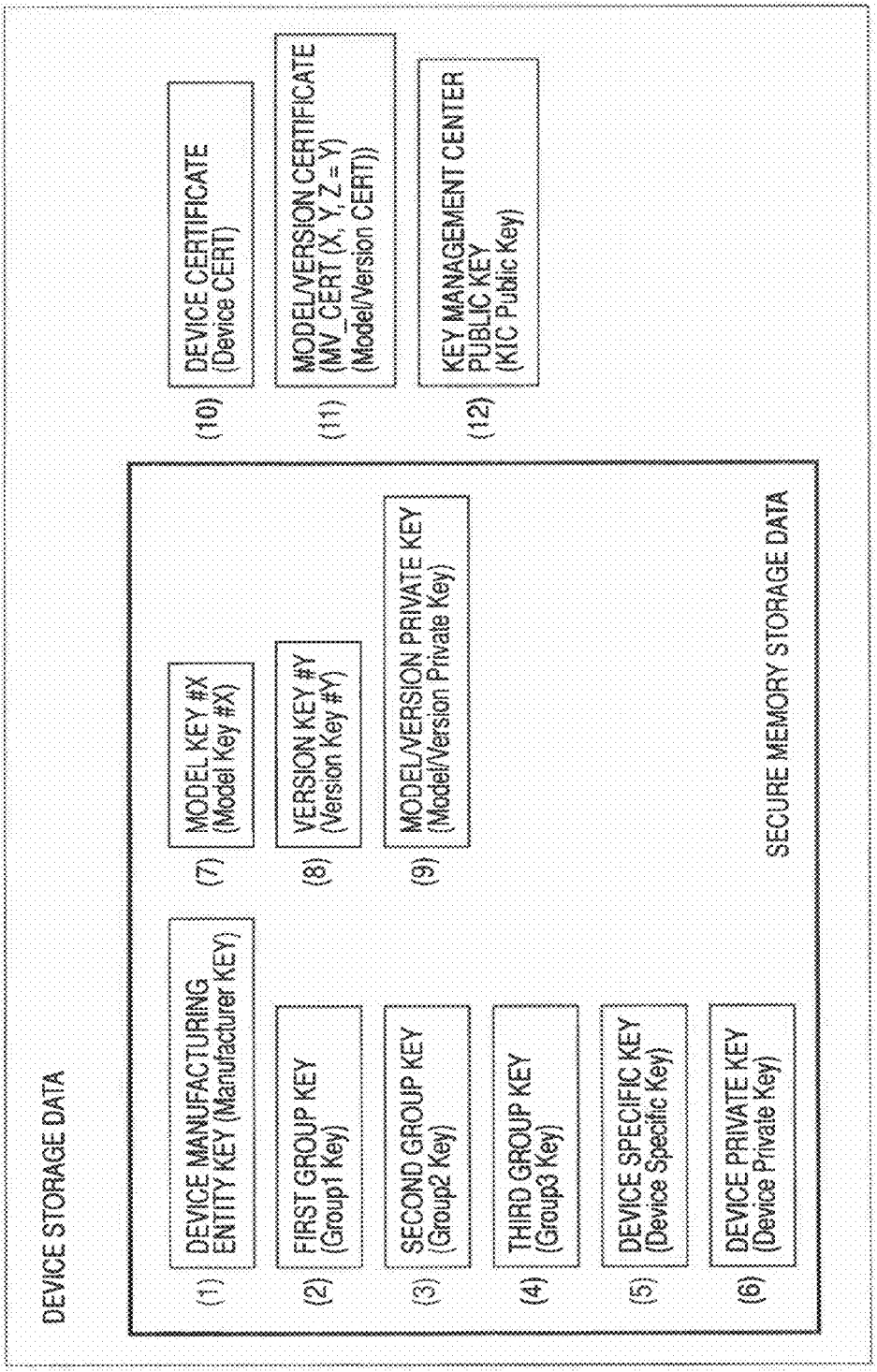
FIG. 12 is a view explaining certificate information and keys stored in an information processing apparatus.

FIG. 12 illustrates the configuration of data stored in a memory of an information processing apparatus. As shown in FIG. 12, an information processing apparatus is stored with the following data of (1) to (12).

(1) Device manufacturing entity key (Manufacturer Key)
(2) First group key (Group1 Key)
(3) Second group key (Group2 Key)
(4) Third group key (Group3 Key)
(5) Device specific key (Device Specific Key)
(6) Device private key (Device Private Key)
(7) Model key #X (Model Key #X)
(8) Version key #Y (Version Key #Y)
(9) Model/version private key (Model/Version Private Key)
(10) Device certificate (Device Cert)
(11) Model/version certificate (MV_CERT(X, Y, Z=Y) (Model/Version CERT))
(12) Key management center public key (KIC Public Key)

Among the above data, data of (1) to (9) except for the device certificate, the model/version certificate, and the key management center public key needs to be privately stored in order to prevent the leakage of the data and is stored in a secure memory. It is not necessary to prevent the leakage of the device certificate, the model/version certificate, and the key management center public key.

Figure 13:
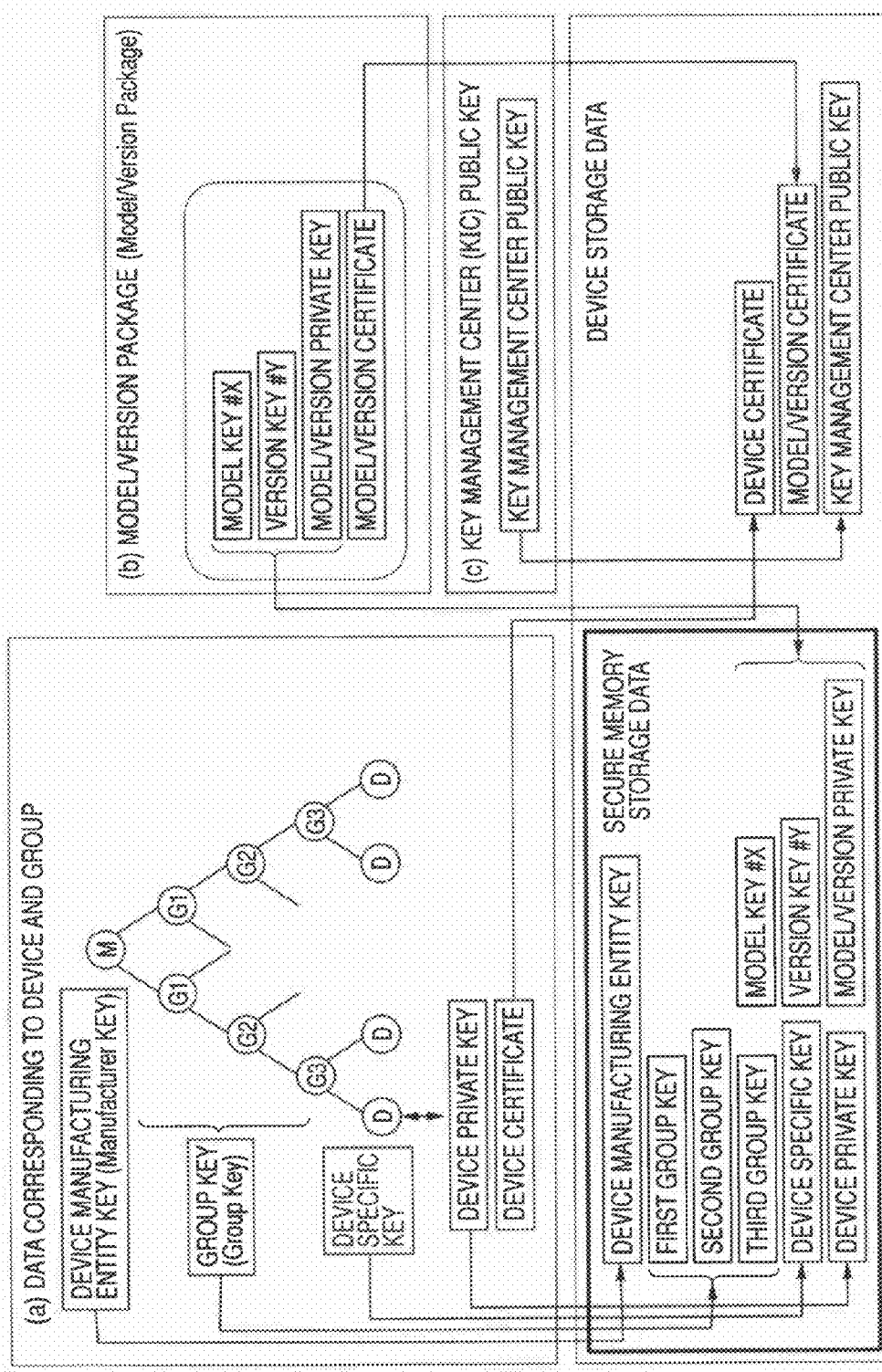
FIG. 13 is a view explaining certificate information and keys distributed to an information processing apparatus.

FIG. 13 illustrates a view explaining the correspondence between distribution data of the key management center explained above with reference to FIG. 11 and storage data of the information processing apparatus explained above with reference to FIG. 12. As shown in FIG. 13, the following data of (1) to (6) is stored, as (a) data corresponding to device and group, in a secure memory.

(1) Device manufacturing entity key (Manufacturer Key)
(2) First group key (Group1 Key)
(3) Second group key (Group2 Key)
(4) Third group key (Group3 Key)
(5) Device specific key (Device Specific Key)
(6) Device private key (Device Private Key)

In addition, the following data of (7) to (9) is stored, as (b) data included in model/version package, in a secure memory.

(7) Model key #X (Model Key #X)
(8) Version key #Y (Version Key #Y)
(9) Model/version private key (Model/Version Private Key)

In addition, the following data of (10) to (12) is stored, as data that does not need to be stored in the secure memory, in a memory of the information processing apparatus.

(10) Device certificate (Device Cert) included in (a) data corresponding to device and group
(11) Model/version certificate (MV_CERT(X, Y, Z=Y) (Model/Version CERT)) included in (b) data included in model/version package
(12) Key management center public key (KIC Public Key) included in (c) Key management center public key These keys and certificate information are initially stored in an information processing apparatus to be provided to a user. In addition, as described above, when updating, for example, firmware or a reproduction application not hardware of the device, a model/version certificate that has been updated through a network or an information recording medium as a result of the update is supplied to the information processing apparatus.

Figure 14:
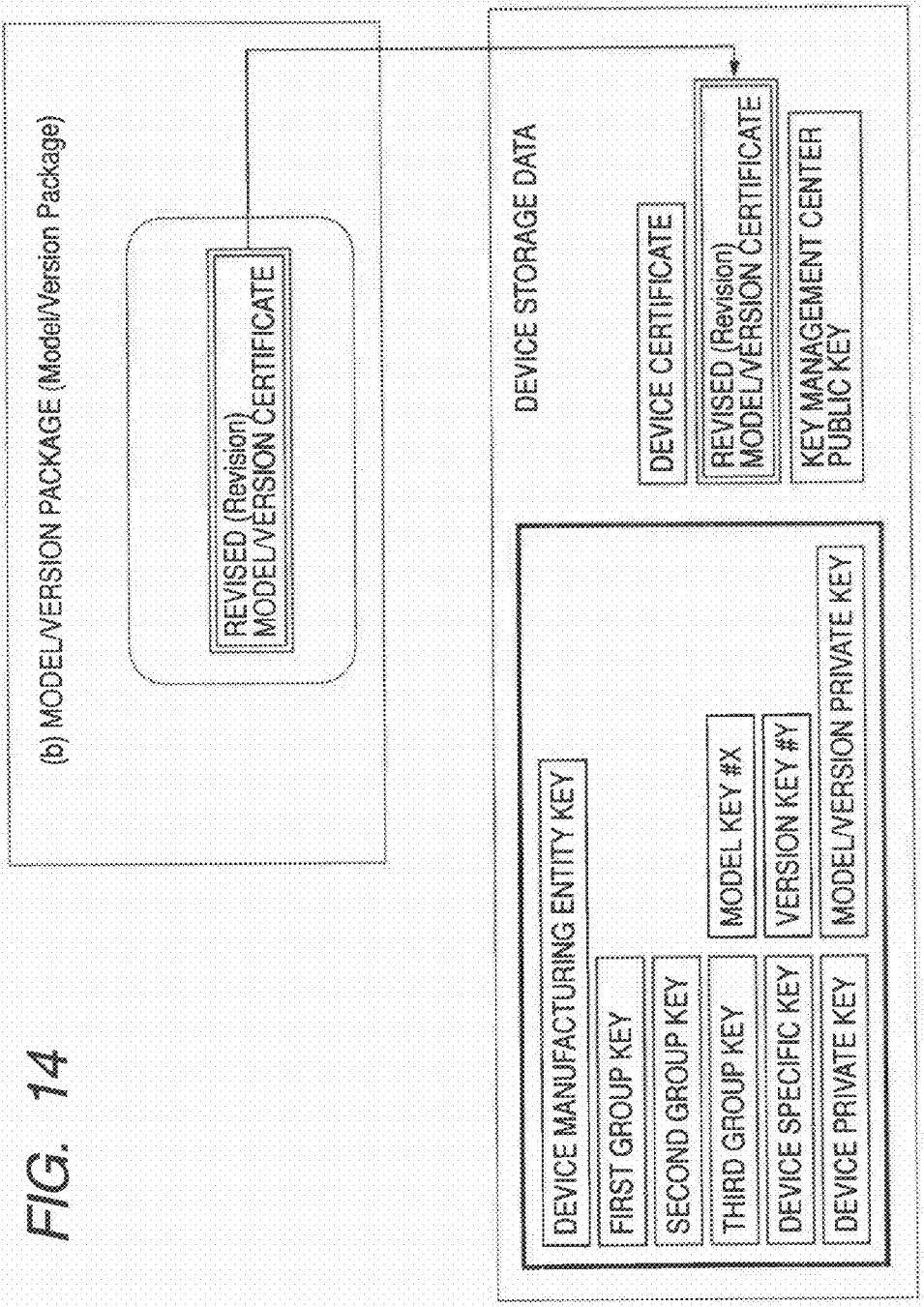
FIG. 14 is a view explaining a process of updating a model/version certificate.

In this case, as shown in FIG. 14, the updated model/version certificate is provided to a user's information processing apparatus through the key management center or a manufacturer. For example, when the updated model/version certificate is recorded in an information recording medium in which contents are stored, the information processing apparatus reads out the contents and then executes replacement of a certificate recorded in the information processing apparatus. Alternatively, the certificate may be replaced with the updated certificate by downloading the certificate through a network, for example.

It is checked whether or not the model/version certificate is an updated certificate by referring to the revision ID (Z) within the certificate (refer to FIGS. 10A and 10B). For example, the revision ID is incremented by (+1) every update. By referring to the revision ID, it is possible to check the updated state of the certificate.

For example, in the case of checking an apparatus using a model/version certificate of an information processing apparatus, the updated state is checked by checking the model/version certificate stored in a memory of the information processing apparatus. According to the updated state, it is possible to accurately execute the selection of a security check code or a conversion table.

Figure 15:
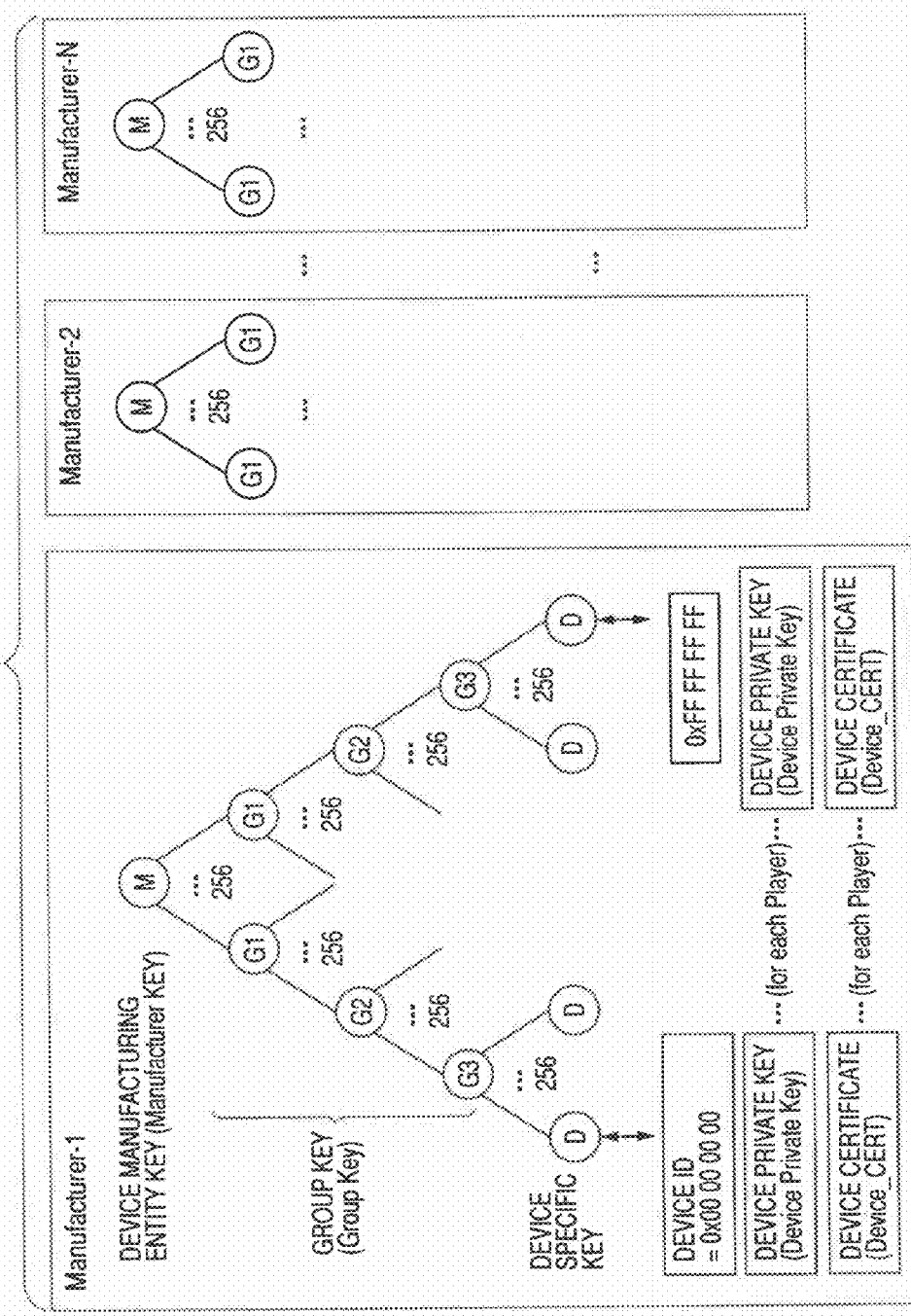
FIG. 15 is a view explaining the configuration of keys of each device manufacturing entity and certificate setting.
Figure 16:
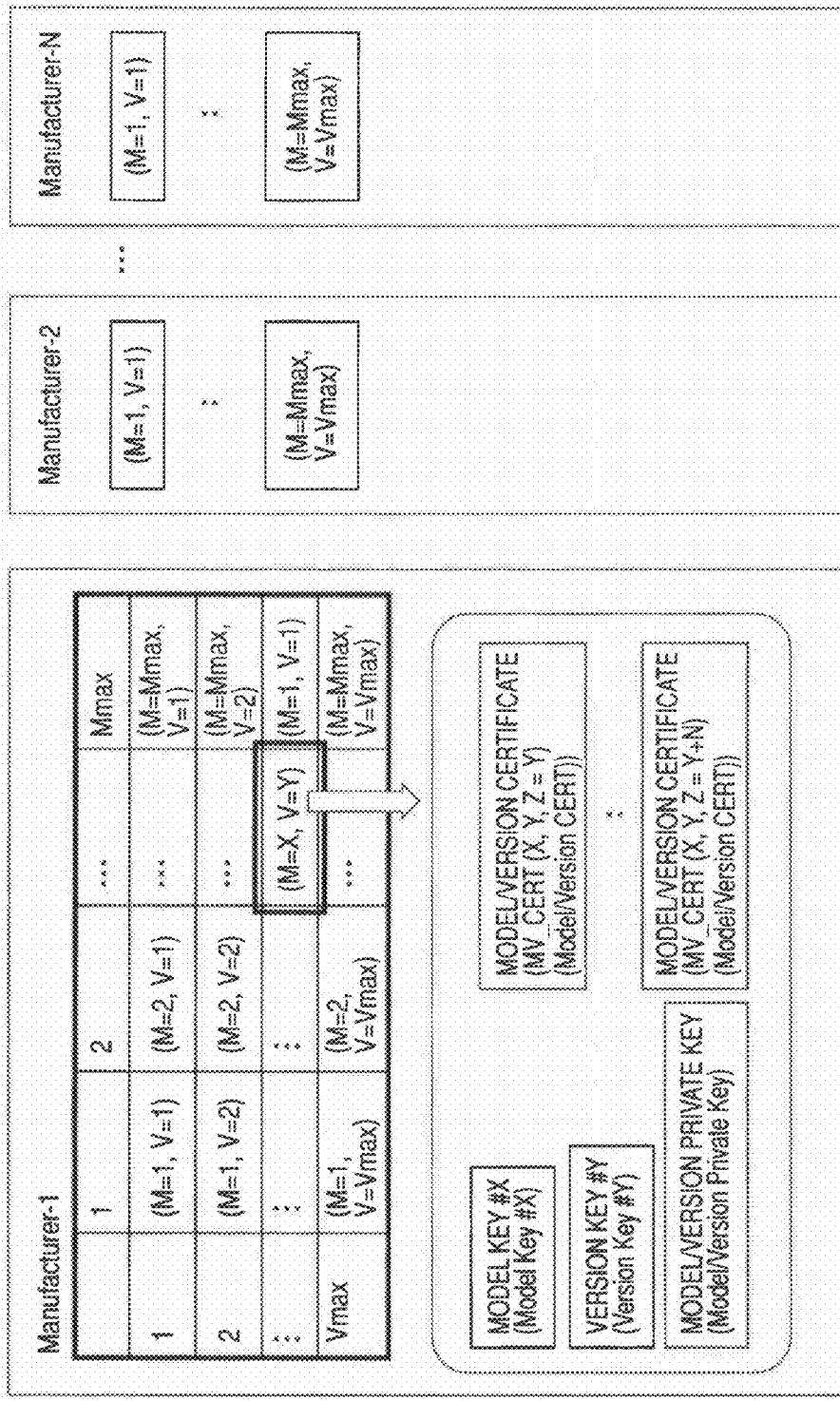
FIG. 16 is a view explaining the configuration of keys of each device manufacturing entity and certificate setting.

(a) data corresponding device and group and (b) model/version package explained above with reference to FIGS. 11 and 13 and the like may be separately set by each of the variety of device manufacturing entities that manufacture information processing apparatuses or LSIs provided in the information processing apparatuses. Referring to FIGS. 15 and 16, it will be described about a configuration example of key data setting of each device manufacturing entity.

FIG. 15 illustrates an example in which each device manufacturing entity separately sets [(a) data corresponding device and group]. For example, the device manufacturing entity includes a manufacturer of a DVD player, a manufacturer of an LSI provided in a DVD player, and a manufacturer of a reproduction software application. Each of the device manufacturing entities defines device IDs corresponding to the predetermined number of devices, such as [0x00000000~0xFFFFFFFF], makes the device IDs correspond to tree-structured leaves, and sets keys and certificates on a route from the leaves to a top node as keys stored in each device. As described above, the keys and certificates on the route includes the following data.

(1) Device manufacturing entity key (Manufacturer Key)
(2) First group key (Group1 Key)
(3) Second group key (Group2 Key)
(4) Third group key (Group3 Key)
(5) Device specific key (Device Specific Key)
(6) Device private key (Device Private Key)
(7) Device certificate (Device Cert)

FIG. 15 illustrates device manufacturing entities (manufacturers) 1 to N. Each of the 'N' device manufacturing entities may set, as data stored in information processing apparatuses, the above data of (1) device manufacturing entity key (Manufacturer Key) to (7) device certificate (Device Cert). In this case, in an information processing apparatus, the data of (1) device manufacturing entity key (Manufacturer Key) to (7) device certificate (Device Cert) is stored in a memory as many as the set number registered as manufacturing entities of the apparatus.

Similarly, each device manufacturing entity may also separately set [(b) model/version package]. FIG. 16 illustrates device manufacturing entities (manufacturers) 1 to N. As shown in FIG. 16, each of the 'N' device manufacturing entities may set [(b) model/version package] as data stored in information processing apparatuses.

As described above, (b) model/version package includes the following data.

(1) Model key #X (Model Key #X)
(2) Version key #Y (Version Key #Y)
(3) Model/version private key (Model/Version Private Key)
(4) Model/version certificate (MV_CERT(X, Y, Z=Y) (Model/Version CERT))

In addition, each device manufacturing entity separately sets a package including the data described above.

As shown by a device manufacturing entity (Manufacturer) 1 in FIG. 16, each device manufacturing entity (Manufacturer) sets model/version packages different according to model (X) and version (Y) of devices manufactured by the device manufacturing entities. A package stored in an information processing apparatus serves as package data corresponding to model/version of the information processing apparatus.

In addition, a plurality of model/version packages, which includes a model/version package provided by an assembler of the information processing apparatus and a model/version package provided by a manufacturer of an LSI provided in the information processing apparatus, may be stored in an information processing apparatus. That is, in an information processing apparatus, a set of separate keys corresponding to a plurality of different device manufacturing entities, such as manufacturers of information processing apparatuses, components manufacturers, or assemblers, are stored in a memory. At the time of decryption of a content code, a secure VM serving as a data processing unit of an information processing apparatus selects a key from a key set corresponding to a device manufacturing entity selected in correspondence with the executed content code and then executes decryption processing on data included in the content code by applying the selected key.

Figure 17:
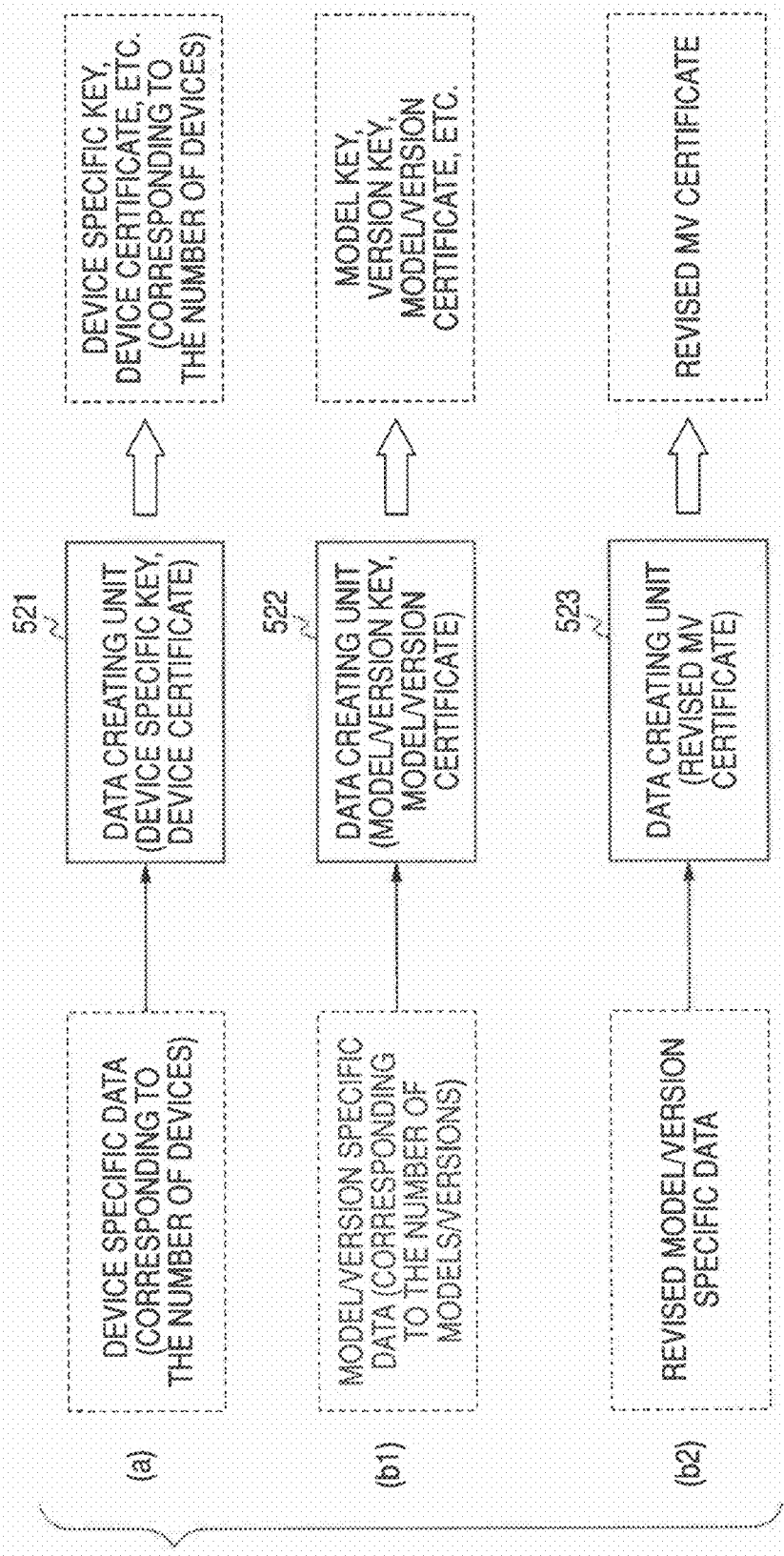
FIG. 17 is a view explaining a process of creating keys and certificates in a key management center.

Further, the key data or certificate data is created by the key management center and is provided to device manufacturing entities. Referring to FIG. 17, it will now be described about a process of creating key data and certificate data in a key management center. FIG. 17 illustrates three types of examples of creating data, which are shown in (a), (b1), and (b2).

(a) of FIG. 17 illustrates an example of creating a data corresponding to device and group. The key management center first creates device specific data corresponding to the number of devices to be manufactured by using, for example, a random number creating process and then causes data processing having the device specific data as input values to be executed by a data creating unit 521, thereby creating device specific keys and creating [(a) data corresponding to device and group] including device certificates and device private keys.

(b1) shows an example of creating (b) model/version package. The key management center first creates specific data corresponding to the number of models/versions to be created by using, for example, the random number creating process and then causes data processing having the specific data as input values to be executed by a data creating unit 522, thereby creating [(b) model/version package] including model keys, version keys, and model/version certificates.

(b2) shows an example of creating updated data of a model/version certificate included in (b) model/version package. The key management center first creates specific data corresponding to an updated model/version by using, for example, the random number creating process and then causes data processing having the specific data as input values to be executed by a data creating unit 523, thereby creating an updated model/version certificate. In addition, the updated model/version certificate has a data structure in which a revision ID obtained by incrementing a revision ID recorded with an updated model/version certificate before update by '1' is recorded. The updated model/version certificate is provided to an information processing apparatus, which is a user apparatus, through a network or an information recording medium, such as a disc, such that a model/version certificate before update, which has been stored in the information processing apparatus, is replaced with the updated model/version certificate.

First, as described earlier with reference to FIG. 1 and the like, a data set including key information that the key management center distributes to information processing apparatuses is largely divided into three types of following (a) to (c).

(a) Data corresponding to device and group
(b) Model/version package
(c) Key management center public key Among (a) to (c), (c) Key management center public key is applied to verify an electronic signature granted to a content code. That is, (c) Key management center public key is used to verify whether or not a content code stored in an information recording medium is an authorized code without alteration.

Figure 18:
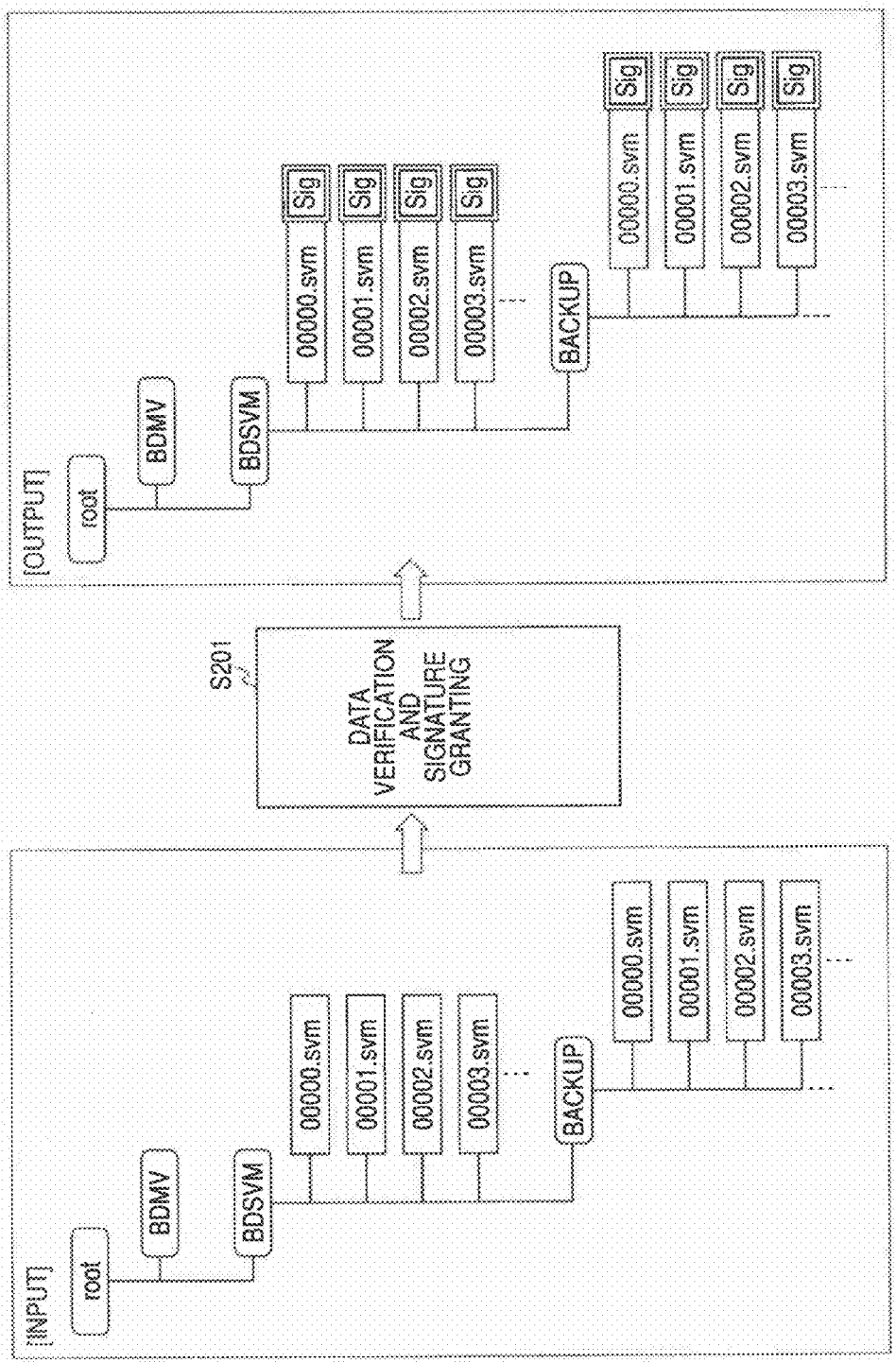
FIG. 18 is a view explaining a process of setting a signature corresponding to a content code in a key management center.

An example of setting an electronic signature with respect to a content code will be described with reference to FIG. 18. Processing step S201 shown in FIG. 18 is executed by a key management center (KIC). The key management center (KIC) inputs a file [000xx.svm] including various content codes, such as an apparatus checking code, a security check code, or a processing code including a conversion table. These codes are files created by various entities, such as contents providers or device manufacturing entities. The key management center (KIC) inputs the content code files, verifies the content code files, and creates and outputs a signature, to which a private key of the key management center (KIC) is applied, with respect to each of the files. In the output, a signature [Sig] is set to each of the content code files.

In the case when an information processing apparatus reads out a content code from an information recording medium and executes a variety of processes, the information processing apparatus first executes a process of verifying an electronic signature granted to the read content code file. The process is executed by applying the key management center public key. Only when the content code is confirmed to be an authorized code without alteration by the verification, a process applying the content code included in the file is executed.

Figure 19:
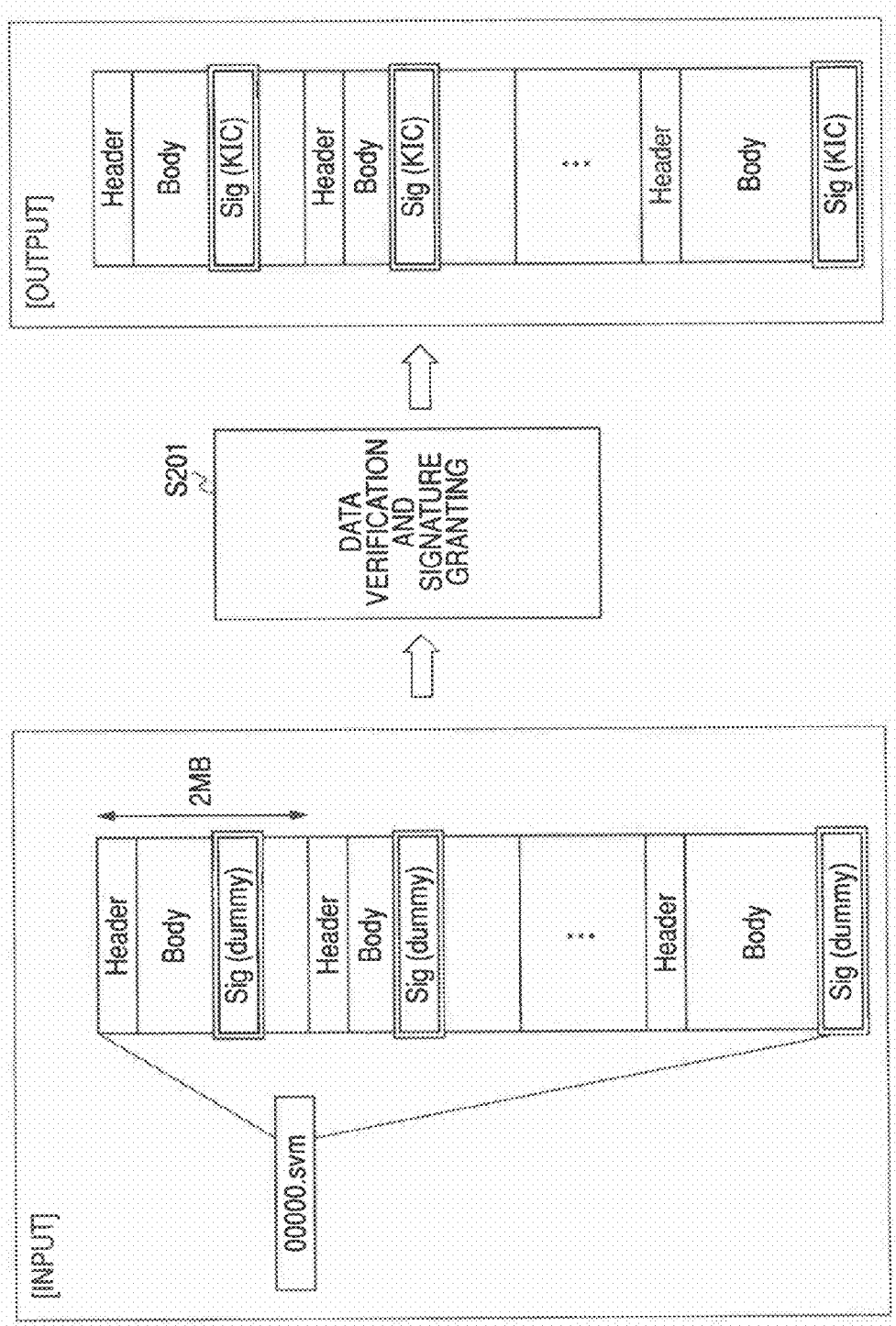
FIG. 19 is a view explaining a process of setting a signature corresponding to a content code in a key management center.

The granting of a signature may be set in various ways. An example of the granting of a signature will be described with reference to FIG. 19. FIG. 19 illustrates an example of setting a signature with respect to a content code file [00000.svm]. The content code file as input is a file created by various entities, such as contents providers or device manufacturing entities. This file is divided beforehand into blocks in the data unit of 2 MB. In addition, for each of the blocks in the data unit of 2 MB, dummy data is recorded in the file as a region where signature is stored.

The key management center (KIC) inputs the content code file including the dummy data, verifies the content code file every data of 2 MB, and creates and outputs a signature, to which a private key of the key management center (KIC) is applied, with respect to each of the 2 MB blocks.

In the case when an information processing apparatus reads out a content code from an information recording medium and executes a variety of processes, the information processing apparatus first executes a process of verifying an electronic signature granted to a region where the read content code file is used. The process is executed by applying the key management center public key. Only when data belonging to the region where the content code file is used is confirmed to be an authorized code without alteration by the verification, a process applying the content code included in the file region is executed.

Figure 20:
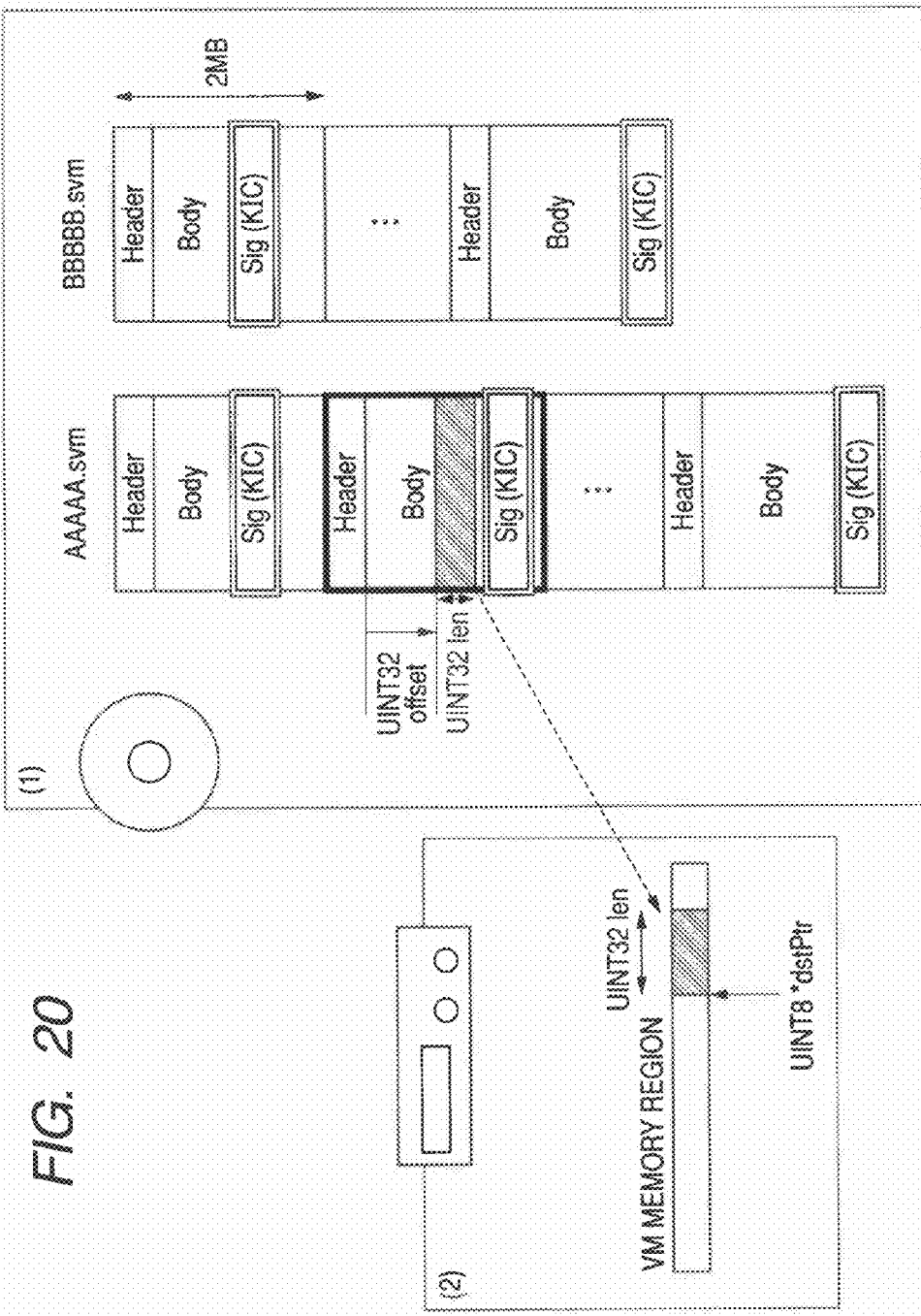
FIG. 20 is a view explaining use of a content code in an information processing apparatus.

Referring to FIG. 20, it will be described about reading of a specific data region of a content code file and a specific example of signature verification processing executed in an information processing apparatus. (1) of FIG. 20 illustrates content code files stored in an information recording medium. Here, two content code files [AAAAA.svm] and [BBBBB.svm] are shown.

(2) of FIG. 20 illustrates a memory region within an information processing apparatus that is set to be able to read out the information recording medium, specifically, a VM memory region as a memory space that the secure VM 160 explained above with reference to FIG. 1 can use. The content code processing is executed by the secure VM. The secure VM uses (CALL_LoadContentCode) as an execution function of a read command of content code file data, which is a predefined code read command, when a specific region of a specified content code is read out from an information recording medium.

The read command (CALL_LoadContentCode) of the content code file data is a command including the following specified information, for example.

UINT8 contentcode[5]: content code file number (=AAAAA)
UINT32 block: block number within content code file=2
UINT32 Offset: position at which content code within block starts to be loaded
UINT32 len: file length of loaded content code
UINT8 *dstPtr: VM memory address of load destination By using the execution function (CALL_LoadContentCode) of the read command of the content code file data including the specified information, data positioned in a predetermined region of a predetermined content code file is loaded into a VM memory region.

In addition, at the time of loading, signature verification is executed. For example, specific processing sequences when loading a second block of a content code file [AAAAA.Svm] are as follows.

(Step 1) Access to the head of a second block of the AAAAA.Svm file
(Step 2) Signature verification of the access block is performed
(Step 3) loaded content code file length (len) byte is loaded from the position corresponding to offset byte of a body of the block and is then copied to a space of the VM memory region beginning from VM memory address (*dstPtr)

Through the processing steps, the signature verification and the data loading are executed. In addition, if it is determined that there is a possibility of data alteration by the signature verification, the loading process and a process using a content code are not performed.

Next, referring to FIG. 21, it will be described about encryption of a content code stored in an information recording medium. First, as described earlier with reference to FIG. 9, content codes may be classified into the following four categories (a) to (d).

(a) Content code common to all contents and all devices
(b) Content code specific to contents
(c) Content code specific to a device, a model, or a version
(d) Content code specific to contents and apparatus (for example, device, model, or version)

Each content code is stored as a separate file in an information recording medium, or content codes that are integrated are stored as one file in an information recording medium. Entities that create the content codes belonging to the categories may be different. For example, a content code corresponding to (b) contents specific data is set by a studio which is a contents producer. In addition, (c) specific data such as a device, a model, or a version is created in many cases by an entity that manufactures a reproduction apparatus or a reproduction application.

Thus, sequences until content codes created by different entities are recorded in information recording media will be described with reference to FIG. 21. Referring to FIG. 21, [00000.svm] to [00003.svm] indicate content code files 551 created by different entities, that is, a studio that produces and edits contents, an authoring company, and a manufacturer of an apparatus or a reproduction application or a manufacturer of a component, such as an LSI, provided in an information processing apparatus.

These content code files [00000.svm] to [00003.svm] have content codes prepared on the assumption that a part of the content code is encrypted by using a key specific to a model/version/device, that is, a node key (group key [Gn] or device specific key), a model key, or a version key, which has been already explained above with reference to FIGS. 11 to 13.

Further, entities that create the content code files [00000.svm] to [00003.svm] create content code encryption configuration information 552 having encryption configuration information on the content codes and then transmit the content code encryption configuration information 552 and the created content codes to the key management center. As shown in FIG. 21, the content code encryption configuration information 552 includes data corresponding to a content code number as content code identification information, encryption section information, and specified information of a key applied to an encryption section.

In the key management center, encryption based on the content code encryption configuration information 552 is executed with respect to content codes received from respective content code creating entities. That is, the key management center selects a key, such as a device manufacturing entity key, a group key [Gn] or a device specific key, or a model key or a version key, specified on the basis of the content code encryption configuration information 552 and encrypts a specified part of the content code specified on the basis of the content code encryption configuration information 552.

Figure 21:
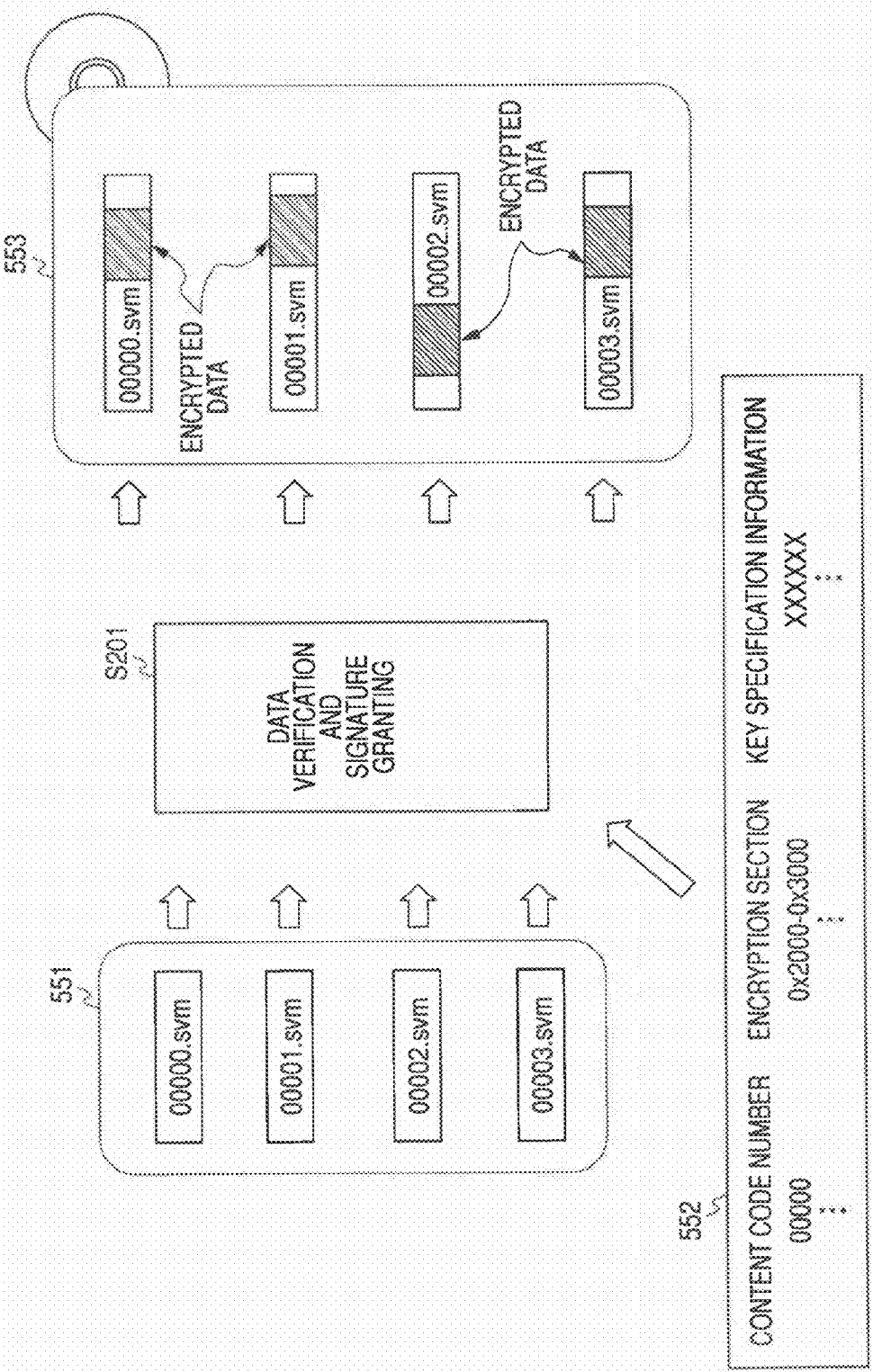
FIG. 21 is a view explaining a process of creating and encrypting a content code stored in an information recording medium.

Thus, an encryption-completed content code 553 shown in FIG. 21 is created. The encryption-completed content code 553 is transmitted to a disc factory as an information recording medium manufacturing entity and is then recorded in a disc. Furthermore, the content code encryption configuration information 552 is also transmitted to the disc factory to be then recorded in a disc. In addition, the content code encryption configuration information 552 may be included in data, which forms content codes, so as to be recorded in an information recording medium or may be recorded as a specific separate file in an information recording medium.

FIG. 21 illustrates four content code files [00000.svm] to [00003.svm] as the encryption-completed content codes 553. Each of the content codes includes encrypted data that is partially encrypted. For example, encryption keys applied for the encryption are the device manufacturing entity key, the group key [Gn] or the device specific key, or the model key or the version key, and the encryption is executed by applying keys selected on the basis of the content code encryption configuration information 552.

For example, assuming that the content code file 00000.svm is encrypted by applying the group key G1 501 shown in (a) of FIG. 11, only a device that holds the group key G1 501 can decrypt the encrypted data. Accordingly, only devices corresponding to left half of the devices corresponding to lowermost leaves in a hierarchical structure shown in FIG. 11 can use encrypted data of the content code 00000.svm. Since right half of the devices corresponding to the lowermost leaves does not hold the group key G1 501, it is not possible to use the encrypted data of the content code 00000.svm.

In the same manner, for example, assuming that the content code file 00001.svm is encrypted by applying the group key G2 502 shown in (a) of FIG. 11, only a device that holds the group key G2 502 can decrypt the encrypted data. Accordingly, only a left quarter of devices corresponding to the lowermost leaves in the hierarchical structure shown in FIG. 11 can use encrypted data of the content code 00001.svm.

Thus, since content codes are encrypted by applying the group key Gn or the device specific key, the model key, or the version key, it is possible to limit the number of devices that can decrypt and use the content codes. As described above, the content codes include a security check code for security check and a conversion table applied for data conversion of contents. In addition, the security check processing or the data conversion processing may be set to be executed with respect to only specific devices. Therefore, in the case of executing an apparatus checking applying an unauthorized certificate, for example, by copying a device certificate or a model/version certificate from other devices, it is not possible to decrypt a content code even if a specific content code corresponding to the device information or the like is acquired to execute the apparatus checking process, since the content code includes data that can be decrypted only by a key stored in only an information processing apparatus certified by a certificate. That is, even if the apparatus checking applying the borrowed certificate is executed, the information processing apparatus does not include a key corresponding to the certificate, that is, a device manufacturing entity key, a group key Gn or a device specific key, a model key, or a version key, and accordingly, it is not possible to decrypt the content code. As a result, it is possible to prevent a specific content code, which corresponds to apparatus information identified by an unauthorized certificate, from being illegal applied.

Next, content code processing executed by an information processing apparatus will be described with reference to FIG. 22. A secure VM for data processing of an information processing apparatus that executes reproduction of contents acquires a content code including a data processing program recorded in an information recording medium and executes data processing according to the content code. As described earlier, at least a part of the content code is encrypted by applying any one of the device manufacturing entity key, the group key Gn or device specific key, the model key, and the version key.

The secure VM acquires key specifying information applied for decryption of content codes and encrypted data position specifying information indicating the position of encrypted data set in the content code from data stored in an information recording medium, selects a key to be applied from a memory according to the acquired information, specifies data to be decrypted according to the encrypted data position specifying information, and executes decryption applying the selected key.

Figure 22:
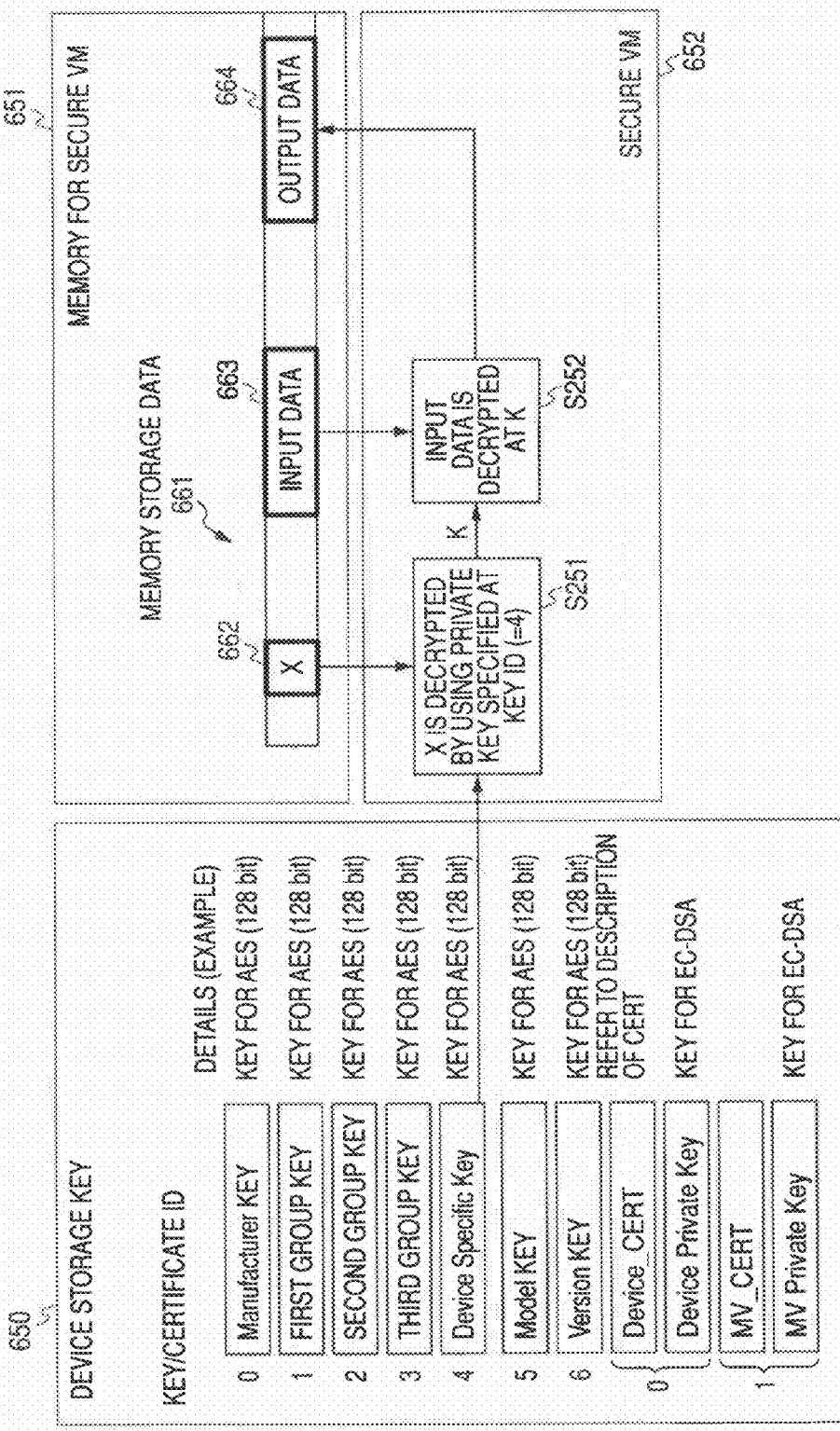
FIG. 22 is a view explaining sequences of a process of using a content code in an information processing apparatus.

FIG. 22 is a view illustrating processing executed by a secure VM 652. Content codes stored in the information recording medium are read out by the secure VM 652 to be then processed. The secure VM 652 executes the processing by storing the content code read out from the information recording medium in a memory 651 for secure VM.

Further, in the device storage key 650, the keys explained above with reference to FIGS. 11 to 13, that is, a device manufacturing entity key, a group key Gn or a device specific key, a model key, a version key, a device certificate, and a model/version certificate distributed by the key management center (KIC) are shown.

First, in step S251, the secure VM 652 acquires encryption key data [X] 662, which is set in a content code to be processed, from a memory storage data 661 stored in a memory 651 for secure VM. Then the secure VM 652 selects a key applied for decryption of the encryption key data [X] 662 from the player storage key 650 on the basis of the acquired key specifying information from record data included in the content code or other data files. The key specifying information is information that is recorded in an information recording medium on the basis of the content code encryption configuration information 552 explained above with reference to FIG. 21.

In this example, the key specifying information is assumed to be information used to specify key ID=4, that is, the device specific key (Device_Specific_Key). The secure VM 652 selects the device specific key (Device_Specific_Key) from the device storage key 650 on the basis of the key specifying information [key ID=4] and executes decryption processing for the encryption key data [X] 662.

As a result of the decryption processing, an original encryption key [K] obtained by encrypting a part of a content code is acquired. Then, in step S252, the secure VM 652 decrypts input data 663 corresponding to an encrypted portion of the content code by applying the acquired original encryption key [K] and stores a result of the decryption, as output data 664, in the memory 651 for secure VM. Due to such processing, the information processing apparatus can use, for example, the content code specific to a device.

In addition, the processing in the secure VM 652 is executed by sequences of the interrupt (INTRP) of a reproduction (player) application, which executes contents reproduction processing, with respect to the secure VM and the response (Call) processing of the secure VM with respect to the reproduction (player) application. The decryption processing of the content code is executed by calling the following function, for example.

CALL_AES (output destination address, input data address, AES processing block number, key address, key ID)

The function serves to cause a value (encryption key data [X] 662 in FIG. 22) of 128 bits specified by a key address to be decrypted by the use of a private key that a player specified by the key ID (ID=4 in FIG. 22) holds, to cause data corresponding to AES processing block number*16 byte starting from an input data address to be decrypted by using a result of the decryption as a decryption key, and to cause data after the decryption to be output to an output destination address. As described above, the identification information is embedded by using a device specific key. Accordingly, even if a first device tries to embed identification information of a second device, the first device cannot acquire Device_specific_Key of the second device, and thus, data for the second device cannot be decrypted. As a result, since it is not possible to specify identification information of another device, a predetermined device can be reliably specified.

Figure 23:
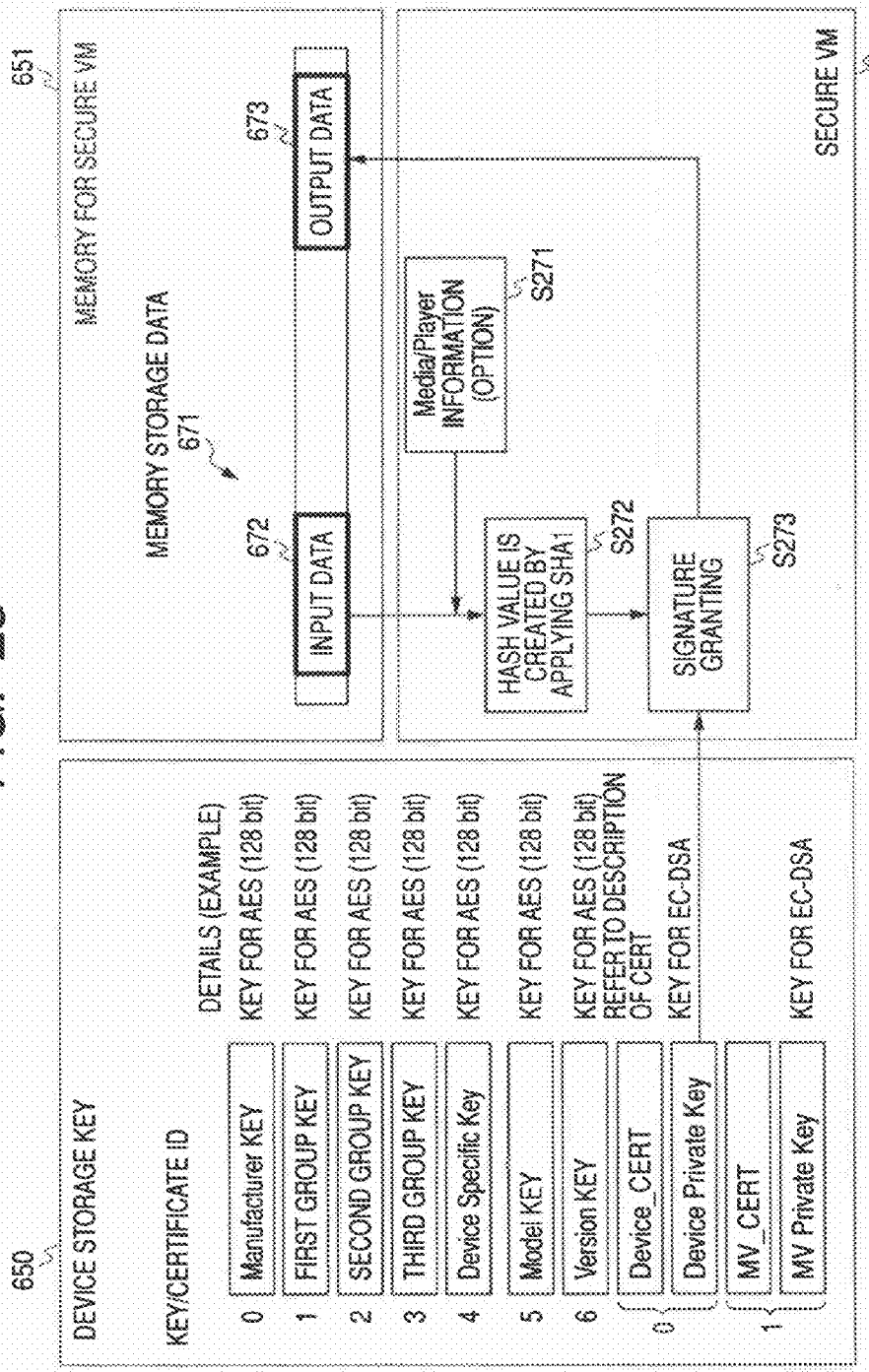
FIG. 23 is a view explaining sequences of a process of using a content code in an information processing apparatus.

Next, another content code processing executed by an information processing apparatus will be described with reference to FIG. 23. FIG. 23 is a view explaining a signing process applying the device private key [Device_Private_Key] in the device storage key 650.

The secure VM 652 calculates a Hash value with respect to input data 672 of memory storage data 671 stored in the memory 651 for secure VM by applying, for example, the Hash function, such as SHA-1, in step S272. In addition, in step S271 which is a step before calculating the Hash value, player information or media information may be added. Then, in step S273, the device private key [Device_Private_Key] is acquired from the device storage key 650, an electronic signature with respect to the Hash value, for example, an electronic signature based on EC-DSA algorithm is executed, and data including the signature is stored as output data 673 in the memory 651 for secure VM. Thereafter, output data 673 is acquired and then signature verification is executed at the time of execution of the content code, and thus it becomes possible to verify the validity of an information processing apparatus. In the above description, even though [Device_Private_Key] is set as a key for EC-DSA, an RSA signature may be granted by setting the [Device_Private_Key] as a key for RSA.

In addition, the signature setting process is executed when the secure VM 652 calls the following function, for example.

CALL_Private_Key (output destination address, input data address, length of data to be signed, Option specification, key ID)

The function serves to cause data corresponding to the length of data to be signed to be extracted from an input data address, to cause Option-specified Media/Player information added in a row of byte to be converted to the Hash value by the use of the SHA-1 function, and to cause a private key owned by the device to be signed to a result of the conversion and then recorded in an output destination address.

As described above, in an information processing apparatus that uses contents stored in an information recording medium, key data and certificate data are stored in addition to the device manufacturing entity key, the group key Gn, the device specific key, the model key, the version key, the device certificate, and the model/version certificate distributed by the key management center (KIC), which were explained above with reference to FIGS. 11 to 13. The information processing apparatus uses content codes and sets a signature by means of encryption processing in which these keys are selectively applied. Since a content code including a data portion encrypted by a specific selected key is stored in an information recording medium, the content code can be used by only a specific apparatus that stores the specific selected key.

Figure 24:
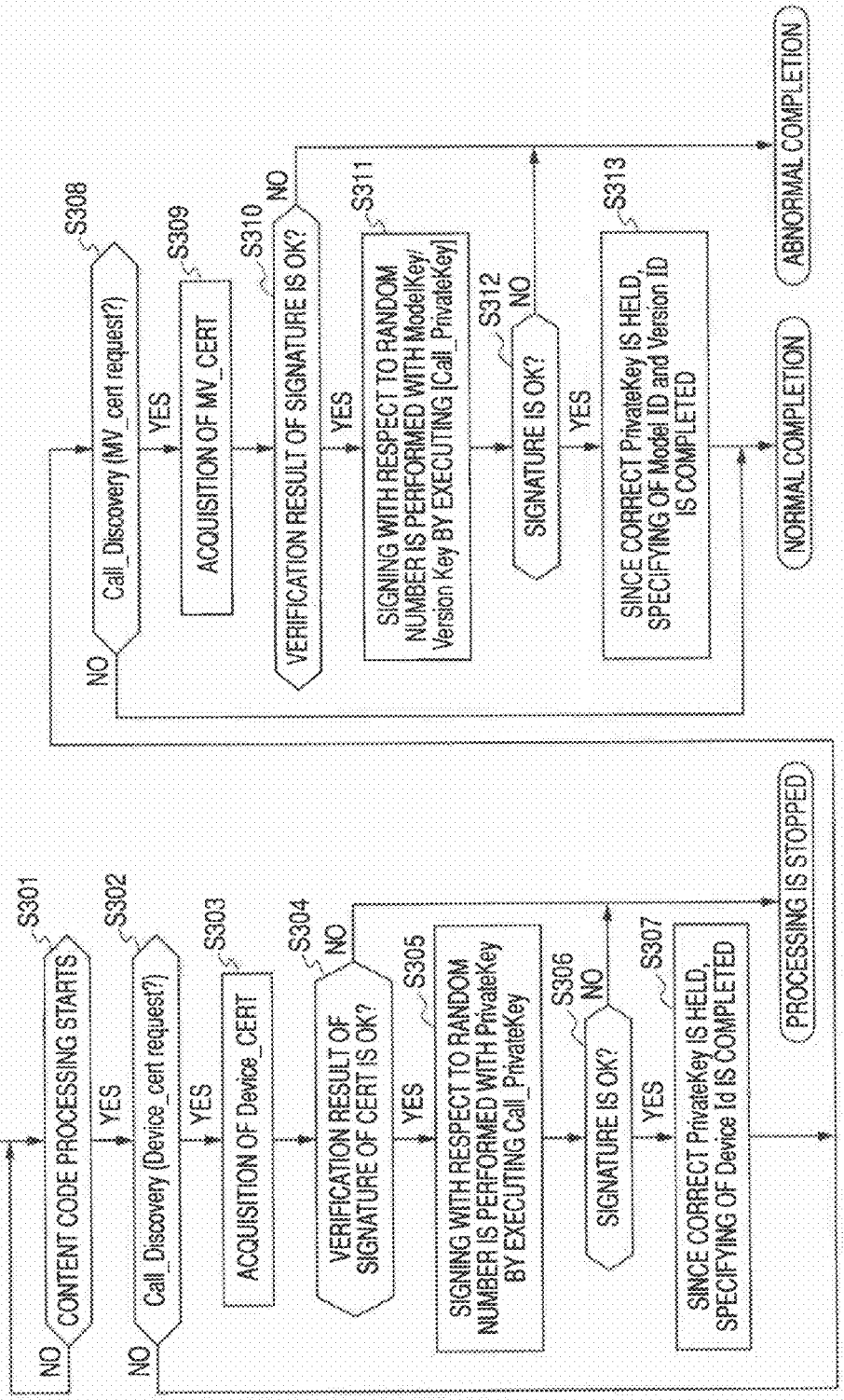
FIG. 24 is a view illustrating a flow chart explaining sequences of a process of applying a content code in an information processing apparatus.
Figure 25:
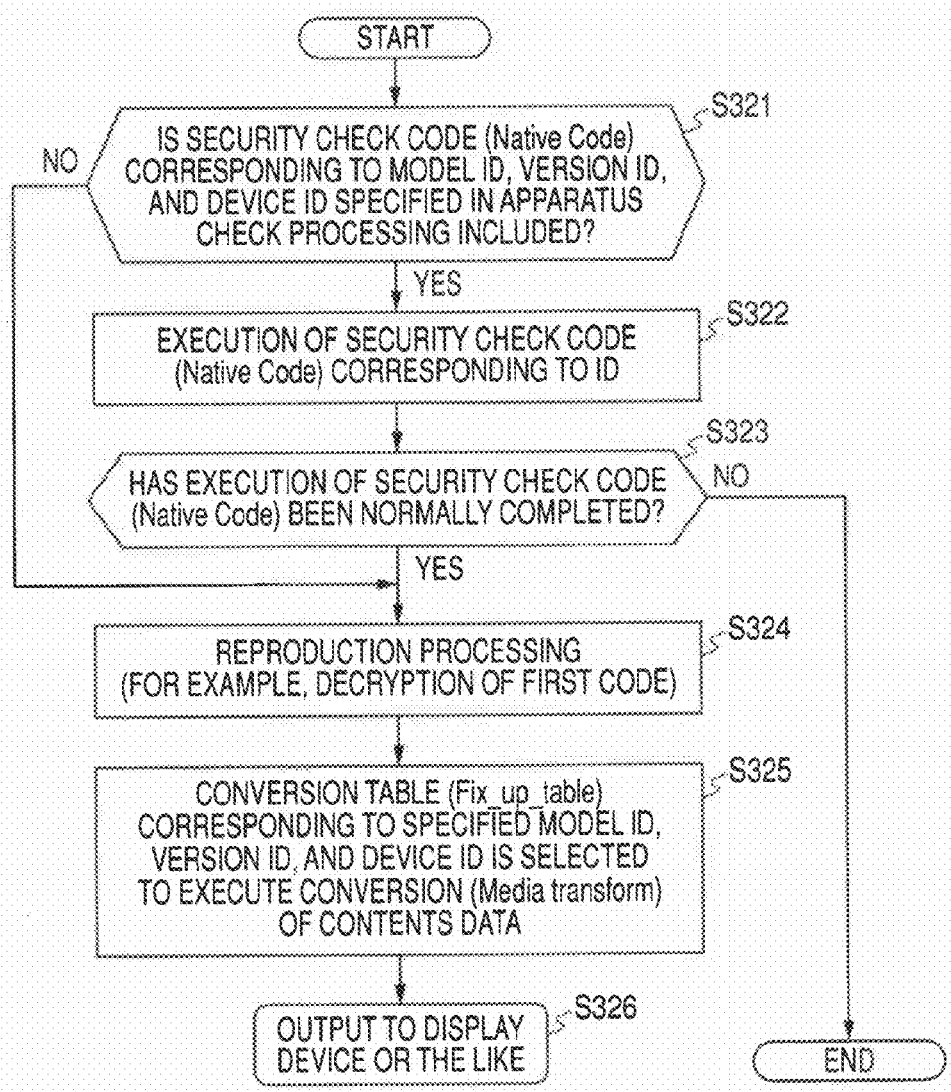
FIG. 25 is a view illustrating a flow chart explaining sequences of a process of applying a content code in an information processing apparatus.

Next, processing sequences using a content code in an information processing apparatus will be described with reference to FIGS. 24 and 25. FIG. 24 is a flow chart explaining sequences of an apparatus checking process in which the device certificate (Device Cert) and the model/version certificate (MV Cert) are applied, and FIG. 25 is a flow chart explaining sequences executed by selecting a conversion table (Fix_up_table) and a security check code corresponding to a model/version. Both of the process flows in FIGS. 24 and 25 are processes executed by the secure VM 160 shown in FIG. 1, and the processes are executed by reading out content codes stored in an information recording medium.

The apparatus checking process shown in FIG. 24 is executed as a process of applying an apparatus checking code included in a content code. The code for apparatus checking process includes the following functions and is executed by the secure VM.

[Call_Discovery]
[Call _PrivateKey]

The function [Call_Discovery] serves to cause a device certificate or a model/version certificate to be acquired from a memory within an information processing apparatus so as to execute a signature verification process.

In addition, as described above, the function [Call_PrivateKey] serves to cause data corresponding to the length of data to be signed to be extracted from an input data address and cause to sign with a private key owned by the device so as to be recorded in an output destination address.

Next, procedures of the apparatus checking process executed by an information processing apparatus will be described according to the flow in FIG. 24. First, in step S301, content code processing (here, apparatus checking process) starts. Then, in step S302, the secure VM determines whether or not the function [Call_Discovery] that causes to execute a process of calling and verifying a device certificate is included in an apparatus checking process execution code. If it is determined that the function [Call_Discovery] that causes to execute a process of calling and verifying a device certificate is included, the function [Call_Discovery] is executed. Then, in step S303, the device certificate (Device Cert) is acquired from a memory of an information processing apparatus. If it is determined that the function [Call_Discovery] that causes to execute the process of calling and verifying a device certificate is not included, the process proceeds to step S308.

After the device certificate (Device Cert) is acquired from the memory of the information processing apparatus in step S303, in step S304, a process for verification of a signature set in the device certificate (Device Cert) is executed as a signature verification process in which a public key of a key management center stored in the memory of the information processing apparatus is applied. By the signature verification, the process stops if the validity of the device certificate is not confirmed.

In the step S303, if the validity of the device certificate is confirmed by the signature verification, the process proceeds to step S305. In the step S305, the function [Call_PrivateKey] included in the content code is executed. That is, a signing process on random numbers created by an information processing apparatus or data read from an information recording medium is executed by using a device private key of the information processing apparatus. Then, in step S306, the created signature is verified. The verification is executed by applying a device public key acquired from the device certificate whose validity is confirmed.

If the signature verification is not successful, it is determined that the information processing apparatus does not have a correct device private key corresponding to the device public key acquired from the device certificate, and accordingly, the process stops. If the signature verification is successful, the process proceeds to step S307. In the step S307, it is determined that the information processing apparatus has the correct device private key corresponding to the device public key acquired from the device certificate. That is, the information processing apparatus is determined to be a valid information processing apparatus. Accordingly, a device identifier (device ID) is acquired from the device certificate and is then determined to a device ID corresponding to the information processing apparatus.

Then, in step S308, the secure VM determines whether or not the function [Call_Discovery] that causes to execute a process of calling and verifying a model/version certificate is included in the apparatus checking process execution code. If it is determined that the function [Call_Discovery] that causes to execute the process of calling and verifying the model/version certificate is included, the function [Call_Discovery] is executed. Then, in step S309, the model/version certificate (MV Cert) is acquired from the memory of the information processing apparatus. If it is determined that the function [Call_Discovery] that causes to execute the process of calling and verifying the model/version certificate is not included, it is determined that regular apparatus checking process has been completed, the process is completed.

After the model/version certificate (MV Cert) is acquired from the memory of the information processing apparatus in step S309, in step S310, a process for verification of a signature set in the model/version certificate (MV Cert) is executed as a signature verification process in which a public key of the key management center stored in the memory of the information processing apparatus is applied. By the signature verification, the process stops if the validity of the model/version certificate is not confirmed.

In the step S310, if the validity of the model/version certificate is confirmed by the signature verification, the process proceeds to step S311. In the step S311, the function [Call_PrivateKey] included in the content code is executed. That is, a signing process on random numbers created by the information processing apparatus or data read from the information recording medium is executed by using a model/version private key of the information processing apparatus. Then, in step S312, the created signature is verified. The verification is executed by applying a model/version public key acquired from the model/version certificate whose validity is confirmed.

If the signature verification is not successful, it is determined that the information processing apparatus does not have a correct model/version private key corresponding to the model/version public key acquired from the model/version certificate, and accordingly, the process stops. If the signature verification is successful, the process proceeds to step S313. In the step S313, it is determined that the information processing apparatus has the correct model/version private key corresponding to the model/version public key acquired from the model/version certificate. That is, the information processing apparatus is determined to be a valid information processing apparatus. Accordingly, a model/version identifier (model/version ID) is acquired from the model/version certificate and is then determined to a model ID or a version ID corresponding to the information processing apparatus.

Thus, the information processing apparatus execute the apparatus checking process by applying at least one of the device certificate and the model/version certificate or the device private key or the model key/version key. As a result of the process, at least one of a device ID, a model ID, and a version ID of an apparatus is specified. That is, by using a specific key corresponding to each apparatus or a key common to models or versions as well as an electronic certificate, it is possible to reliably specify an information processing apparatus.

Next, referring to the flow chart in FIG. 25, it will be described about sequences executed by selecting a conversion table (Fix_up_table) and a security check code corresponding to a model/version.

The process is also a process executed in the secure VM 160 shown in FIG. 1, and the process is executed by reading out content codes stored in an information recording medium. The process is executed as a process in which the conversion table (Fix_up_table) and the security check code included in the content code are applied.

First, in step S321, it is determined whether or not a security check code (Native code) corresponding to at least one of the model ID, the version ID, and the device ID specified in the apparatus checking process explained above with reference to FIG. 24 is included in a content code recorded in an information recording medium. If it is determined that the security check code is not included, the security check is omitted, proceeding to step S324.

If the security check code (Native code) corresponding to at least one of the model ID, the version ID, and the device ID specified in the apparatus checking process is included in the content code recorded in the information recording medium, the process proceeds to step S322. In the step S322, the security check code (Native code) corresponding to the model ID, the version ID, or the device ID is executed. In addition, when the code is executed, the validity of the code is checked by the signature verification. Only when the validity is confirmed, the process is executed. In addition, at least a part of the code is encrypted by means of a specific selected key, that is, the device manufacturing entity key, the group key [Gn] or device specific key, the model key, or the version key. In this case, first, on the basis of key specifying information of the content code encryption configuration information 552 explained above with reference to FIG. 21, it is necessary to execute decryption processing by acquiring a corresponding key from a memory.

In many cases, a security code required for an apparatus is a code common to models/versions. Thus, as for execute of the security code, it is possible to reliably specify a model by performing the processes S308 to S313 of FIG. 24 even if a device ID is not specified (that is, even if the steps S302 to S307 of FIG. 24 are not executed). Accordingly, a process of specifying the device ID may not be specially required.

On the other hand, in the case when illegally copied contents are distributed and accordingly, a device used in specific illegal copy is already specified by identification data embedded in the illegal copy, a content code acquired through a network or recorded in a recording medium is configured as a content code specific to one device, which has been used in the illegal copy, in correspondence with specification of a device ID. That is, even in the case of the same models, a specific process is executed for one specific device without executing the content code.

If the security check is regularly completed in the step S323, the process proceeds to step S324. If the security check is not regularly completed, use of a content code is not permitted, stopping the process.

In the step S324, reproduction of contents starts. In the reproduction of contents, first, decryption processing using a title key corresponding to contents is executed according to the processing sequences explained above with reference to FIG. 5. Then, in step S325, a conversion table (Fix_up_table) corresponding to at least one of the specified model ID, the version ID, and the device ID is selected to execute conversion of contents data (Media transform). Then, in step S326, conversion-completed contents data is output to a display device, for example, to execute the reproduction of the contents.

In the conversion of contents data (Media transform) in which the conversion table (Fix_up_table) is applied, a process of converting the contents data into normal data included in contents and a data conversion process of embedding identification information corresponding to the information processing apparatus in a part of the data included in contents are included. In addition, as for the embedding of identification information corresponding to an information processing apparatus, it is sufficient to specify a device ID and to embed data corresponding to the device ID. That is, specifying a model is not necessarily needed. For example, when a security code corresponding to a model/version is not included, the process of embedding identification information may be quickly executed by recording a content code in a recording medium, the content code being obtained by executing only the device ID specifying process (for example, steps S302 to S307 of FIG. 24) and omitting the model/version specifying process (for example, steps S308 to S313 of FIG. 24).

[7. Configuration of Information Processing Apparatus]

Figure 26:
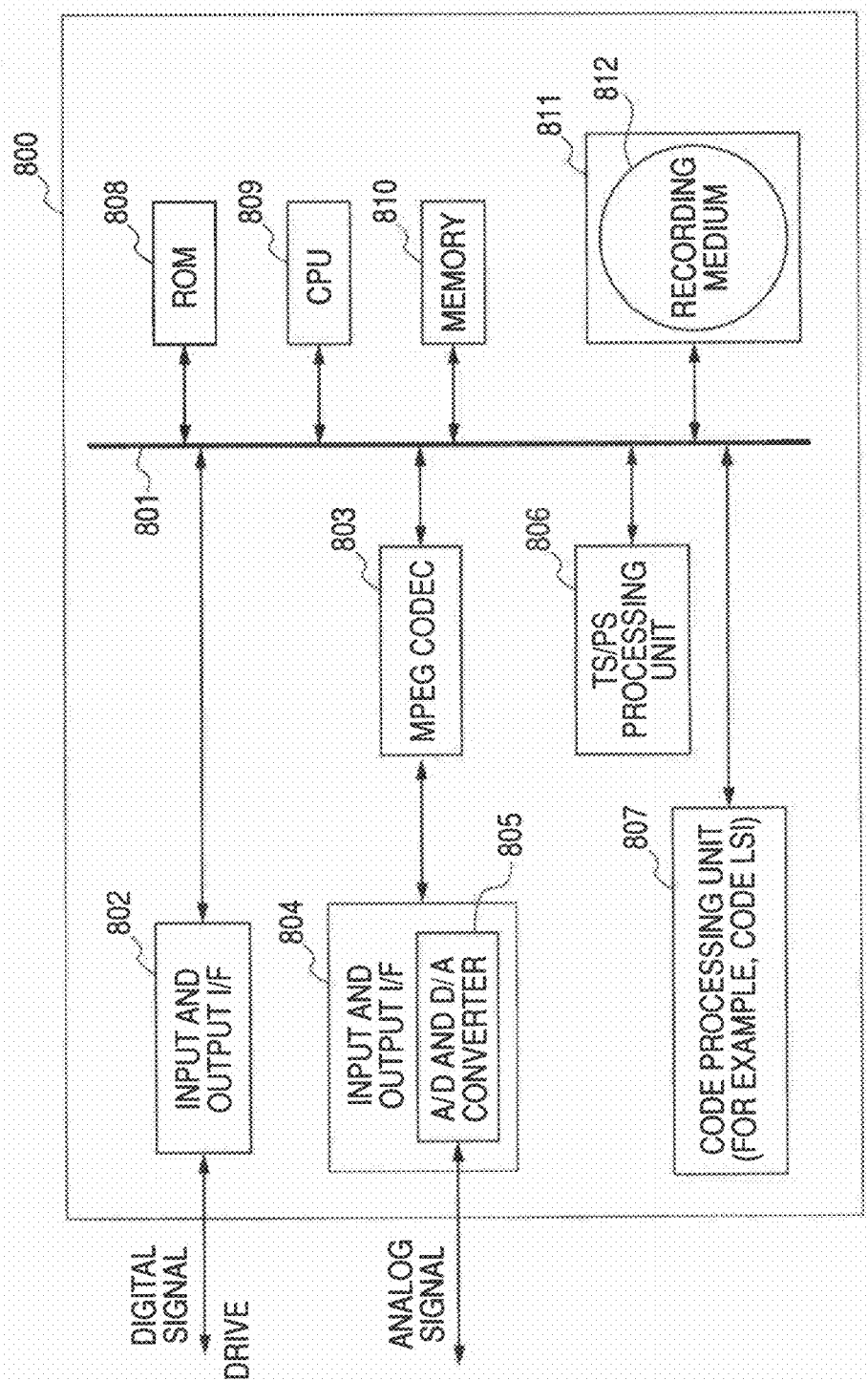
FIG. 26 is a view explaining an example of the hardware configuration of an information processing apparatus.

Next, referring to FIG. 26, it will be described about an example of the hardware configuration of an information processing apparatus that executes data processing in which the reproduction (player) application and the secure VM are applied. An information processing apparatus 800 includes: a CPU 809 that executes a variety of processes according to reproduction or record application programs for OS or contents, mutual authentication process, and contents reproduction, that is, executes a variety of data processing according to various programs including the above-described apparatus checking process according to a content code, the security check processing based on a security check code, and a data conversion process applying a conversion table; a ROM 808 serving as a region where a program, a parameter, and the like are stored; a memory 810; an input and output I/F 802 that inputs and outputs a digital signal; an input and output I/F 804 that inputs and outputs an analog signal and has A/D and D/A converter 805; an MPEG CODEC 803 that executes encoding and decoding of MPEG data; a TS and PS processing unit 806 that executes TS (transport stream) and PS (program stream) processes; a code processing unit 807 that executes a variety of code processes including mutual authentication and decryption processing on encrypted contents; a recording medium 812 such as a hard disc; and a drive 811 that executes input and output of data record and reproduction signals, and each block is connected to a bus 801.

The information processing apparatus (host) 800 is connected to a drive through a connection bus, such as ATAPI-BUS. Conversion table, contents, and the like are input and output through the digital signal input and output I/F 802. Encryption processing and decryption processing are executed by the code processing unit 807 by applying AES algorithm, for example.

In addition, a program that executes contents reproduction or record processing is stored in the ROM 808, for example. While the program is being executed, the memory 810 is used as working or storage area of parameters and data, as necessary. The ROM 808 or the recording medium 812 is stored with the variety of key data or certificate data described above, for example.

When contents are reproduced or output to the outside, processes according to the above-described processing sequences, such as decryption of encrypted contents, restoration of a conversion table, or a process of recording conversion data on the basis of data stored in the conversion table, are executed by applying a data conversion processing program acquired from an information recording medium.

[8. Information Recording Medium Manufacturing Apparatus and Information Recording Medium]

Next, Information recording medium manufacturing apparatus and information recording medium will be described. That, it will be described about an apparatus and method for manufacturing an information recording medium, which is applied in the above contents reproduction processing, and an information recording medium.

An information recording medium manufacturing apparatus is an apparatus that manufactures the information recording medium 100 stored with record data, which has been explained above with reference to FIG. 1, for example. In the information recording medium 100, content codes including an apparatus checking code and a security check code or a conversion table are stored. At least a part of the content codes is encrypted by various selected keys, as explained above with reference to FIG. 21.

As shown in FIG. 27, an information recording medium manufacturing apparatus includes: a contents file creating unit 901 that creates a contents file stored with contents data recorded in an information recording medium; a content code file creating unit 902 that creates a content code for apparatus checking process to be executed when using contents, a content code including a program for security checking process, and a content code file stored with a conversion table applied for data conversion of contents; and a recording unit 903 that records in an information recording medium 910 the contents file created in the contents file creating unit 901 and the content code file created in the content code file creating unit 902.

The content code file creating unit 902 creates a content code file stored with an apparatus checking code that is used to execute an apparatus checking process in which an apparatus certificate stored in a memory of each information processing apparatus is applied, a content code file stored with a security check code that can be selectively executed on the basis of an apparatus identifier checked by the apparatus checking process, and a content code file stored with a data conversion table that is applied in data conversion processing for contents selectively executable on the basis of an apparatus identifier checked by the apparatus checking process.

The content code file creating unit 902 is configured to create a content code file stored with content codes including encrypted data that can be decrypted only by encryption keys distributed to a group of information processing apparatuses that use contents. In this case, in the key tree having the hierarchical structure described above with reference to FIGS. 11 to 13, one of the encryption keys including device specific keys set corresponding to leaves as lowermost nodes to which information processing apparatuses correspond, group keys set corresponding to nodes on a route from leaves to a top node, a device manufacturing entity key set corresponding to the top node, a model key set corresponding to a model of an information processing apparatus, and a version key set corresponding to a version of an information processing apparatus is applied as the encryption key.

Further, as information corresponding to a content code file stored with content codes including encrypted data that can be decrypted only by encryption keys distributed to a specific group of information processing apparatuses that use contents, the content code file creating unit 902 executes a process of creating the content code encryption configuration information explained above with reference to FIG. 21, that is, content code encryption configuration information including key specifying information and an encrypted data portion of a content code as information to be recorded in an information recording medium.

In the information recording medium 910 manufactured by the information recording medium manufacturing apparatus, a variety of data explained with reference to FIG. 1 and the like is recorded. Specifically, at least a contents file, which is stored with contents data, and a content code file, which is stored with a content code including at least one of a content code for apparatus checking process to be executed when using contents, a program for security check process, and a data creation processing code applied in data conversion processing for data included in contents stored in the information recording medium, are included.

Content code files recorded in the information recording medium 910 includes a content code file stored with content codes including encrypted data that can be decrypted only by encryption keys distributed to a specific group of information processing apparatuses that use contents. In this case, in the key tree having the hierarchical structure described above with reference to FIGS. 11 to 13, one of the encryption keys including the device specific key set corresponding to a leaf as the lowermost node to which an information processing apparatus corresponds, the group key set corresponding to nodes on a route from the leaf to the top node, the device manufacturing entity key set corresponding to the top node, the model key set corresponding to a model of an information processing apparatus, and the version key set corresponding to a version of an information processing apparatus is applied as the encryption key.

In addition, as information corresponding to a content code file stored with content codes including encrypted data that can be decrypted only by encryption keys distributed to a specific group of information processing apparatuses that use contents, the content code encryption configuration information explained above with reference to FIG. 21, that is, content code encryption configuration information including key specifying information and an encrypted data portion of a content code is recorded in the information recording medium 910.

Hereinbefore, the present invention has been described in detail referring to the specific embodiments. However, it is apparent that various changes and modifications of the embodiments could be made by one skilled in the art without departing from the spirit or scope of the present invention. That is, it should be understood that the above embodiments are not limitative, but illustrative. In order to determine the spirit or scope of the present invention, the appended claims should be referred.

Further, the processes described in the specification may be executed by hardware, software, or a composite configuration of both hardware and software. In the case of executing the processes by the use of software, a program recorded with processing sequences may be installed in a memory within a computer built in dedicated hardware so as to be executed, or the program may be installed in a general-purpose computer capable of executing a variety of processes so as to be executed.

For example, a program may be recorded beforehand in a hard disc or a ROM (read only memory) serving as a recording medium. Alternatively, a program may be temporarily or permanently stored (recorded) in a removable recording medium including a flexible disc, a CD-ROM (compact disc read only memory), a MO (magneto optical) disc, a DVD (digital versatile disc), a magnetic disc, and a semiconductor memory. Such removable recording medium may be supplied as so-called package software.

Alternatively, in addition to installing a program from the removable recording medium in a computer, the program may be wirelessly transmitted to the computer or wire-transmitted to the computer through a network, such as a LAN (local area network) or Internet. Then, the computer may receive the program that is wirelessly transmitted or wire-transmitted and then install the program in a recording medium, such as a hard disc provided therein.

Further, the variety of processes described in the specification may be executed not only in a time-sequential manner but in parallel or separately according to a processing ability of an apparatus that executes the processes or according to the necessity. Furthermore, in the specification, the system is a logic group of a plurality of devices. That is, it is not limited that the devices exist in the same casing.

In addition, public keys or private keys used in the signature may be based on a method using so-called RSA or a method using so-called elliptical code (EC-DSA).

As described above, according to the configuration according to the embodiment of the present invention, in a configuration in which content codes including a data processing program recorded in an information recording medium are acquired and then data processing, such as security check processing, conversion processing on data included in contents, or a process of embedding apparatus information in contents according to corresponding content codes is executed, an apparatus checking process applying a device certificate or a model/version certificate stored in an information processing apparatus is executed as a process of checking an information processing apparatus, a device ID, a model ID, or a version ID serving as an apparatus identifier recorded in the device certificate or the model/version certificate is acquired after the apparatus checking process, and data processing applying content codes corresponding to the acquired apparatus identifier is executed at the time of a process applying content codes. As a result, it is possible to select and apply a proper content code corresponding to each apparatus.

Further, according to the configuration according to another embodiment of the present invention, at least a part of content codes is set as encrypted data, and in the key tree having the hierarchical structure, any of the encryption keys including the device specific key set corresponding to a leaf as a lowermost node to which an information processing apparatus corresponds, the group key set corresponding to nodes on a route from the leaf to the top node, the device manufacturing entity key set corresponding to the top node, and the model and version keys set corresponding to model and version of an information processing apparatus is applied as the encryption key. Accordingly, it is possible to allow only a group of specific information processing apparatuses to execute processing on content codes. As a result, it is possible to realize a configuration capable of preventing processing in which illegal content codes are applied.

It should be understood by those skilled in the art that various modifications, combinations, sub-combinations and alterations may occur depending on design requirements and other factors insofar as they are within the scope of the appended claims or the equivalents thereof.

What is claimed is:

1. An information recording medium manufacturing apparatus comprising:
  a processor including:
   a contents file creating unit to create a contents file in which contents data to be recorded in an information recording medium are stored;
   a content code file creating unit to create a content code file in which content codes including a data processing program to be executed when using contents are stored; and
   a recording unit to record, in the information recording medium, the contents file created by the contents file creating unit and the content code file created by the content code file creating unit, wherein the content code file creating unit is configured to
create a content code file stored with a code for apparatus checking process, which causes an apparatus checking process that applies an apparatus certificate stored in a memory of each information processing apparatus to be executed,
create a content code file stored with a security check code that is selected and executed on the basis of an apparatus identifier checked in the apparatus checking process,
create a content code file stored with a data conversion table applied in a data conversion process of contents that are selected and executed on the basis of the apparatus identifier checked in the apparatus checking process, and
create a content code file stored with content codes including encrypted data that is decryptable by only an encryption key distributed to a group of specific information processing apparatuses that use contents.

2. The information recording medium manufacturing apparatus according to claim 1,
wherein the encryption key corresponds to any of a device specific key set corresponding to a leaf as a lowermost node corresponding to a corresponding information processing apparatus, a group key set corresponding to each node on a route from a leaf to a top node, a device manufacturing entity key set corresponding to the top node, a model key corresponding to a model of the corresponding information processing apparatus, and a version key corresponding to a version of the corresponding information processing apparatus in a key tree having a hierarchical structure.

3. The information recording medium manufacturing apparatus according to claim 1,
wherein the content code file creating unit is configured to execute a process of creating, as information corresponding to a content code file stored with content codes including encrypted data that is decryptable by only an encryption key distributed to the group of specific information processing apparatuses that use contents, an encrypted data portion and content code encryption information including a key specifying information as information to be recorded in the information recording medium.

4. A non-transitory computer-readable storage medium storing computer-readable instructions that, when executed by an information recording medium manufacturing apparatus, cause the information recording medium manufacturing apparatus to perform an information recording medium manufacturing method comprising:
creating a contents file in which contents data to be recorded in an information recording medium are stored;
creating a content code file in which content codes including a data processing program to be executed when using contents are stored; and
recording, in the information recording medium, the contents file created in the creating of the contents file and the content code file created in the creating of the content code file,
wherein, in the creating of the content code file,
a content code file stored with a code for apparatus checking process, which causes an apparatus checking process that a applies an apparatus certificate stored in a memory of each information processing apparatus to be executed is created,
a content code file stored with a security check code that is selected and executed on the basis of an apparatus identifier checked in the apparatus checking process is created,
a content code file stored with a data conversion table applied in a data conversion process of contents that are selected and executed on the basis of the apparatus identifier checked in the apparatus checking process is created, and
a content code file stored with content codes including encrypted data that is decryptable by only an encryption key distributed to a group of specific information processing apparatuses that use contents is created.

5. The non-transitory computer-readable storage medium according to claim 4,
wherein the encryption key corresponds to any of a device specific key set corresponding to a leaf as a lowermost node corresponding to a corresponding information processing apparatus, a group key set corresponding to each node on a route from a leaf to a top node, a device manufacturing entity key set corresponding to the top node, a model key corresponding to a model of the corresponding information processing apparatus, and a version key corresponding to a version of the corresponding information processing apparatus in a key tree having a hierarchical structure.

6. The non-transitory computer-readable storage medium according to claim 4,
wherein, in the creating of the content code file, a process of creating, as information corresponding to a content code file stored with content codes including encrypted data that is decrypted by only an encryption key distributed to the group of specific information processing apparatuses that use contents, an encrypted data portion and content code encryption information including a key specifying information as information to be recorded in the information recording medium is executed.

7. An information recording medium manufacturing system comprising:
a processor including:
a contents file creating unit configured to create a contents file in which contents data to be recorded in an information recording medium are stored;
a content code file creating unit configured to create a content code file in which content codes including a data processing program to be executed when using contents are stored; and
a recording unit configured to record, in the information recording medium, the contents file created by the contents file creating unit and the content code file created by the content code file creating unit,
wherein the content code file creating unit is configured to
create a content code file stored with a code for apparatus checking process, which causes an apparatus checking process that applies an apparatus certificate stored in a memory of each information processing apparatus to be executed,
create a content code file stored with a security check code that is selected and executed on the basis of an apparatus identifier checked in the apparatus checking process,
create a content code file stored with a data conversion table applied in a data conversion process of contents that are selected and executed on the basis of the apparatus identifier checked in the apparatus checking process, and create a content code file stored with content codes including encrypted data that is decryptable by only an encryption key distributed to a group of specific information processing apparatuses that use contents.

* * * * *